US012328717B2

(12) United States Patent
Pan

(10) Patent No.: US 12,328,717 B2
(45) Date of Patent: Jun. 10, 2025

(54) METHOD AND APPARATUS FOR REMAPPING QUALITY OF SERVICE (QOS) FLOW WITH PROTOCOL DATA UNIT (PDU) SET CONSIDERATION IN A WIRELESS COMMUNICATION SYSTEM

(71) Applicant: ASUS Technology Licensing Inc., Taipei (TW)

(72) Inventor: Li-Te Pan, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/807,675

(22) Filed: Aug. 16, 2024

(65) Prior Publication Data

US 2025/0081182 A1 Mar. 6, 2025

Related U.S. Application Data

(60) Provisional application No. 63/602,550, filed on Nov. 24, 2023, provisional application No. 63/535,877, filed on Aug. 31, 2023.

(51) Int. Cl.
*H04W 72/1263* (2023.01)
*H04W 28/02* (2009.01)

(52) U.S. Cl.
CPC ............... *H04W 72/1263* (2013.01); *H04W 28/0268* (2013.01)

(58) Field of Classification Search
CPC ......... H04W 72/1263; H04W 28/0268; H04W 28/0263
See application file for complete search history.

(56) References Cited

U.S. PATENT DOCUMENTS

| | | | |
|---|---|---|---|
| 2018/0160348 A1* | 6/2018 | Wu | H04W 36/0044 |
| 2018/0213540 A1* | 7/2018 | Chiu | H04L 69/22 |
| 2019/0313295 A1* | 10/2019 | Xu | H04W 88/10 |
| 2023/0128433 A1* | 4/2023 | Liu | H04L 47/20 |
| | | | 370/230 |
| 2023/0217525 A1* | 7/2023 | Kim | H04W 76/15 |
| | | | 370/329 |

FOREIGN PATENT DOCUMENTS

WO WO-2024088577 A1 * 5/2024 ........... H04L 41/142

\* cited by examiner

*Primary Examiner* — Ayanah S George
(74) *Attorney, Agent, or Firm* — Cooper Legal Group LLC

(57) ABSTRACT

A method and device for a User Equipment (UE) for connecting with a network are disclosed. In one embodiment, the UE delivers a first Protocol Data Unit (PDU) of a first PDU set from a Quality of Service (QoS) flow to a first Data Radio Bearer (DRB). The UE also receives a message or an indication from the network for remapping the QoS flow from the first DRB to a second DRB. Furthermore, the UE delivers a second PDU of the first PDU set to the first DRB, wherein the second PDU is delivered to the first DRB after receiving the message or the indication.

12 Claims, 19 Drawing Sheets

| Bit | Description |
|---|---|
| 0 | Control PDU |
| 1 | Data PDU |

FIG. 11 (PRIOR ART)

| Bit | Description |
|---|---|
| 0 | No action |
| 1 | To inform NAS that RQI bit is set to 1. |

FIG. 12 (PRIOR ART)

| Bit | Description |
|---|---|
| 0 | No action |
| 1 | To store QoS flow to DRB mapping rule. |

FIG. 13 (PRIOR ART)

METHOD AND APPARATUS FOR REMAPPING QUALITY OF SERVICE (QOS) FLOW WITH PROTOCOL DATA UNIT (PDU) SET CONSIDERATION IN A WIRELESS COMMUNICATION SYSTEM

CROSS-REFERENCE TO RELATED APPLICATIONS

The present application claims the benefit of U.S. Provisional Patent Application Ser. No. 63/535,877 filed on Aug. 31, 2023 and U.S. Provisional Patent Application Ser. No. 63/602,550 filed on Nov. 24, 2023, the entire disclosures of which are incorporated herein in their entirety by reference.

FIELD

This disclosure generally relates to wireless communication networks, and more particularly, to a method and apparatus for remapping Quality of Service (QoS) flow with Protocol Data Unit (PDU) set consideration in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for a User Equipment (UE) for connecting with a network are disclosed. In one embodiment, the UE delivers a first Protocol Data Unit (PDU) of a first PDU set from a Quality of Service (QoS) flow to a first Data Radio Bearer (DRB). The UE also receives a message or an indication from the network for remapping the QoS flow from the first DRB to a second DRB. Furthermore, the UE delivers a second PDU of the first PDU set to the first DRB, wherein the second PDU is delivered to the first DRB after receiving the message or the indication.

BRIEF DESCRIPTION OF THE DRAWINGS

FIG. 11 is a reproduction of Table 6.3.3-1 of 3GPP TS 37.324 V17.0.0.

FIG. 12 is a reproduction of Table 6.3.6-1 of 3GPP TS 37.324 V17.0.0.

FIG. 13 is a reproduction of Table 6.3.7-1 of 3GPP TS 37.324 V17.0.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 38.331 V17.0.0, "NR; Radio Resource Control (RRC) protocol specification (Release 17)"; TS 37.324 V17.0.0, "NR; Service Data Adaptation Protocol (SDAP) specification (Release 17)"; TS 38.323 V17.0.0, "NR; Packet Data Convergence Protocol (PDCP) specification (Release 17)"; TS 38.300 V17.0.0, "NR; NR and NG-RAN Overall Description; Stage 2 (Release 17)"; TR 23.700-60 V1.2.0, "Study on XR (Extended Reality) and media services (Release 18)"; TR 38.835 V18.0.1, "Study on XR enhancements for NR (Release 18)"; 3GPP RAN2 meeting Chairman's Notes: "RAN2-122 LTE MUSIM QoE XR (Tero)_2023-05-23-1704.docx" (RAN2 #122) and "R2_123_SL_Session Notes (Kyeongin Jeong)_EoM.docx" (RAN2 #123); 3GPP email discussion [Post124][040][XR]38.331 CR (Huawei), "Introduction of XR enhancements into TS 38.331_rev2_v00_rapp.docx"; and 3GPP email discussion [Post124][042][XR] 38.323 CR (LGE), "R2-23xxxxx 38323 CR0128r1 Introduction of XR Enhancements_r0.docx". The standards and documents listed above are hereby expressly incorporated by reference in their entirety.

Figure 1:
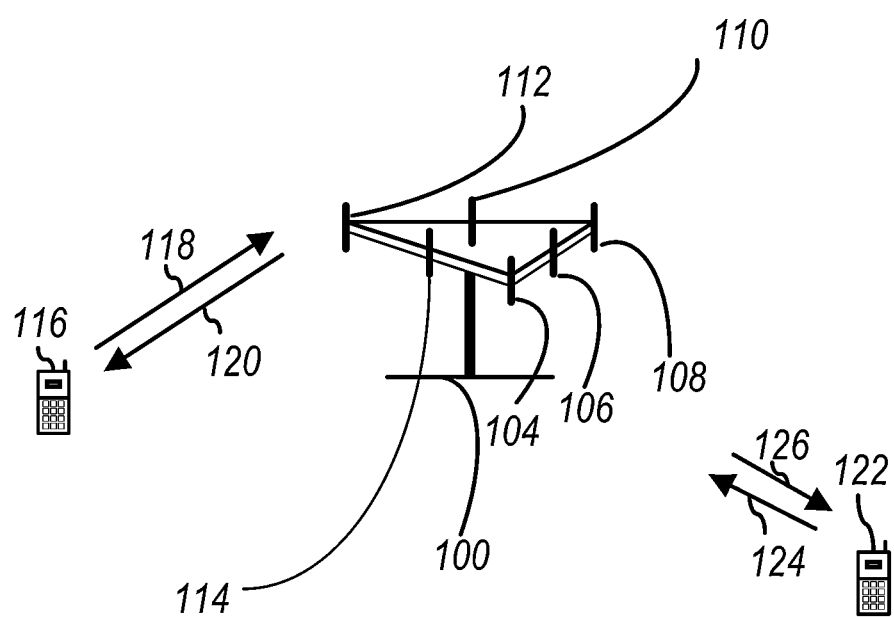
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
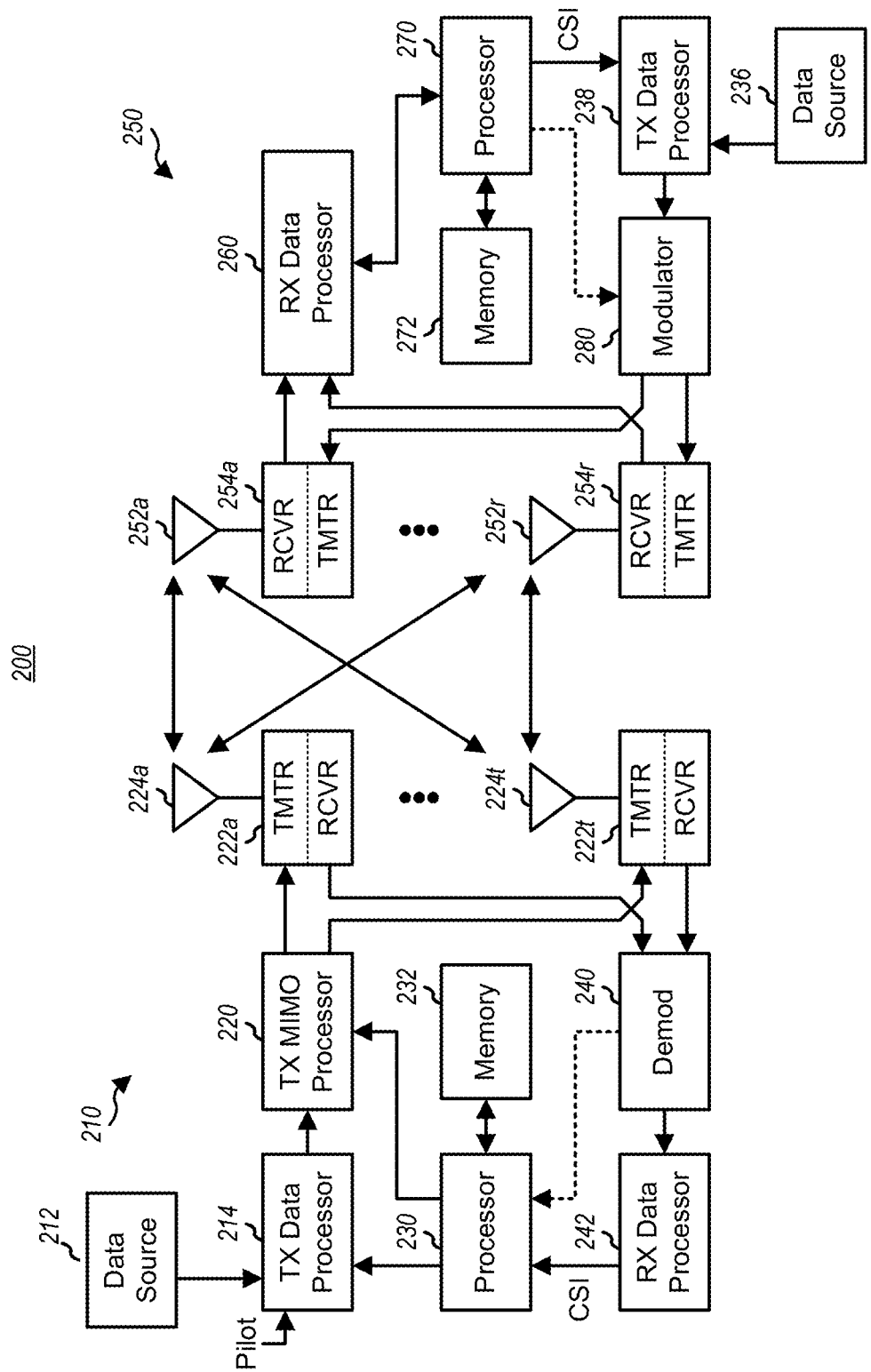
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
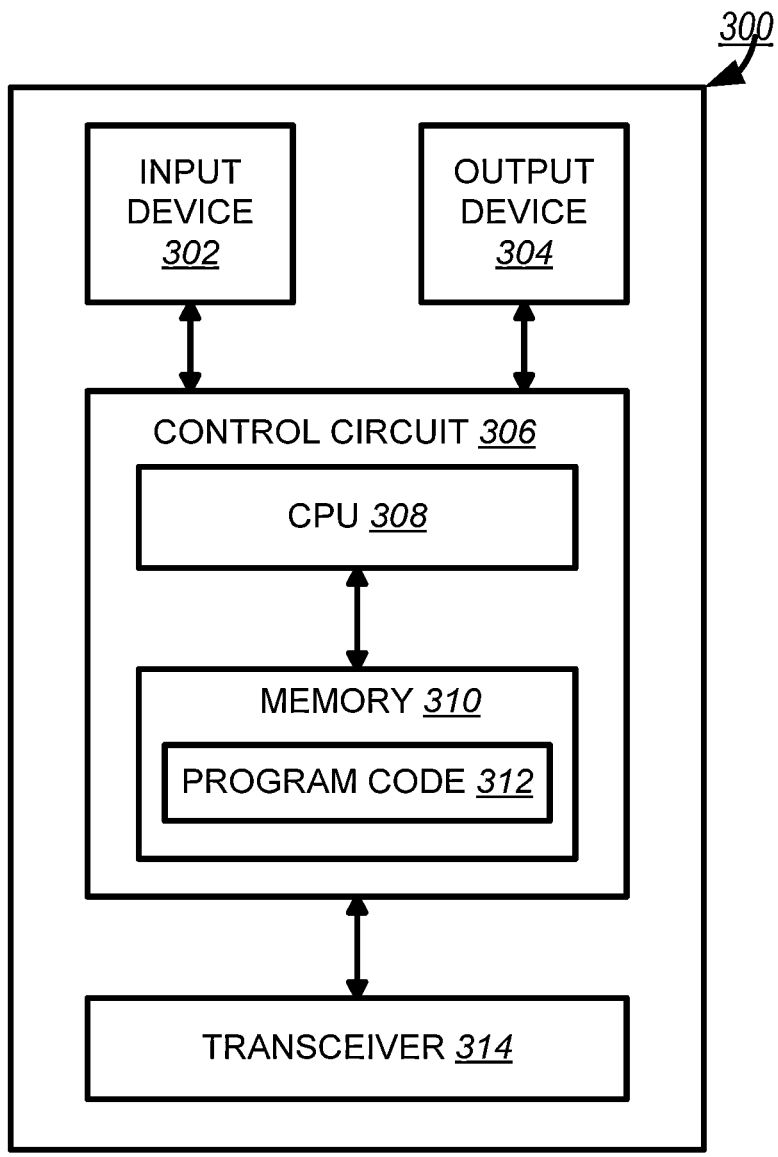
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
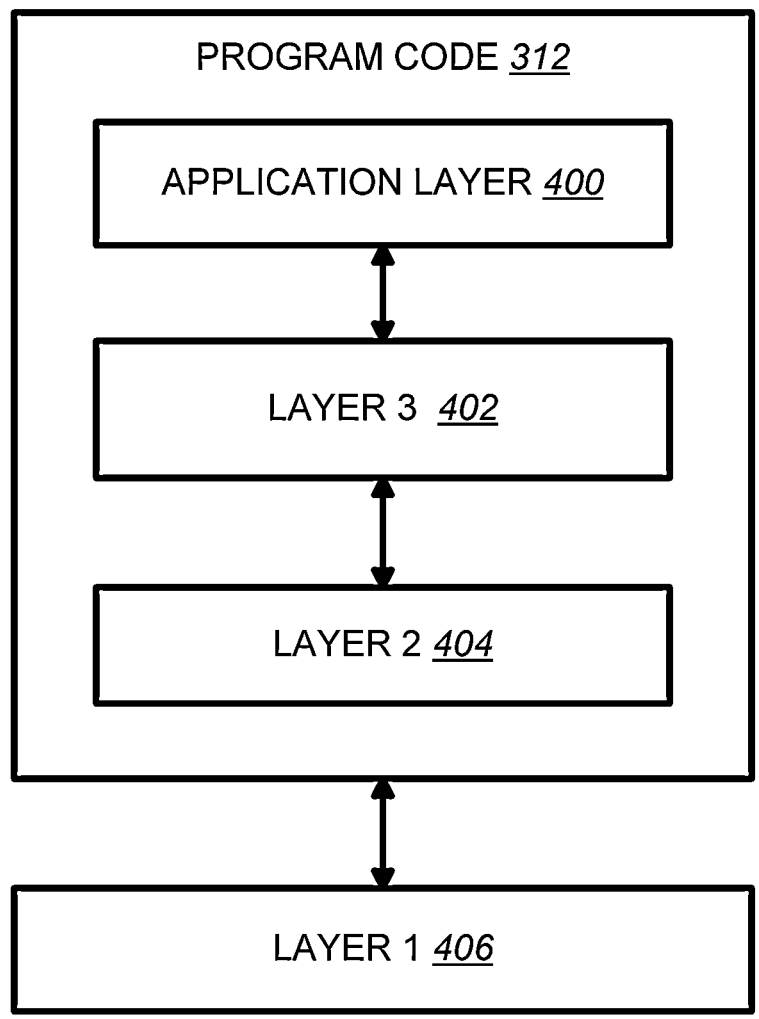
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Figure 5:
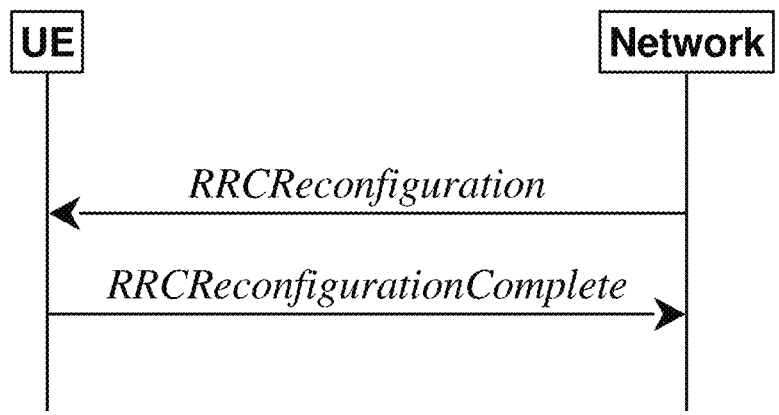
FIG. 5 is a reproduction of FIG. 5.3.5.1-1 of 3GPP TS 38.331 V17.0.0.

3GPP TS 38.331 introduced Radio Resource Control (RRC) reconfiguration for UE to establish radio bearer/Radio Link Control (RLC) channel as follows:

5.3.5 RRC reconfiguration
5.3.5.1 General
[FIG. 5.3.5.1-1 of 3GPP TS 38.331 V17.0.0, Entitled "RRC Reconfiguration, Successful", is Reproduced as FIG. 5]
[ . . . ]

The purpose of this procedure is to modify an RRC connection, e.g. to establish/modify/release RBs/BH RLC channels, to perform reconfiguration with sync, to setup/modify/release measurements, to add/modify/release SCells and cell groups, to add/modify/release conditional handover configuration, to add/modify/release conditional PSCell change or conditional PSCell addition configuration. As part of the procedure, NAS dedicated information may be transferred from the Network to the UE.

RRC reconfiguration to perform reconfiguration with sync includes, but is not limited to, the following cases:
   reconfiguration with sync and security key refresh, involving RA to the PCell/PSCell, MAC reset, refresh of security and re-establishment of RLC and PDCP triggered by explicit L2 indicators;
   reconfiguration with sync but without security key refresh, involving RA to the PCell/PSCell, MAC reset and RLC re-establishment and PDCP data recovery (for AM DRB or AM MRB) triggered by explicit L2 indicators.
   reconfiguration with sync for DAPS and security key refresh, involving RA to the target PCell, establishment of target MAC, and
     for non-DAPS bearer: refresh of security and re-establishment of RLC and PDCP triggered by explicit L2 indicators;
     for DAPS bearer: establishment of RLC for the target PCell, refresh of security and reconfiguration of PDCP to add the ciphering function, the integrity protection function and ROHC function of the target PCell;
     for SRB: refresh of security and establishment of RLC and PDCP for the target PCell;
   reconfiguration with sync for DAPS but without security key refresh, involving RA to the target PCell, establishment of target MAC, and
     for non-DAPS bearer: RLC re-establishment and PDCP data recovery (for AM DRB or AM MRB) triggered by explicit L2 indicators.
     for DAPS bearer: establishment of RLC for target PCell, reconfiguration of PDCP to add the ciphering function, the integrity protection function and ROHC function of the target PCell;
     for SRB: establishment of RLC and PDCP for the target PCell.

In (NG)EN-DC and NR-DC, SRB3 can be used for measurement configuration and reporting, for UE assistance (re-)configuration and reporting for power savings, for IP address (re-)configuration and reporting for IAB-nodes, to (re-)configure MAC, RLC, BAP, physical layer and RLF timers and constants of the SCG configuration, and to reconfigure PDCP for DRBs associated with the S-$K_{gNB}$ or SRB3, and to reconfigure SDAP for DRBs associated with S-$K_{gNB}$ in NGEN-DC and NR-DC, and to add/modify/release conditional PSCell change configuration, provided that the (re-)configuration does not require any MN involvement, and to transmit RRC messages between the MN and the UE during fast MCG link recovery. In (NG)EN-DC and NR-DC, only measConfig, radioBearerConfig, conditionalReconfiguration, bap-Config, iab-IP-AddressConfigurationList, otherConfig and/or secondaryCellGroup are included in RRCReconfiguration received via SRB3, except when RRCReconfiguration is received within DLInformationTransferMRDC.

5.3.5.2 Initiation
The Network may initiate the RRC reconfiguration procedure to a UE in RRC_CONNECTED. The Network applies the procedure as follows:
   the establishment of RBs (other than SRB1, that is established during RRC connection establishment) is performed only when AS security has been activated;
   the establishment of BH RLC Channels for IAB is performed only when AS security has been activated;
   the establishment of Uu Relay RLC channels for L2 U2N Relay UE is performed only when AS security has been activated;
   the addition of Secondary Cell Group and SCells is performed only when AS security has been activated;
   the reconfigurationWithSync is included in secondaryCellGroup only when at least one RLC bearer or BH RLC channel is setup in SCG;
   the reconfigurationWithSync is included in masterCellGroup only when AS security has been activated, and SRB2 with at least one DRB or multicast MRB or, for IAB, SRB2, are setup and not suspended;
   the conditionalReconfiguration for CPC is included only when at least one RLC bearer is setup in SCG;
   the conditionalReconfiguration for CHO or CPA is included only when AS security has been activated, and SRB2 with at least one DRB or, for IAB, SRB2, are setup and not suspended.

5.3.5.3 Reception of an RRCReconfiguration by the UE
The UE shall perform the following actions upon reception of the RRCReconfiguration, or upon execution of the conditional reconfiguration (CHO, CPA or CPC):

1> if the RRCReconfiguration was received neither within mrdc-SecondaryCellGroup nor within E-UTRA RRCConnectionReconfiguration nor within E-UTRA RRCConnectionResume:
  2> if the RRCReconfiguration includes the scg-State:
    3> perform SCG deactivation as specified in 5.3.5.13b;
  2> else:
    3> perform SCG activation as specified in 5.3.5.13a;
Editor's note: FFS how to ensure that the notification to MAC is only processed at the time the SCG configuration is processed, if included.
1> if the RRCReconfiguration is applied due to a conditional reconfiguration execution upon cell selection performed while timer T311 was running, as defined in 5.3.7.3:
  2> remove all the entries within VarConditionalReconfig, if any;
1> if the RRCReconfiguration includes the daps-SourceRelease:
  2> reset the source MAC and release the source MAC configuration;
  2> for each DAPS bearer:
    3> release the RLC entity or entities as specified in TS 38.322 [4], clause 5.1.3, and the associated logical channel for the source SpCell;
    3> reconfigure the PDCP entity to release DAPS as specified in TS 38.323 [5];
  2> for each SRB:
    3> release the PDCP entity for the source SpCell;
    3> release the RLC entity as specified in TS 38.322 [4], clause 5.1.3, and the associated logical channel for the source SpCell;
  2> release the physical channel configuration for the source SpCell;
  2> discard the keys used in the source SpCell (the $K_{gNB}$ key, the $K_{RRCenc}$ key, the $K_{RRCint}$ key, the $K_{UPint}$ key and the $K_{UPenc}$ key), if any;
1> if the RRCReconfiguration is received via other RAT (i.e., inter-RAT handover to NR):
  2> if the RRCReconfiguration does not include the fullConfig and the UE is connected to 5GC (i.e., delta signalling during intra 5GC handover):
    3> re-use the source RAT SDAP and PDCP configurations if available (i.e., current SDAP/PDCP configurations for all RBs from source E-UTRA RAT prior to the reception of the inter-RAT HO RRCReconfiguration message);
1> else:
  2> if the RRCReconfiguration includes the fullConfig:
    3> perform the full configuration procedure as specified in 5.3.5.11;
1> if the RRCReconfiguration includes the masterCellGroup:
  2> perform the cell group configuration for the received masterCellGroup according to 5.3.5.5;
1> if the RRCReconfiguration includes the masterKeyUpdate:
  2> perform AS security key update procedure as specified in 5.3.5.7;
1> if the RRCReconfiguration includes the sk-Counter:
  2> perform security key update procedure as specified in 5.3.5.7;
1> if the RRCReconfiguration includes the secondaryCellGroup:
  2> perform the cell group configuration for the SCG according to 5.3.5.5;
1> if the RRCReconfiguration includes the mrdc-SecondaryCellGroupConfig:
  2> if the mrdc-SecondaryCellGroupConfig is set to setup:
    3> if the mrdc-SecondaryCellGroupConfig includes mrdc-ReleaseAndAdd:
      4> perform MR-DC release as specified in clause 5.3.5.10;
    3> if the received mrdc-SecondaryCellGroup is set to nr-SCG:
      4> perform the RRC reconfiguration according to 5.3.5.3 for the RRCReconfiguration message included in nr-SCG;
    3> if the received mrdc-SecondaryCellGroup is set to eutra-SCG:
      4> perform the RRC connection reconfiguration as specified in TS 36.331 [10], clause 5.3.5.3 for the RRCConnectionReconfiguration message included in eutra-SCG;
  2> else (mrdc-SecondaryCellGroupConfig is set to release):
    3> perform MR-DC release as specified in clause 5.3.5.10;
1> if the RRCReconfiguration message includes the radioBearerConfig:
  2> perform the radio bearer configuration according to 5.3.5.6;
1> if the RRCReconfiguration message includes the radioBearerConfig2:
  2> perform the radio bearer configuration according to 5.3.5.6;
1> if the RRCReconfiguration message includes the measConfig:
  2> perform the measurement configuration procedure as specified in 5.5.2;
1> if the RRCReconfiguration message includes the dedicatedNAS-MessageList:
  2> forward each element of the dedicatedNAS-MessageList to upper layers in the same order as listed;
1> if the RRCReconfiguration message includes the dedicatedSIB1-Delivery:
  2> perform the action upon reception of SIB1 as specified in 5.2.2.4.2;
NOTE 0: If this RRCReconfiguration is associated to the MCG and includes reconfigurationWithSync in spCellConfig and dedicatedSIB1-Delivery, the UE initiates (if needed) the request to acquire required SIBs, according to clause 5.2.2.3.5, only after the random access procedure towards the target SpCell is completed.
1> if the RRCReconfiguration message includes the dedicatedSystemInformationDelivery:
  2> perform the action upon reception of System Information as specified in 5.2.2.4;
1> if the RRCReconfiguration message includes the dedicatedPosSysInfoDelivery:
  2> perform the action upon reception of the contained posSIB(s), as specified in clause 5.2.2.4.16;
1> if the RRCReconfiguration message includes the otherConfig:
  2> perform the other configuration procedure as specified in 5.3.5.9;
1> if the RRCReconfiguration message includes the bapConfig:
  2> perform the BAP configuration procedure as specified in 5.3.5.12;
1> if the RRCReconfiguration message includes the iab-IP-AddressConfigurationList:

2> if iab-IP-AddressToReleaseList is included:
 3> perform release of IP address as specified in 5.3.5.12a.1.1;
2> if iab-IP-AddressToAddModList is included:
 3> perform IAB IP address addition/update as specified in 5.3.5.12a.1.2;
1> if the RRCReconfiguration message includes the conditionalReconfiguration:
 2> perform conditional reconfiguration as specified in 5.3.5.13;
1> if the RRCReconfiguration message includes the needForGapsConfigNR:
 2> if needForGapsConfigNR is set to setup:
  3> consider itself to be configured to provide the measurement gap requirement information of NR target bands;
 2> else:
  3> consider itself not to be configured to provide the measurement gap requirement information of NR target bands;
1> if the RRCReconfiguration message includes the needForNCSG-ConfigNR:
 2> if needForNCSG-ConfigNR is set to setup:
  3> consider itself to be configured to provide the measurement gap and NCSG requirement information of NR target bands;
 2> else:
  3> consider itself not to be configured to provide the measurement gap and NCSG requirement information of NR target bands;
1> if the RRCReconfiguration message includes the needForNCSG-ConfigEUTRA:
 2> if needForNCSG-ConfigEUTRA is set to setup:
  3> consider itself to be configured to provide the measurement gap and NCSG requirement information of E-UTRA target bands;
 2> else:
  3> consider itself not to be configured to provide the measurement gap and NCSG requirement information of E-UTRA target bands;
1> if the RRCReconfiguration message includes the sl-ConfigDedicatedNR:
 2> perform the sidelink dedicated configuration procedure as specified in 5.3.5.14;
NOTE 0a: If the sl-ConfigDedicatedNR was received embedded within an E-UTRA RRCConnectionReconfiguration message, the UE does not build an NR RRCReconfigurationComplete message for the received sl-ConfigDedicatedNR.
1> if the RRCReconfiguration message includes the sl-L2RelayUEConfig:
 2> perform the L2 U2N Relay UE configuration procedure as specified in 5.3.5.15;
1> if the RRCReconfiguration message includes the sl-L2RemoteUEConfig:
 2> perform the L2 U2N Remote UE configuration procedure as specified in 5.3.5.16;
1> if the RRCReconfiguration message includes the dedicatedPagingDelivery:
 2> if the ue-Identity included in the PagingRecord in the Paging message matches the UE identity in sl-PagingIdentity-RemoteUE in sl-PagingInfo-RemoteUE received in RemoteUEInformationSidelink message in accordance with 5.8.9.8.3:
  3> initiate the Uu Message transfer in sidelink as specified in 5.8.9.9;
1> if the RRCReconfiguration message includes the sl-ConfigDedicatedEUTRA-Info:
 2> perform related procedures for V2X sidelink communication in accordance with TS 36.331 [10], clause 5.3.10 and clause 5.5.2;
1> if the RRCReconfiguration message includes the ul-GapFR2-Config:
 2> perform the FR2 UL gap configuration procedure as specified in 5.3.5.13c;
1> if the RRCReconfiguration message includes the musim-GapConfig:
 2> for each periodic musim-GapID included in the received musim-GapToReleaseList:
  3> release the MUSIM periodic gap associated to the musim-GapID from the musim-GapConfigList;
 2> for each periodic musim-GapID included in the received musim-GapToAddModList:
  3> if an entry with the matching musim-GapID exists in the musim-GapConfigList:
   4> replace the entry with the value received for this musim-GapID;
  3> else:
   4> add a new entry for this musim-GapID;
1> if the RRCReconfiguration message includes the appLayerMeasConfig:
 2> perform the application layer measurement configuration procedure as specified in 5.3.5.13d;
1> set the content of the RRCReconfigurationComplete message as follows:
 2> if the RRCReconfiguration includes the masterCellGroup containing the reportUplinkTxDirectCurrent:
  3> include the uplinkTxDirectCurrentList for each MCG serving cell with UL;
  3> include uplinkDirectCurrentBWP-SUL for each MCG serving cell configured with SUL carrier, if any, within the uplinkTxDirectCurrentList;
 2> if the RRCReconfiguration includes the masterCellGroup containing the reportUplinkTxDirectCurrentTwoCarrier:
  3> include in the uplinkTxDirectCurrentTwoCarrierList the list of uplink Tx DC locations for the configured intra-band uplink carrier aggregation in the MCG;
 2> if the RRCReconfiguration includes the secondaryCellGroup containing the reportUplinkTxDirectCurrent:
  3> include the uplinkTxDirectCurrentList for each SCG serving cell with UL;
  3> include uplinkDirectCurrentBWP-SUL for each SCG serving cell configured with SUL carrier, if any, within the uplinkTxDirectCurrentList;
 2> if the RRCReconfiguration includes the secondaryCellGroup containing the reportUplinkTxDirectCurrentTwoCarrier:
  3> include in the uplinkTxDirectCurrentTwoCarrierList the list of uplink Tx DC locations for the configured intra-band uplink carrier aggregation in the SCG;
NOTE 0b: It is expected that the reportUplinkTxDirectCurrentTwoCarrier is only received either in masterCellGroup or in secondaryCellGroup but not both.
 2> if the RRCReconfiguration message includes the mrdc-SecondaryCellGroupConfig with mrdc-SecondaryCellGroup set to eutra-SCG:

3> include in the eutra-SCG-Response the E-UTRA RRCConnectionReconfigurationComplete message in accordance with TS 36.331 [10] clause 5.3.5.3;
2> if the RRCReconfiguration message includes the mrdc-SecondaryCellGroupConfig with mrdc-SecondaryCellGroup set to nr-SCG:
3> include in the nr-SCG-Response the SCG RRCReconfigurationComplete message;
3> if the RRCReconfiguration message is applied due to conditional reconfiguration execution:
4> include in the selectedCondRRCReconfig the condReconfigId for the selected cell of conditional reconfiguration execution;
2> if the RRCReconfiguration includes the reconfigurationWithSync in spCellConfig of an MCG:
3> if the UE has logged measurements available for NR and if the RPLMN is included in plmn-IdentityList stored in VarLogMeasReport:
4> if the sigLoggedMeasType in VarLogMeasReport is included:
5> include the sigLogMeasConfigAvailable in the RRCReconfigurationComplete message and set it according to the following:
6> if T330 timer is running:
7> set sigLogMeasConfigAvailable to true in the RRCReconfigurationComplete message;
6> else:
7> set sigLogMeasConfigAvailable to false in the RRCReconfigurationComplete message;
4> include the logMeasAvailable in the RRCReconfigurationComplete message;
4> if Bluetooth measurement results are included in the logged measurements the UE has available for NR:
5> include the logMeasAvailableBT in the RRCReconfigurationComplete message;
4> if WLAN measurement results are included in the logged measurements the UE has available for NR:
5> include the logMeasAvailableWLAN in the RRCReconfigurationComplete message;
3> if the sigLoggedMeasType in VarLogMeasReport is included:
4> if T330 timer is running:
5> set sigLogMeasConfigAvailable to true in the RRCReconfigurationComplete message;
4> else:
5> if the UE has logged measurements available for NR:
6> set sigLogMeasConfigAvailable to false in the RRCReconfigurationComplete message;
3> if the UE has connection establishment failure or connection resume failure information available in VarConnEstFailReport or VarConnEstFailReportList and if the RPLMN is equal to plmn-Identity stored in VarConnEstFailReport or VarConnEstFailReportList:
4> include connEstFailInfoAvailable in the RRCReconfigurationComplete message;
3> if the UE has radio link failure or handover failure information available in VarRLF-Report and if the RPLMN is included in plmn-IdentityList stored in VarRLF-Report; or
3> if the UE has radio link failure or handover failure information available in VarRLF-Report of TS 36.331 and if the UE is capable of cross-RAT RLF reporting and if the RPLMN is included in plmn-IdentityList stored in VarRLF-Report of TS 36.331 [10]:
4> include rlf-InfoAvailable in the RRCReconfigurationComplete message;
3> if the UE was configured with successHO-Config when connected to the source PCell; and
3> if the applied RRCReconfiguration is not due to a conditional reconfiguration execution upon cell selection performed while timer T311 was running, as defined in 5.3.7.3:
4> perform the actions for the successful handover report determination as specified in clause 5.7.10.6, upon successfully completing the Random Access procedure triggered for the reconfigurationWithSync in spCellConfig of the MCG;
3> if the UE has successful handover information available in VarSuccessHO-Report and if the RPLMN is included in plmn-IdentityList stored in VarSuccessHO-Report:
4> include successHO-InfoAvailable in the RRCReconfigurationComplete message;
2> if the RRCReconfiguration message was received via SRB1, but not within mrdc-SecondaryCellGroup or E-UTRA RRCConnectionReconfiguration or E-UTRA RRCConnectionResume:
3> if the UE is configured to provide the measurement gap requirement information of NR target bands:
4> if the RRCReconfiguration message includes the needForGapsConfigNR; or
4> if the NeedForGapsInfoNR information is changed compared to last time the UE reported this information:
5> include the NeedForGapsInfoNR and set the contents as follows:
6> include intraFreq-needForGap and set the gap requirement information of intra-frequency measurement for each NR serving cell;
6> if requestedTargetBandFilterNR is configured, for each supported NR band that is also included in requestedTargetBandFilterNR, include an entry in interFreq-needForGap and set the gap requirement information for that band; otherwise, include an entry in interFreq-needForGap and set the corresponding gap requirement information for each supported NR band;
3> if the UE is configured to provide the measurement gap and NCSG requirement information of NR target bands:
4> if the RRCReconfiguration message includes the needForNCSG-ConfigNR; or
4> if the needForNCSG-InfoNR information is changed compared to last time the UE reported this information:
5> include the NeedForNCSG-InfoNR and set the contents as follows:
6> include intraFreq-needForNCSG and set the gap and NCSG requirement information of intra-frequency measurement for each NR serving cell;
6> if requestedTargetBandFilterNCSG-NR is configured, for each supported NR band included in requestedTargetBandFilterNCSG-NR, include an entry in interFreq-need- ForNCSG and set the NCSG requirement information for that band; otherwise, include an entry for each supported NR band in interFreqneedForNCSG and set the corresponding NCSG requirement information;
3> if the UE is configured to provide the measurement gap and NCSG requirement information of E-UTRA target bands:
4> if the RRCReconfiguration message includes the needForNCSG-ConfigEUTRA; or
4> if the needForNCSG-InfoEUTRA information is changed compared to last time the UE reported this information:
5> include the NeedForNCSG-InfoEUTRA and set the contents as follows:
6> if requestedTargetBandFilterNCSG-EUTRA is configured, for each supported E-UTRA band included in requestedTargetBandFilterNCSG-EUTRA, include an entry in needForNCSG-EUTRA and set the NCSG requirement information for that band; otherwise, include an entry for each supported E-UTRA band in needForNCSG-EUTRA and set the corresponding NCSG requirement information;
1> if the UE is configured with E-UTRA nr-SecondaryCellGroupConfig (UE in (NG)EN-DC):
2> if the RRCReconfiguration message was received via E-UTRA SRB1 as specified in TS 36.331 [10]; or
2> if the RRCReconfiguration message was received via E-UTRA RRC message RRCConnectionReconfiguration within MobilityFromNRCommand (handover from NR standalone to (NG)EN-DC):
3> if the RRCReconfiguration is applied due to a conditional reconfiguration execution for CPC which is configured via conditionalReconfiguration contained in nr-SecondaryCellGroupConfig specified in TS 36.331 [10]:
4> submit the RRCReconfigurationComplete message via the E-UTRA MCG embedded in E-UTRA RRC message ULInformationTransferMRDC as specified in TS 36.331 [10], clause 5.6.2a.
3> else if the RRCReconfiguration message was included in E-UTRA RRCConnectionResume message:
4> submit the RRCReconfigurationComplete message via E-UTRA embedded in E-UTRA RRC message RRCConnectionResumeComplete as specified in TS 36.331 [10], clause 5.3.3.4a;
3> else:
4> submit the RRCReconfigurationComplete via E-UTRA embedded in E-UTRA RRC message RRCConnectionReconfigurationComplete as specified in TS 36.331 [10], clause 5.3.5.3/5.3.5.4/5.4.2.3;
3> if the scg-State is not included in the E-UTRA RRCConnectionReconfiguration message containing the RRCReconfiguration message:
4> if reconfigurationWithSync was included in spCellConfig of an SCG; or
4> if the SCG was deactivated before the reception of the E-UTRA RRC message containing the RRCReconfiguration message and lower layers consider that a Random Access procedure is needed for SCG activation:
5> initiate the Random Access procedure on the SpCell, as specified in TS 38.321 [3];
4> else:
5> the procedure ends;
3> else:
4> the procedure ends;
2> if the RRCReconfiguration message was received within nr-SecondaryCellGroupConfig in RRCConnectionReconfiguration message received via SRB3 within DLInformationTransferMRDC:
3> submit the RRCReconfigurationComplete via E-UTRA embedded in E-UTRA RRC message RRCConnectionReconfigurationComplete as specified in TS 36.331 [10], clause 5.3.5.3/5.3.5.4;
3> if reconfigurationWithSync was included in spCellConfig of an SCG:
4> initiate the Random Access procedure on the SpCell, as specified in TS 38.321 [3];
3> else:
4> the procedure ends;
NOTE 1: The order the UE sends the RRCConnectionReconfigurationComplete message and performs the Random Access procedure towards the SCG is left to UE implementation.
2> else (RRCReconfiguration was received via SRB3) but not within DLInformationTransferMRDC:
3> submit the RRCReconfigurationComplete message via SRB3 to lower layers for transmission using the new configuration;
NOTE 2: In (NG)EN-DC and NR-DC, in the case RRCReconfiguration is received via SRB1 or within DLInformationTransferMRDC via SRB3, the random access is triggered by RRC layer itself as there is not necessarily other UL transmission. In the case RRCReconfiguration is received via SRB3 but not within DLInformationTransferMRDC, the random access is triggered by the MAC layer due to arrival of RRCReconfigurationComplete.
1> else if the RRCReconfiguration message was received via SRB1 within the nr-SCG within mrdc-SecondaryCellGroup (UE in NR-DC, mrdc-SecondaryCellGroup was received in RRCReconfiguration or RRCResume via SRB1):
2> if the RRCReconfiguration is applied due to a conditional reconfiguration execution for CPC which is configured via conditionalReconfiguration contained in nr-SCG within mrdc-SecondaryCellGroup:
3> submit the RRCReconfigurationComplete message via the NR MCG embedded in NR RRC message ULInformationTransferMRDC as specified in clause 5.7.2a.3.
2> if the scg-State is not included in the RRCReconfiguration or RRCResume message containing the RRCReconfiguration message:
3> if reconfigurationWithSync was included in spCellConfig in nr-SCG; or
3> if the SCG was deactivated before the reception of the NR RRC message containing the RRCReconfiguration message and lower layers consider that a Random Access procedure is needed for SCG activation:
4> initiate the Random Access procedure on the PSCell, as specified in TS 38.321 [3];
3> else:
4> the procedure ends;

2> else
3> the procedure ends;
NOTE 2a: The order in which the UE sends the RRCReconfigurationComplete message and performs the Random Access procedure towards the SCG is left to UE implementation.
1> else if the RRCReconfiguration message was received via SRB3 (UE in NR-DC):
2> if the RRCReconfiguration message was received within DLInformationTransferMRDC:
3> if the RRCReconfiguration message was received within the nr-SCG within mrdc-SecondaryCell-Group (NR SCG RRC Reconfiguration):
4> if reconfigurationWithSync was included in spCellConfig in nr-SCG:
5> initiate the Random Access procedure on the PSCell, as specified in TS 38.321 [3];
4> else:
5> the procedure ends;
3> else:
4> submit the RRCReconfigurationComplete message via SRB1 to lower layers for transmission using the new configuration;
2> else:
3> submit the RRCReconfigurationComplete message via SRB3 to lower layers for transmission using the new configuration;
1> else (RRCReconfiguration was received via SRB1):
2> submit the RRCReconfigurationComplete message via SRB1 to lower layers for transmission using the new configuration;
2> if this is the first RRCReconfiguration message after successful completion of the RRC re-establishment procedure:
3> resume SRB2, SRB4, and DRBs, multicast MRB, and BH RLC channels for IAB-MT, that are suspended;
1> if reconfigurationWithSync was included in spCellConfig of an MCG or SCG, and when MAC of an NR cell group successfully completes a Random Access procedure triggered above:
2> stop timer T304 for that cell group;
2> stop timer T310 for source SpCell if running;
2> apply the parts of the CSI reporting configuration, the scheduling request configuration and the sounding RS configuration that do not require the UE to know the SFN of the respective target SpCell, if any;
2> apply the parts of the measurement and the radio resource configuration that require the UE to know the SFN of the respective target SpCell (e.g. measurement gaps, periodic CQI reporting, scheduling request configuration, sounding RS configuration), if any, upon acquiring the SFN of that target SpCell;
2> for each DRB configured as DAPS bearer, request uplink data switching to the PDCP entity, as specified in TS 38.323 [5];
2> if the reconfigurationWithSync was included in spCellConfig of an MCG:
3> if T390 is running:
4> stop timer T390 for all access categories;
4> perform the actions as specified in 5.3.14.4.
3> if T350 is running:
4> stop timer T350;
3> if RRCReconfiguration does not include dedicatedSIB1-Delivery and
3> if the active downlink BWP, which is indicated by the firstActiveDownlinkBWP-Id for the target SpCell of the MCG, has a common search space configured by searchSpaceSIB1:
4> acquire the SIB1, which is scheduled as specified in TS 38.213 [13], of the target SpCell of the MCG;
4> upon acquiring SIB1, perform the actions specified in clause 5.2.2.4.2;
2> if the reconfigurationWithSync was included in spCellConfig of an MCG; or
2> if the reconfigurationWithSync was included in spCellConfig of an SCG and the CPA or CPC was configured
3> remove all the entries within VarConditionalReconfig, if any;
3> remove all the entries within VarConditionalReconfiguration as specified in TS 36.331 [10], clause 5.3.5.9.6, if any;
3> for each measId of the source SpCell configuration, if the associated reportConfig has a reportType set to condTriggerConfig:
4> for the associated reportConfigId:
5> remove the entry with the matching reportConfigId from the reportConfigList within the VarMeasConfig;
4> if the associated measObjectId is only associated to a reportConfig with reportType set to condTriggerConfig:
5> remove the entry with the matching measObjectId from the measObjectList within the VarMeasConfig;
4> remove the entry with the matching measId from the measIdList within the VarMeasConfig;
2> if reconfigurationWithSync was included in masterCellGroup or secondaryCellGroup:
3> if the UE initiated transmission of a UEAssistanceInformation message for the corresponding cell group during the last 1 second, and the UE is still configured to provide the concerned UE assistance information for the corresponding cell group; or
3> if the RRCReconfiguration message is applied due to a conditional reconfiguration execution, and the UE is configured to provide UE assistance information for the corresponding cell group, and the UE has initiated transmission of a UEAssistanceInformation message for the corresponding cell group since it was configured to do so in accordance with 5.7.4.2:
4> initiate transmission of a UEAssistanceInformation message for the corresponding cell group in accordance with clause 5.7.4.3 to provide the concerned UE assistance information;
4> start or restart the prohibit timer (if exists) associated with the concerned UE assistance information with the timer value set to the value in corresponding configuration;
3> if SIB12 is provided by the target PCell; and the UE initiated transmission of a SidelinkUEInformationNR message indicating a change of NR sidelink communication related parameters relevant in target PCell (i.e. change of sl-RxInterestedFreqList or sl-TxResourceReqList) during the last 1 second preceding reception of the RRCReconfiguration message including reconfigurationWithSync in spCellConfig of an MCG; or 3> if the RRCReconfiguration message is applied due to a conditional reconfiguration execution and the UE is capable of NR sidelink communication and SIB12 is provided by the target PCell, and the UE has initiated transmission of a SidelinkUEInformationNR message since it was configured to do so in accordance with 5.8.3.2:
    4> initiate transmission of the SidelinkUEInformationNR message in accordance with 5.8.3.3;
2> the procedure ends.

NOTE 3: The UE is only required to acquire broadcasted SIB1 if the UE can acquire it without disrupting unicast or MBS multicast data reception, i.e. the broadcast and unicast/MBS multicast beams are quasi co-located.

NOTE 4: The UE sets the content of UEAssistanceInformation according to latest configuration (i.e. the configuration after applying the RRCReconfiguration message) and latest UE preference. The UE may include more than the concerned UE assistance information within the UEAssistanceInformation according to 5.7.4.2. Therefore, the content of UEAssistanceInformation message might not be the same as the content of the previous UEAssistanceInformation message.

[ . . . ]

5.3.5.6 Radio Bearer Configuration
5.3.5.6.1 General
The UE shall perform the following actions based on a received RadioBearerConfig IE:
1> if the RadioBearerConfig includes the srb3-ToRelease or srb4-ToRelease:
  2> perform the SRB release as specified in 5.3.5.6.2;
1> if the RadioBearerConfig includes the srb-ToAddModList or if any DAPS bearer is configured:
  2> perform the SRB addition or reconfiguration as specified in 5.3.5.6.3;
1> if the RadioBearerConfig includes the drb-ToReleaseList:
  2> perform DRB release as specified in 5.3.5.6.4;
1> if the RadioBearerConfig includes the drb-ToAddModList:
  2> perform DRB addition or reconfiguration as specified in 5.3.5.6.5;
1> if the RadioBearerConfig includes the mrb-ToReleaseList:
  2> perform multicast MRB release as specified in 5.3.5.6.6;
1> if the RadioBearerConfig includes the mrb-ToAddModList:
  2> perform multicast MRB addition or reconfiguration as specified in 5.3.5.6.7;
1> release all SDAP entities, if any, that have no associated DRB as specified in TS 37.324 clause 5.1.2, and indicate the release of the user plane resources for PDU Sessions associated with the released SDAP entities to upper layers;
1> release all SDAP entities that have no associated multicast MRB, and indicate the release of user plane resources for these MBS multicast sessions to upper layers.

[ . . . ]

5.3.5.6.4 DRB Release
The UE shall:
1> for each drb-Identity value included in the drb-ToReleaseList that is part of the current UE configuration; or
1> for each drb-Identity value that is to be released as the result of full configuration according to 5.3.5.11:
  2> release the PDCP entity and the drb-Identity;
  2> if SDAP entity associated with this DRB is configured:
    3> indicate the release of the DRB to SDAP entity associated with this DRB (TS 37.324 [24], clause 5.3.3);
  2> if the DRB is associated with an eps-BearerIdentity:
    3> if a new bearer is not added either with NR or E-UTRA with same eps-BearerIdentity:
      4> indicate the release of the DRB and the eps-BearerIdentity of the released DRB to upper layers.

NOTE 1: The UE does not consider the message as erroneous if the drb-ToReleaseList includes any drb-Identity value that is not part of the current UE configuration.

NOTE 2: Whether or not the RLC and MAC entities associated with this PDCP entity are reset or released is determined by the CellGroupConfig.

5.3.5.6.5 DRB Addition/Modification
The UE shall:
1> for each drb-Identity value included in the drb-ToAddModList that is not part of the current UE configuration (DRB establishment including the case when full configuration option is used):
  2> establish a PDCP entity and configure it in accordance with the received pdcp-Config;
  2> if the PDCP entity of this DRB is not configured with cipheringDisabled:
    3> if target RAT of handover is E-UTRA/5GC; or
    3> if the UE is connected to E-UTRA/5GC:
      4> if the UE is capable of E-UTRA/5GC but not capable of NGEN-DC:
        5> configure the PDCP entity with the ciphering algorithm and $K_{UPenc}$ key configured/derived as specified in TS 36.331 [10];
      4> else (i.e., a UE capable of NGEN-DC):
        5> configure the PDCP entity with the ciphering algorithms according to securityConfig and apply the key ($K_{UPenc}$) associated with the master key ($K_{eNB}$) or secondary key (S-$K_{gNB}$) as indicated in keyToUse, if applicable;
    3> else (i.e., UE connected to NR or UE connected to E-UTRA/EPC):
      4> configure the PDCP entity with the ciphering algorithms according to securityConfig and apply the $K_{UPenc}$ key associated with the master key ($K_{eNB}$/$K_{gNB}$) or the secondary key (S-$K_{gNB}$/S-$K_{eNB}$) as indicated in keyToUse;
  2> if the PDCP entity of this DRB is configured with integrityProtection:
    3> configure the PDCP entity with the integrity protection algorithms according to securityConfig and apply the $K_{UPint}$ key associated with the master ($K_{eNB}$/$K_{gNB}$) or the secondary key (S-$K_{gNB}$) as indicated in keyToUse;
  2> if an sdap-Config is included:
    3> if an SDAP entity with the received pdu-Session does not exist:
      4> establish an SDAP entity as specified in TS 37.324 [24] clause 5.1.1;
      4> if an SDAP entity with the received pdu-Session did not exist prior to receiving this reconfiguration:
        5> indicate the establishment of the user plane resources for the pdu-Session to upper layers;

3> configure the SDAP entity in accordance with the received sdap-Config as specified in TS 37.324 [24] and associate the DRB with the SDAP entity;
3> for each QFI value added in mappedQoS-FlowsToAdd, if the QFI value is previously configured, the QFI value is released from the old DRB;
2> if the DRB is associated with an eps-BearerIdentity:
3> if the DRB was configured with the same eps-BearerIdentity either by NR or E-UTRA prior to receiving this reconfiguration:
4> associate the established DRB with the corresponding eps-BearerIdentity;
3> else:
4> indicate the establishment of the DRB(s) and the eps-BearerIdentity of the established DRB(s) to upper layers;
1> for each drb-Identity value included in the drb-ToAddModList that is part of the current UE configuration and configured as DAPS bearer:
2> reconfigure the PDCP entity to configure DAPS with the ciphering function, integrity protection function and ROHC function of the target cell group as specified in TS 38.323 [5] and configure it in accordance with the received pdcp-Config;
2> if the masterKeyUpdate is received:
3> if the ciphering function of the target cell group PDCP entity is not configured with cipheringDisabled:
4> configure the ciphering function of the target cell group PDCP entity with the ciphering algorithm according to securityConfig and apply the $K_{UPenc}$ key associated with the master key ($K_{gNB}$), as indicated in keyToUse, i.e. the ciphering configuration shall be applied to all subsequent PDCP PDUs received from the target cell group and sent to the target cell group by the UE;
3> if the integrity protection function of the target cell group PDCP entity is configured with integrityProtection:
4> configure the integrity protection function of the target cell group PDCP entity with the integrity protection algorithms according to securityConfig and apply the $K_{UPint}$ key associated with the master key ($K_{gNB}$) as indicated in keyToUse;
2> else:
3> configure the ciphering function and the integrity protection function of the target cell group PDCP entity with the same security configuration as the PDCP entity for the source cell group;
2> if the sdap-Config is included and when indication of successful completion of random access towards target cell is received from lower layers as specified in [3]:
3> reconfigure the SDAP entity in accordance with the received sdap-Config as specified in TS 37.324 [24];
3> for each QFI value added in mappedQoS-FlowsToAdd, if the QFI value is previously configured, the QFI value is released from the old DRB;
1> for each drb-Identity value included in the drb-ToAddModList that is part of the current UE configuration and not configured as DAPS bearer:
2> if the reestablishPDCP is set:
3> if target RAT of handover is E-UTRA/5GC; or
3> if the UE is connected to E-UTRA/5GC:

4> if the UE is capable of E-UTRA/5GC but not capable of NGEN-DC:
5> if the PDCP entity of this DRB is not configured with cipheringDisabled:
6> configure the PDCP entity with the ciphering algorithm and $K_{UPenc}$ key configured/derived as specified in TS 36.331 [10], clause 5.4.2.3, i.e. the ciphering configuration shall be applied to all subsequent PDCP PDUs received and sent by the UE;
4> else (i.e., a UE capable of NGEN-DC):
5> if the PDCP entity of this DRB is not configured with cipheringDisabled:
6> configure the PDCP entity with the ciphering algorithm and $K_{UPenc}$ key associated with the master key ($K_{eNB}$) or the secondary key (S-$K_{gNB}$), as indicated in keyToUse, i.e. the ciphering configuration shall be applied to all subsequent PDCP PDUs received and sent by the UE;
3> else (i.e., UE connected to NR or UE connected to E-UTRA/EPC (in EN-DC or capable of EN-DC)):
4> if the PDCP entity of this DRB is not configured with cipheringDisabled:
5> configure the PDCP entity with the ciphering algorithm and $K_{UPenc}$ key associated with the master key ($K_{eNB}$/$K_{gNB}$) or the secondary key (S-$K_{gNB}$/S-$K_{eNB}$), as indicated in keyToUse, i.e. the ciphering configuration shall be applied to all subsequent PDCP PDUs received and sent by the UE;
4> if the PDCP entity of this DRB is configured with integrityProtection:
5> configure the PDCP entity with the integrity protection algorithms according to securityConfig and apply the $K_{UPint}$ key associated with the master key ($K_{eNB}$/$K_{gNB}$) or the secondary key (S-$K_{gNB}$) as indicated in keyToUse;
3> if drb-ContinueROHC is included in pdcp-Config:
4> indicate to lower layer that drb-ContinueROHC is configured;
3> if drb-ContinueEHC-DL is included in pdcp-Config:
4> indicate to lower layer that drb-ContinueEHC-DL is configured;
3> if drb-ContinueEHC-UL is included in pdcp-Config:
4> indicate to lower layer that drb-ContinueEHC-UL is configured;
3> if drb-ContinueUDC is included in pdcp-Config:
4> indicate to lower layer that drb-ContinueUDC is configured; 3> re-establish the PDCP entity of this DRB as specified in TS 38.323 [5], clause 5.1.2;
2> else, if the recoverPDCP is set:
3> trigger the PDCP entity of this DRB to perform data recovery as specified in TS 38.323 [5];
2> if the pdcp-Config is included:
3> reconfigure the PDCP entity in accordance with the received pdcp-Config.
2> if the sdap-Config is included:
3> reconfigure the SDAP entity in accordance with the received sdap-Config as specified in TS37.324 [24];

3> for each QFI value added in mappedQoS-FlowsToAdd, if the QFI value is previously configured, the QFI value is released from the old DRB;

NOTE 1: Void.

NOTE 2: When determining whether a drb-Identity value is part of the current UE configuration, the UE does not distinguish which RadioBearerConfig and DRB-ToAddModList that DRB was originally configured in. To re-associate a DRB with a different key ($K_{eNB}$ to $S\text{-}K_{gNB}$, $K_{gNB}$ to $S\text{-}K_{eNB}$, $K_{gNB}$ to $S\text{-}K_{gNB}$, or vice versa), the network provides the drb-Identity value in the (target) drb-ToAddModList and sets the reestablishPDCP flag. The network does not list the drb-Identity in the (source) drb-ToReleaseList.

NOTE 3: When setting the reestablishPDCP flag for a radio bearer, the network ensures that the RLC receiver entities do not deliver old PDCP PDUs to the re-established PDCP entity. It does that e.g. by triggering a reconfiguration with sync of the cell group hosting the old RLC entity or by releasing the old RLC entity.

NOTE 4: In this specification, UE configuration refers to the parameters configured by NR RRC unless otherwise stated.

NOTE 5: Ciphering and integrity protection can be enabled or disabled for a DRB. The enabling/disabling of ciphering or integrity protection can be changed only by releasing and adding the DRB.

NOTE 6: In DAPS handover, the UE may perform PDCP entity re-establishment (if reestablishPDCP is set) or the PDCP data recovery (if recoverPDCP is set) for a non-DAPS bearer when indication of successful completion of random access towards target cell is received from lower layers as specified in TS 38.321 [3]. In this case, the UE suspends data transmission and reception for all non-DAPS bearers in the source MCG for duration of the DAPS handover.

[ . . . ]

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3
RLC-SAP: AM
Logical channel: DCCH
Direction: Network to UE RRCReconfiguration Message

```
-- ASN1START
-- TAG-RRCRECONFIGURATION-START
RRCReconfiguration ::=          SEQUENCE {
    rrc-TransactionIdentifier       RRC-TransactionIdentifier,
    criticalExtensions              CHOICE {
        rrcReconfiguration              RRCReconfiguration-IEs,
        criticalExtensionsFuture        SEQUENCE { }
    }
}
RRCReconfiguration-IEs ::=      SEQUENCE {
    radioBearerConfig               RadioBearerConfig
OPTIONAL, -- Need M
    secondaryCellGroup              OCTET STRING (CONTAINING CellGroupConfig)
OPTIONAL, -- Cond SCG
    measConfig                      MeasConfig
OPTIONAL, -- Need M
    lateNonCriticalExtension        OCTET STRING
OPTIONAL,
    nonCriticalExtension            RRCReconfiguration-v1530-IEs
OPTIONAL
}
```

[ . . . ]

RadioBearerConfig

The IE RadioBearerConfig is used to add, modify and release signalling, multicast MRBs and/or data radio bearers. Specifically, this IE carries the parameters for PDCP and, if applicable, SDAP entities for the radio bearers.

RadioBearerConfig Information Element

```
-- ASN1START
-- TAG-RADIOBEARERCONFIG-START
RadioBearerConfig ::=           SEQUENCE {
    srb-ToAddModList                SRB-ToAddModList
OPTIONAL,  -- Cond HO-Conn
    srb3-ToRelease                  ENUMERATED{true}
OPTIONAL,  -- Need N
    drb-ToAddModList                DRB-ToAddModList
OPTIONAL,  -- Cond HO-toNR
    drb-ToReleaseList               DRB-ToReleaseList
OPTIONAL,  -- Need N
    securityConfig                  SecurityConfig
```

```
OPTIONAL,    -- Need M
    ...,
    [[
    mrb-ToAddModList-r17        MRB-ToAddModList-r17
OPTIONAL,   -- Need N
    mrb-ToReleaseList-r17       MRB-ToReleaseList-r17
OPTIONAL,   -- Need N
    srb4-ToAddMod-r17           SRB-ToAddMod
OPTIONAL,   -- Need N
    srb4-ToRelease-r17          ENUMERATED{true}
OPTIONAL    -- Need N
    ]]
}
SRB-ToAddModList ::=            SEQUENCE (SIZE (1..2)) OF SRB-ToAddMod
SRN-ToAddModListExt-r17 ::=     SEQUENCE (SIZE (1)) OF SRB-ToAddMod
SRB-ToAddMod ::=                SEQUENCE {
    srb-Identity                    SRB-Identity,
    reestablishPDCP                 ENUMERATED{true}
OPTIONAL,   -- Need N
    discardOnPDCP                   ENUMERATED{true}
OPTIONAL,   -- Need N
    pdcp-Config                     PDCP-Config
OPTIONAL,   -- Cond PDCP
    ...,
    [[
    srb-Identity-v1700          SRB-Identity-v1700
OPTIONAL    -- Need M
    ]]
}
DRB-ToAddModList ::=            SEQUENCE (SIZE (1..maxDRB)) OF DRB-ToAddMod
DRB-ToAddMod ::=                SEQUENCE {
    cnAssociation                   CHOICE {
        eps-BearerIdentity              INTEGER (0..15),
        sdap-Config                     SDAP-Config
    }
OPTIONAL,   -- Cond DRBSetup
    drb-Identity                    DRB-Identity,
    reestablishPDCP                 ENUMERATED{true}
OPTIONAL,   -- Need N
    recoverPDCP                     ENUMERATED{true}
OPTIONAL,   -- Need N
    pdcp-Config                     PDCP-Config
OPTIONAL,   -- Cond PDCP
    ...,
    [[
    daps-Config-r16             ENUMERATED{true}
OPTIONAL    -- Cond DAPS
    ]]
}
DRB-ToReleaseList ::=           SEQUENCE (SIZE (1..maxDRB)) OF DRB-Identity
SecurityConfig ::=              SEQUENCE {
    securityAlgorithmConfig         SecurityAlgorithmConfig
OPTIONAL,   -- Cond RBTermChange1
    keyToUse                        ENUMERATED{master, secondary}
OPTIONAL,   -- Cond RBTermChange
    ...
}
MRB-ToAddModList-r17 ::=        SEQUENCE (SIZE (1..maxMRB-r17)) OF MRB-ToAddMod-r17
MRB-ToAddMod-r17 ::=            SEQUENCE {
    tmgi-r17                        TMGI-r17
OPTIONAL,   -- Cond MRBSetup
    mrb-Identity-r17                MRB-Identity-r17,
    mrb-IdentityNew-r17             MRB-Identity-r17
OPTIONAL,   -- Need N
    reestablishPDCP-r17             ENUMERATED{true}
OPTIONAL,   -- Need N
    recoverPDCP-r17                 ENUMERATED{true}
OPTIONAL,   -- Need N
    pdcp-Config-r17                 PDCP-Config
OPTIONAL,   -- Cond PDCP
    ...
}
MRB-ToReleaseList-r17 ::=       SEQUENCE (SIZE (1..maxMRB-r17)) OF MRB-Identity-r17
-- TAG-RADIOBEARERCONFIG-STOP
-- ASN1STOP
```

| DRB-ToAddMod and MRB-ToAddMod field descriptions |
|---|
| cnAssociation<br>Indicates if the bearer is associated with the eps-bearerIdentity (when connected to EPC) or sdap-Config (when connected to 5GC).<br>daps-Config<br>Indicates that the bearer is configured as DAPS bearer.<br>drb-Identity<br>In case of DC, the DRB identity is unique within the scope of the UE, i.e. an MCG DRB cannot use the same value as a split DRB. For a split DRB the same identity is used for the MCG and SCG parts of the configuration.<br>eps-BearerIdentity<br>The EPS bearer ID determines the EPS bearer.<br>mrb-Identity<br>Identification of the multicast MRB.<br>mrb-IdentityNew<br>New identity of the multicast MRB when mrb-Identity needs to be changed, e.g. as a result of a handover.<br>reestablishPDCP<br>Indicates that PDCP should be re-established. Network sets this to true whenever the security key used for this radio bearer changes. Key change could for example be due to termination point change for the bearer, reconfiguration with sync, resuming an RRC connection, or the first reconfiguration after reestablishment. It is also applicable for LTE procedures when NR PDCP is configured. Network doesn't include this field for DRB if the bearer is configured as DAPS bearer.<br>recoverPDCP<br>Indicates that PDCP should perform recovery according to TS 38.323 [5]. Network doesn't include this field if the bearer is configured as DAPS bearer.<br>sdap-Config<br>The SDAP configuration determines how to map QoS flows to DRBs when NR or E-UTRA connects to the 5GC and presence/absence of UL/DL SDAP headers.<br>tmgi<br>Indicates which MBS session the bearer is associated with. |

SDAP-Config

The IE SDAP-Config is used to set the configurable SDAP parameters for a data radio bearer. All configured instances of SDAP-Config with the same value of pdu-Session correspond to the same SDAP entity as specified in TS 37.324 [24].

SDAP-Config Information Element

```
-- ASN1START
-- TAG-SDAP-CONFIG-START
SDAP-Config ::=            SEQUENCE {
    pdu-Session                PDU-SessionID,
    sdap-HeaderDL              ENUMERATED {present, absent},
    sdap-HeaderUL              ENUMERATED {present, absent},
    defaultDRB                 BOOLEAN,
    mappedQoS-FlowsToAdd       SEQUENCE (SIZE (1..maxNrofQFIs)) OF QFI
OPTIONAL, -- Need N
    mappedQoS-FlowsToRelease   SEQUENCE (SIZE (1..maxNrofQFIs)) OF QFI
OPTIONAL, -- Need N
    ...
}
QFI ::=                    INTEGER (0..maxQFI)
PDU-SessionID ::=          INTEGER (0..255)
-- TAG-SDAP-CONFIG-STOP
-- ASN1STOP
```

| SDAP-Config field descriptions |
|---|
| defaultDRB<br>Indicates whether or not this is the default DRB for this PDU session. Among all configured instances of SDAP-Config with the same value of pdu-Session, this field shall be set to true in at most one instance of SDAP-Config and to false in all other instances.<br>mappedQoS-FlowsToAdd<br>Indicates the list of QFIs of UL QoS flows of the PDU session to be additionally mapped to this DRB. A QFI value can be included at most once in all configured instances of SDAP-Config with the same value of pdu-Session. For QoS flow remapping, the QFI value of the remapped QoS flow is only included in mappedQoS-FlowsToAdd in sdap-Config corresponding to the new DRB and not included in mappedQoS-FlowsToRelease in sdap-Config corresponding to the old DRB. |

-continued

| SDAP-Config field descriptions |
|---|
| mappedQoS-FlowsToRelease
Indicates the list of QFIs of QoS flows of the PDU session to be released from existing QoS flow to DRB mapping of this DRB.
pdu-Session
Identity of the PDU session whose QoS flows are mapped to the DRB.
sdap-HeaderUL
Indicates whether or not a SDAP header is present for UL data on this DRB. The field cannot be changed after a DRB is established. The network sets this field to present if the field defaultDRB is set to true.
sdap-HeaderDL
Indicates whether or not a SDAP header is present for DL data on this DRB. The field cannot be changed after a DRB is established. |

DRX-Config

The IE DRX-Config is used to configure DRX related parameters.

DRX-Config Information Element

```
-- ASN1START
-- TAG-DRX-CONFIG-START
DRX-Config ::=              SEQUENCE {
    drx-onDurationTimer         CHOICE {
                                    subMilliSeconds     INTEGER (1..31),
                                    milliSeconds        ENUMERATED {
                                        ms1, ms2, ms3, ms4, ms5, ms6, ms8, ms10, ms20,
ms30, ms40, ms50, ms60,
                                        ms80, ms100, ms200, ms300, ms400, ms500, ms600,
ms800, ms1000, ms1200,
                                        ms1600, spare8, spare7, spare6, spare5, spare4,
spare3, spare2, spare1 }
                                },
    drx-InactivityTimer         ENUMERATED {
                                    ms0, ms1, ms2, ms3, ms4, ms5, ms6, ms8, ms10, ms20,
ms30, ms40, ms50, ms60, ms80,
                                    ms100, ms200, ms300, ms500, ms750, ms1280, ms1920,
ms2560, spare9, spare8,
                                    spare7, spare6, spare5, spare4, spare3, spare2,
spare1},
    drx-HARQ-RTT-TimerDL        INTEGER (0..56),
    drx-HARQ-RTT-TimerUL        INTEGER (0..56),
    drx-RetransmissionTimerDL   ENUMERATED {
                                    sl0, sl1, sl2, sl4, sl6, sl8, sl16, sl24, sl33, sl40,
sl64, sl80, sl96, sl112, sl128,
                                    sl160, sl320, spare15, spare14, spare13, spare12,
spare11, spare10, spare9,
                                    spare8, spare7, spare6, spare5, spare4, spare3,
spare2, spare1},
    drx-ReransmissionTimeUL     EUNERATED {
                                    sl0, sl1, sl2, sl4, sl6, sl8, sl16, sl24, sl33, sl40,
sl64, sl80, sl96, sl112, sl128,
                                    sl160, sl320, spare15, spare14, spare13, spare12,
spare11, spare10, spare9,
                                    spare8, spare7, spare6, spare5, spare4, spare3,
spare2, spare1 },
    drx-LongCycleStartOffset    CHOICE {
        ms10                        INTEGER(0..9),
        ms20                        INTEGER(0..19),
        ms32                        INTEGER(0..31),
        ms40                        INTEGER(0..39),
        ms60                        INTEGER(0..59),
        ms64                        INTEGER(0..63),
        ms70                        INTEGER(0..69),
        ms80                        INTEGER(0..79),
        ms128                       INTEGER(0..127),
        ms160                       INTEGER(0..159),
        ms256                       INTEGER(0..255),
        ms320                       INTEGER(0..319),
        ms512                       INTEGER(0..511),
        ms640                       INTEGER(0..639),
        ms1024                      INTEGER(0..1023),
        ms1280                      INTEGER(0..1279),
        ms2048                      INTEGER(0..2047),
```

```
    ms2560                          INTEGER(0..2559),
    ms5120                          INTEGER(0..5119),
    ms10240                         INTEGER(0..10239)
  },
  shortDRX                          SEQUENCE {
    drx-ShortCycle                  ENUMERATED {
                                      ms2, ms3, ms4, ms5, ms6, ms7, ms8, ms10, ms14,
ms16, ms20, ms30, ms32,
                                      ms35, ms40, ms64, ms80, ms128, ms160, ms256,
ms320, ms512, ms640, spare9,
                                      spare8, spare7, spare6, spare5, spare4, spare3,
spare2, spare1 },
    drx-ShortCycleTimer             INTEGER (1..16)
  }
OPTIONAL,   -- Need R
  drx-SlotOffset                    INTEGER (0..31)
}
DRX-ConfigExt-v1700 ::=             SEQUENCE {
  drx-HARQ-RTT-TimerDL-r17          INTEGER (0..448),
  drx-HARQ-RTT-TimerUL-r17          INTEGER (0..448)
}
-- TAG-DRX-CONFIG-STOP
-- ASN1STOP
```

| DRX-Config field descriptions |
| --- |
| drx-HARQ-RTT-TimerDL<br>Value in number of symbols of the BWP where the transport block was received. drx-HARQ-RTT-TimerDL-r17 is only applicable for SCS 480 kHz and 960 kHz. If configured, the UE shall ignore drx-HARQ-RTT-TimerDL (without suffix).<br>drx-HARQ-RTT-TimerUL<br>Value in number of symbols of the BWP where the transport block was transmitted. drx-HARQ-RTT-TimerUL-r17 is only applicable for SCS 480 kHz and 960 kHz. If configured, the UE shall ignore drx-HARQ-RTT-TimerUL (without suffix).<br>drx-InactivityTimer<br>Value in multiple integers of 1 ms. ms0 corresponds to 0, ms1 corresponds to 1 ms, ms2 corresponds to 2 ms, and so on.<br>drx-LongCycleStartOffset<br>drx-LongCycle in ms and drx-StartOffset in multiples of 1 ms. If drx-ShortCycle is configured, the value of drx-LongCycle shall be a multiple of the drx-ShortCycle value.<br>drx-onDurationTimer<br>Value in multiples of 1/32 ms (subMilliSeconds) or in ms (milliSecond). For the latter, value ms1 corresponds to 1 ms, value ms2 corresponds to 2 ms, and so on.<br>drx-RetransmissionTimerDL<br>Value in number of slot lengths of the BWP where the transport block was received. value sl0 corresponds to 0 slots, s/1 corresponds to 1 slot, s/2 corresponds to 2 slots, and so on.<br>drx-RetransmissionTimerUL<br>Value in number of slot lengths of the BWP where the transport block was transmitted. sl0 corresponds to 0 slots, sl1 corresponds to 1 slot, s/2 corresponds to 2 slots, and so on.<br>drx-ShortCycleTimer<br>Value in multiples of drx-ShortCycle. A value of 1 corresponds to drx-ShortCycle, a value of 2 corresponds to 2 * drx-ShortCycle and so on.<br>drx-ShortCycle<br>Value in ms. ms1 corresponds to 1 ms, ms2 corresponds to 2 ms, and so on.<br>drx-SlotOffset<br>Value in 1/32 ms. Value 0 corresponds to 0 ms, value 1 corresponds to 1/32 ms, value 2 corresponds to 2/32 ms, and so on. |

PDCP-Config

The IE PDCP-Config is used to set the configurable PDCP parameters for signalling, MBS multicast and data radio bearers.

PDCP-Config Information Element

```
-- ASN1START
-- TAG-PDCP-CONFIG-START
PDCP-Config ::=             SEQUENCE {
  drb                       SEQUENCE {
    discardTimer            ENUMERATED {ms10, ms20, ms30, ms40, ms50, ms60, ms75, ms100,
ms150, ms200,
                                        ms250, ms300, ms500, ms750, ms1500, infinity}
```

```
                                        OPTIONAL, -- Cond Setup
    pdcp-SN-SizeUL              ENUMERATED {len12bits, len18bits}
                                        OPTIONAL, -- Cond Setup1
    pdcp-SN-SizeDL              ENUMERATED {len12bits, len18bits}
                                        OPTIONAL, -- Cond Setup2
    headerCompression           CHOICE {
            notUsed                     NULL,
            rohc                        SEQUENCE {
                maxCID                      INTEGER (1..16383)
DEFAULT 15,
                profiles                    SEQUENCE {
                    profile0x0001               BOOLEAN,
                    profile0x0002               BOOLEAN,
                    profile0x0003               BOOLEAN,
                    profile0x0004               BOOLEAN,
                    profile0x0006               BOOLEAN,
                    profile0x0101               BOOLEAN,
                    profile0x0102               BOOLEAN,
                    profile0x0103               BOOLEAN,
                    profile0x0104               BOOLEAN
                },
                drb-ContinueROHC            ENUMERATED { true }
OPTIONAL       -- Need N
            },
            uplinkOnlyROHC      SEQUENCE {
                maxCID                      INTEGER (1..16383)
Default 15,
                profiles                    SEQUENCE {
                    profile0x0006               BOOLEAN
                },
                drb-ContinueROHC            ENUMERATED { true }
OPTIONAL       -- Need N
            },
            ...
        },
        integrityProtection         ENUMBERATED { enabled }
OPTIONAL,           -- Cond ConnectedTo5GC1
        statusReportRequired        ENUMBERATED { true }
OPTIONAL,           -- Cond Rlc-AM-UM
        outOfOrderDelivery          ENUMBERATED { true }
OPTIONAL        -- Need R
    }
OPTIONAL,           -- Cond DRB
    moreThanOneRLC          SEQUENCE {
        primaryPath             SEQUENCE {
                cellGroup                   CellGroupId
OPTIONAL,           -- Need R
                logicalChannel              LogicalChannelIdentity
OPTIONAL        -- Need R
        },
        ul-DataSplitThreshold       UL-DataSplitThreshold
OPTIONAL,           -- Cond SplitBearer
        pdcp-Duplication            BOOLEAN
OPTIONAL        -- Need R
    }
OPTIONAL,           -- Cond MoreThanOneRLC
    t-Reordering                ENUMERATED {
                                    ms0, ms1, ms2, ms4, ms5, ms8, ms10, ms15, ms20, ms30, ms40,
                                    ms50, ms60, ms80, ms100, ms120, ms140, ms160, ms180, ms200,
ms220,
                                    ms240, ms260, ms280, ms300, ms500, ms750, ms1000, ms1250,
                                    ms1500, ms1750, ms2000, ms2250, ms2500, ms2750,
                                    ms3000, spare28, spare27, spare26, spare25, spare24,
                                    spare23, spare22, spare21, spare20,
                                    spare19, spare18, spare17, spare16, spare15, spare14,
                                    spare13, spare12, spare11, spare10, spare09,
                                    spare08, spare07, spare06, spare05, spare04, spare03,
                                    spare02, spare01 }
OPTIONAL, -- Need S
    ...,
    [[
    cipheringDisabled           ENUMERATED {true}
OPTIONAL            -- Cond ConnectedTo5GC
    ]],
    [[
    discardTimerExt-r16         SetupRelease { DiscardTimerExt-r16 }
OPTIONAL,           -- Cond DRB2
    moreThanTwoRLC-DRB-r16  SEQUENCE {
        splitSecondaryPath-r16      LogicalChannelIdentity
```

```
OPTIONAL,            -- Cond SplitBearer2
    duplicationState-r16              SEQUENCE (SIZE (3)) OF BOOLEAN
OPTIONAL            -- Need S
  }
OPTIONAL,            -- Cond MoreThanTwoRLC-DRB
    ethernetHeaderCompression-r16     SetupRelease { EthernetHeaderCompression-r16 }
OPTIONAL            -- Need M
]],
[[
survivalTimeStateSupport-r17          ENUMERATED {true}
OPTIONAL,            -- Cond Drb-Duplication
uplinkDataCompression-r17             SetupRelease { UplinkDataCompression-r17 }
OPTIONAL,            -- Cond Rlc-AM
discardTimerExt2-r17                  SetupRelease { DiscardTimerExt2-r17 }
OPTIONAL,            -- Need M
multicastHFN-AndRefSN-r17             BIT STRING (SIZE (32))
OPTIONAL            -- Cond SetuponlyMRB
]]
}
EthernetHeaderCompression-r16 ::=     SEQUENCE {
    ehc-Common-r16                        SEQUENCE {
        ehc-CID-Length-r16                    ENUMERATED { bits7, bits15 },
        ...
    },
    ehc-Downlink-r16                      SEQUENCE {
        drb-ContinueEHC-DL-r16                ENUMERATED { true }
OPTIONAL,            -- Need N
        ...
    }
OPTIONAL,            -- Need M
    ehc-Uplink-r16                        SEQUENCE {
        maxCID-EHC-UL-r16                     INTEGER (1..32767),
        drb-ContinueEHC-UL-r16                ENUMERATED { true }
OPTIONAL,            -- Need N
        ...
    }
OPTIONAL            -- Need M
}
UL-DataSplitThreshold ::= ENUMERATED {
                                      b0, b100, b200, b400, b800, b1600, b3200, b6400,
b12800, b25600, b51200, b102400, b204800,
                                      b409600, b819200, b1228800, b1638400, b2457600,
b3276800, b4096000, b4915200, b5734400,
                                      b6553600, infinity, spare8, spare7, spare6, spare5,
spare4, spare3, spare2, spare1}
DiscardTimerExt-r16 ::= ENUMERATED {ms0dot5, ms1, ms2, ms4, ms6, ms8, spare2, spare1}
DiscardTimerExt2-r17 ::= ENUMERATED {ms2000, spare3, spare2, spare1}
UplinkDataCompression-r17 ::= CHOICE {
    newSetup                              SEQUENCE {
        bufferSize-r17                        ENUMERATED {kbyte2, kbyte4, kbyte8, spare1},
        dictionary-r17                        ENUMERATED {sip-SDP, operator}
OPTIONAL            -- Need N
    },
    drb-ContinueUDC-r17                   ENUMERATED { true }
}
-- TAG-PDCP-CONFIG-STOP
-- ASN1STOP
```

| PDCP-Config field descriptions |
|---|
| cipheringDisabled |
| If included, ciphering is disabled for this DRB regardless of which ciphering algorithm is configured for the SRB/DRBs. The field may only be included if the UE is connected to 5GC. Otherwise the field is absent. The network configures all DRBs with the same PDU-session ID with same value for this field. The value for this field cannot be changed after the DRB is set up. |
| discardTimer |
| Value in ms of discardTimer specified in TS 38.323 [5]. Value ms10 corresponds to 10 ms, value ms20 corresponds to 20 ms and so on. The value for this field cannot be changed in case of reconfiguration with sync, if the bearer is configured as DAPS bearer. |
| discardTimerExt |
| Value in ms of discardTimer specified in TS 38.323 [5]. Value ms0dot5 corresponds to 0.5 ms, value ms1 corresponds to 1 ms and so on. If this field is present, the field discardTimer is ignored and discardTimerExt is used instead. |

| PDCP-Config field descriptions |
| --- | discardTimerExt2
Value in ms of discardTimerExt2 specified in TS 38.323 [5]. Value ms2000 corresponds to
2000 ms. If this field is present, the field discardTimer and discardTimerExt are ignored and
discardTimerExt2 is used instead.
drb-ContinueROHC
Indicates whether the PDCP entity continues or resets the ROHC header compression
protocol during PDCP re-establishment, as specified in TS 38.323 [5]. This field is configured
only in case of resuming an RRC connection or reconfiguration with sync, where the PDCP
termination point is not changed and the fullConfig is not indicated. The network does not
include the field if the bearer is configured as DAPS bearer. This field can be configured for
both DRB and multicast MRB.
duplicationState
This field indicates the uplink PDCP duplication state for the associated RLC entities at the
time of receiving this IE. If set to true, the PDCP duplication state is activated for the
associated RLC entity. The index for the indication is determined by ascending order of logical
channel ID of all RLC entities other than the primary RLC entity indicated by primaryPath in
the order of MCG and SCG, as in clause 6.1.3.32 of TS 38.321 [3]. If the number of associated
RLC entities other than the primary RLC entity is two, UE ignores the value in the largest
index of this field. If the field is absent, the PDCP duplication states are deactivated for all
associated RLC entities.
ethernetHeaderCompression
This fields configures Ethernet Header Compression. This field can only be configured for a bi-
directional DRB or a bi-directional multicast MRB. The network reconfigures
ethernetHeaderCompression only upon reconfiguration involving PDCP re-establishment and
with neither drb-ContinueEHC-DL nor drb-ContinueEHC-UL configured. Network only
configures this field when uplinkDataCompression is not configured.
headerCompression
If rohc is configured, the UE shall apply the configured ROHC profile(s) in both uplink and
downlink. If uplinkOnlyROHC is configured, the UE shall apply the configured ROHC profile(s)
in uplink (there is no header compression in downlink). ROHC can be configured for any
bearer type. ROHC and EHC can be both configured simultaneously for a DRB or a multicast
MRB. The network reconfigures headerCompression only upon reconfiguration involving
PDCP re-establishment, and without any drb-ContinueROHC. Network configures
headerCompression to notUsed when outOfOrderDelivery is configured. Network only
configures this field when uplinkDataCompression is not configured.
integrityProtection
Indicates whether or not integrity protection is configured for this radio bearer. The network
configures all DRBs with the same PDU-session ID with same value for this field. The value for
this field cannot be changed after the DRB is set up.
maxCID
Indicates the value of the MAX_CID parameter as specified in TS 38.323 [5].
The total value of MAX_CIDs across all bearers for the UE should be less than or equal to the
value of maxNumberROHC-ContextSessions parameter as indicated by the UE.
moreThanOneRLC
This field configures UL data transmission when more than one RLC entity is associated with
the PDCP entity. This field is not present if the bearer is configured as DAPS bearer.
moreThanTwoRLC-DRB
This field configures UL data transmission when more than two RLC entities are associated
with the PDCP entity for DRBs.
multicastHFN-AndRefSN
Indicates the initial value of HFN and referrence PDCP SN associated to this HFN for multicast
MRB PDCP window initialization as specified in TS 38.323 [5]. The value is composed of a
HFN(MSBs) and the PDCP SN(LSBs). The size of the HFN part in bits is equal to 32 minus the
length of the PDCP SN configured in pdcp-SN-SizeDL.
outOfOrderDelivery
Indicates whether or not outOfOrderDelivery specified in TS 38.323 [5] is configured. This
field should be either always present or always absent, after the radio bearer is established.
pdcp-Duplication
Indicates whether or not uplink duplication status at the time of receiving this IE is configured
and activated as specified in TS 38.323 [5]. The presence of this field indicates that
duplication is configured. PDCP duplication is not configured for CA packet duplication of LTE
RLC bearer. The value of this field, when the field is present, indicates the state of the
duplication at the time of receiving this IE. If set to true, duplication is activated. The value of
this field is always true, when configured for a SRB. For PDCP entity with more than two
associated RLC entities for UL transmission, this field is always present. If the field
moreThanTwoRLC-DRB is present, the value of this field is ignored and the state of the
duplication is indicated by duplicationState. For PDCP entity with more than two associated
RLC entities, only NR RLC bearer is supported.
pdcp-SN-SizeDL
PDCP sequence number size for downlink, 12 or 18 bits, as specified in TS 38.323 [5]. For SRBs
only the value len12bits is applicable. The value for this field cannot be changed in case of
reconfiguration with sync, if the bearer is configured as DAPS bearer.
pdcp-SN-SizeUL
PDCP sequence number size for uplink, 12 or 18 bits, as specified in TS 38.323 [5]. For SRBs
only the value len12bits is applicable. The value for this field cannot be changed in case of
reconfiguration with sync, if the bearer is configured as DAPS bearer.

| PDCP-Config field descriptions |
|---|
| primaryPath<br>Indicates the cell group ID and LCID of the primary RLC entity as specified in TS 38.323 [5], clause 5.2.1 for UL data transmission when more than one RLC entity is associated with the PDCP entity. In this version of the specification, only cell group ID corresponding to MCG is supported for SRBs, except for the SRB2 of the IAB-MT, and, when the SCG is deactivated, for DRBs. The NW indicates cellGroup for split bearers using logical channels in different cell groups. The NW always indicates logicalChannel if CA based PDCP duplication is configured in the cell group indicated by cellGroup of this field.<br>splitSecondaryPath<br>Indicates the LCID of the split secondary RLC entity as specified in TS 38.323 [5] for fallback to split bearer operation when UL data transmission with more than two RLC entities is associated with the PDCP entity. This RLC entity belongs to a cell group that is different from the cell group indicated by cellGroup in the field primaryPath.<br>statusReportRequired<br>For AM DRBs, AM MRBs and DAPS UM DRBs, indicates whether the DRB or the multicast MRB is configured to send a PDCP status report in the uplink, as specified in TS 38.323 [5]. For DAPS AM DRBs, it also indicates whether the DRB is configured to send a second PDCP status report in the uplink, as specified in TS 38.323 [5].<br>survivalTimeStateSupport<br>Indicates whether the DRB associated with this PDCP entity has survival time state support. If this field is configured to be true, all associated RLC entities are activated for PDCP duplication upon reception of a retransmission grant, as specified in TS 38.321 [3].<br>t-Reordering<br>Value in ms of t-Reordering specified in TS 38.323 [5]. Value ms0 corresponds to 0 ms, value ms20 corresponds to 20 ms, value ms40 corresponds to 40 ms, and so on. When the field is absent the UE applies the value infinity. The value for this field cannot be changed in case of reconfiguration with sync, if the bearer is configured as DAPS bearer.<br>ul-DataSplitThreshold<br>Parameter specified in TS 38.323 [5]. Value b0 corresponds to 0 bytes, value b100 corresponds to 100 bytes, value b200 corresponds to 200 bytes, and so on. The network sets this field to infinity for UEs not supporting splitDRB-withUL-Both-MCG-SCG and when the SCG is deactivated. If the field is absent when the split bearer is configured for the radio bearer first time, then the default value infinity is applied.<br>uplinkDataCompression<br>Indicates the UDC configuration that the UE shall apply. Network does not configure uplinkDataCompression for a DRB, if headerCompression or ethernetHeaderCompression is already configured or outOfOrderDelivery or DAPS is configured for the DRB. The maximum number of DRBs where uplinkDataCompression can be applied is two. The network reconfigures uplinkDataCompression only upon reconfiguration involving PDCP re-establishment, and without any drb-ContinueUDC. |

3GPP TS 37.324 States:
4.2.2 SDAP Entities

The SDAP entities are located in the SDAP sublayer. Several SDAP entities may be defined for a UE. There is an SDAP entity configured for each individual PDU session or MBS session for NR Uu. For NR sidelink, SDAP entity is configured per Destination Layer-2 ID and cast type in the UE.

An SDAP entity receives/delivers SDAP SDUs from/to upper layers and submits/receives SDAP data PDUs to/from its peer SDAP entity via lower layers.

- At the transmitting side, when an SDAP entity receives an SDAP SDU from upper layers, it constructs the corresponding SDAP data PDU and submits it to lower layers;
- At the receiving side, when an SDAP entity receives an SDAP data PDU from lower layers, it retrieves the corresponding SDAP SDU and delivers it to upper layers.

FIG. 4.2.2-1 illustrates the functional view of the SDAP entity for the SDAP sublayer; it should not restrict implementation. The figure is based on the radio interface protocol architecture defined in TS 38.300 [2].
[FIG. 4.2.2-1 of 3GPP TS 37.324 V17.0.0, Entitled "SDAP Layer, Functional View", is Reproduced as FIG. 6]

Reflective QoS flow to DRB mapping is performed at UE, as specified in the clause 5.3.2, if DL SDAP header is configured.

Reflective QoS flow to MRB mapping is not supported. There is no SDAP header for MRB. For NR sidelink communication, reflective PC5 QoS flow to SL-DRB mapping is not supported.
[ . . . ]
5.2 Data Transfer
5.2.1 Uplink At the reception of an SDAP SDU from upper layer for a QoS flow, the transmitting SDAP entity shall:
- if there is no stored QoS flow to DRB mapping rule for the QoS flow as specified in the clause 5.3:
  - map the SDAP SDU to the default DRB;
- else:
  - map the SDAP SDU to the DRB according to the stored QoS flow to DRB mapping rule;
- if the DRB to which the SDAP SDU is mapped is configured by RRC (TS 38.331 [3]) with the presence of SDAP header,
  - construct the UL SDAP data PDU as specified in the clause 6.2.2.3;
- else:
  - construct the UL SDAP data PDU as specified in the clause 6.2.2.1;
- submit the constructed UL SDAP data PDU to the lower layers.
- NOTE 1: UE behaviour is not defined if there is neither a default DRB nor a stored QoS flow to DRB mapping rule for the QoS flow.

NOTE 2: Default DRB is always configured with UL SDAP header (TS 38.331 [3]).

5.2.2 Downlink

At the reception of an SDAP data PDU from lower layers for a QoS flow, the receiving SDAP entity shall:
if this SDAP data PDU is received from an MRB:
retrieve the SDAP SDU from the DL SDAP data PDU as specified in the clause 6.2.2.1.
if the DRB from which this SDAP data PDU is received is configured by RRC (TS 38.331 [3]) with the presence of SDAP header:
perform reflective QoS flow to DRB mapping as specified in the clause 5.3.2;
perform RQI handling as specified in the clause 5.4;
retrieve the SDAP SDU from the DL SDAP data PDU as specified in the clause 6.2.2.2.
else:
retrieve the SDAP SDU from the DL SDAP data PDU as specified in the clause 6.2.2.1;
deliver the retrieved SDAP SDU to the upper layer.

[ . . . ]

5.3 QoS Flow to DRB Mapping 5.3.1 Configuration

When RRC (TS 38.331 [3]) configures an UL QoS flow to DRB mapping rule for a QoS flow, the SDAP entity shall:
if the SDAP entity has already been established and there is no stored QoS flow to DRB mapping rule for the QoS flow and a default DRB is configured:
construct an end-marker control PDU, as specified in the clause 6.2.3, for the QoS flow;
map the end-marker control PDU to the default DRB;
submit the end-marker control PDU to the lower layers.
if the stored UL QoS flow to DRB mapping rule is different from the configured QoS flow to DRB mapping rule for the QoS flow and the DRB according to the stored QoS flow to DRB mapping rule is configured by RRC (TS 38.331 [3]) with the presence of UL SDAP header:
construct an end-marker control PDU, as specified in the clause 6.2.3, for the QoS flow;
map the end-marker control PDU to the DRB according to the stored QoS flow to DRB mapping rule;
submit the end-marker control PDU to the lower layers.
store the configured UL QoS flow to DRB mapping rule for the QoS flow.

When RRC (TS 38.331 [3]) releases an UL QoS flow to DRB mapping rule for a QoS flow, the SDAP entity shall:
remove the UL QoS flow to DRB mapping rule for the QoS flow.

5.3.2 Reflective Mapping

For each received DL SDAP data PDU with RDI set to 1, the SDAP entity shall:
process the QFI field in the SDAP header and determine the QoS flow;
if there is no stored QoS flow to DRB mapping rule for the QoS flow and a default DRB is configured:
construct an end-marker control PDU, as specified in the clause 6.2.3, for the QoS flow;
map the end-marker control PDU to the default DRB;
submit the end-marker control PDU to the lower layers;
if the stored QoS flow to DRB mapping rule for the QoS flow is different from the QoS flow to DRB mapping of the DL SDAP data PDU and the DRB according to the stored QoS flow to DRB mapping rule is configured by RRC (TS 38.331 [3]) with the presence of UL SDAP header:
construct an end-marker control PDU, as specified in the clause 6.2.3, for the QoS flow;
map the end-marker control PDU to the DRB according to the stored QoS flow to DRB mapping rule;
submit the end-marker control PDU to the lower layers;
store the QoS flow to DRB mapping of the DL SDAP data PDU as the QoS flow to DRB mapping rule for the UL.

5.3.3 DRB Release

When RRC (TS 38.331 [3]) indicates that a DRB is released, the SDAP entity shall:
remove all QoS flow to DRB mappings associated with the released DRB based on the clauses 5.3.1 and 5.3.2.

5.4 RQI Handling

For each received DL SDAP data PDU with RQI set to 1, the SDAP entity shall:
inform the NAS layer of the RQI and QFI.

[ . . . ]

6.1 Protocol Data Units 6.1.1 Data PDU

The SDAP Data PDU is used to convey one or more of followings:
SDAP header;
user plane data.

6.1.2 Control PDU a) End-Marker Control PDU

End-Marker control PDU is used by the SDAP entity at UE to indicate that it stops the mapping of the SDAP SDU of the QoS flow indicated by the QFI/PQFI to the DRB/SL-DRB on which the End-Marker control PDU is transmitted.

6.2 Formats 6.2.1 General

A SDAP PDU is a bit string that is byte aligned (i.e. multiple of 8 bits) in length. In the figures in clause 6.2, bit strings are represented by tables in which the first and most significant bit is the left most bit of the first line of the table, the last and least significant bit is the rightmost bit of the last line of the table, and more generally the bit string is to be read from left to right and then in the reading order of the lines.

SDAP SDUs are bit strings that are byte aligned (i.e. multiple of 8 bits) in length. An SDAP SDU is included into a SDAP PDU from the first bit onward.

For groupcast and broadcast of NR sidelink communication, only SDAP data PDU without SDAP header is supported.

6.2.2 Data PDU 6.2.2.1 Data PDU without SDAP Header

Figure 6:
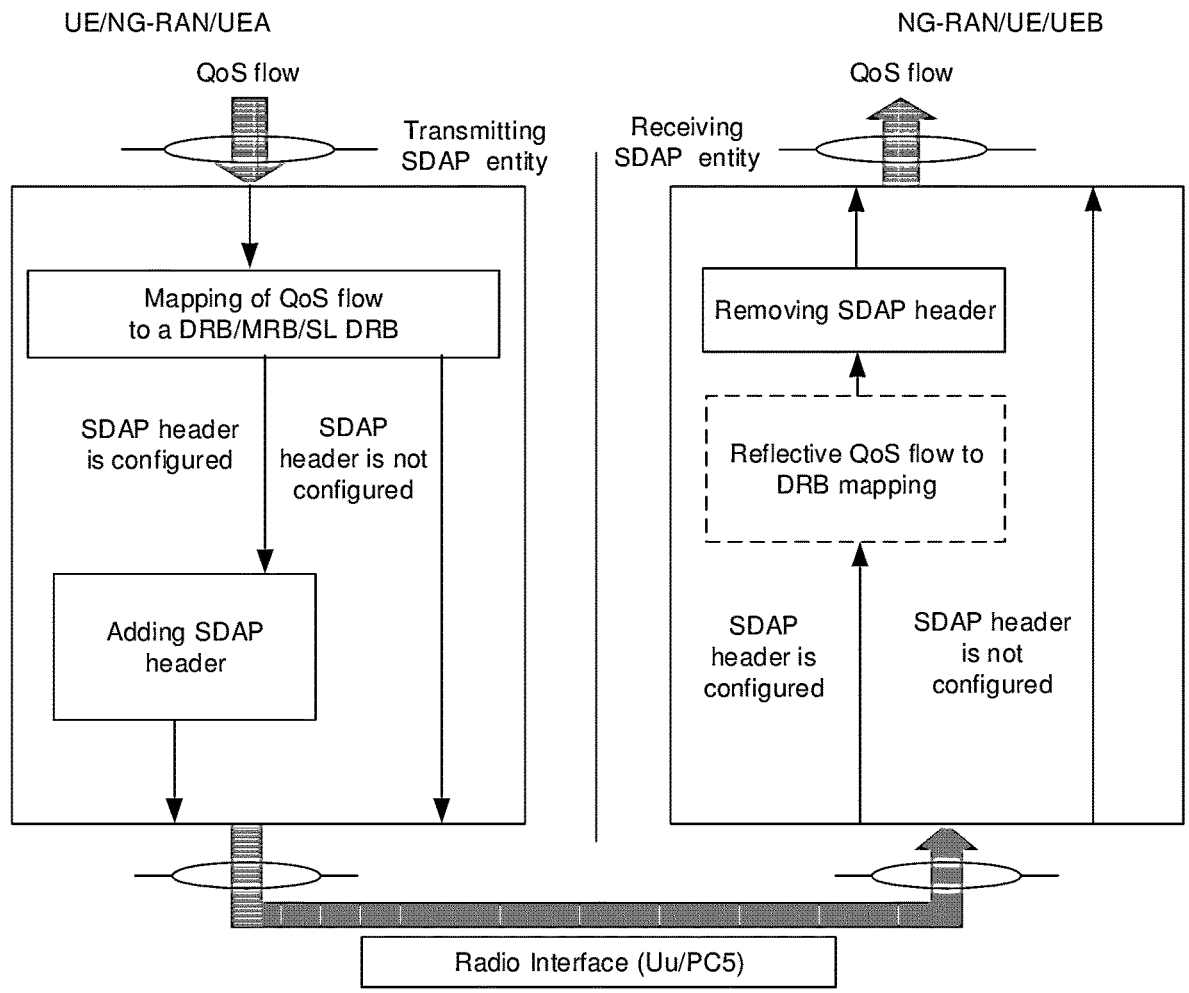
FIG. 6 is a reproduction of FIG. 4.2.2-1 of 3GPP TS 37.324 V17.0.0.

An SDAP PDU consists only of a data field and does not consist of any SDAP header, as described in FIG. 6.2.2.1-1.

Figure 7:
FIG. 7 is a reproduction of FIG. 6.2.2.1-1 of 3GPP TS 37.324 V17.0.0.

[FIG. 6.2.2.1-1 of 3GPP TS 37.324 V17.0.0, Entitled "SDAP Data PDU Format without SDAP Header", is Reproduced as FIG. 7]

6.2.2.2 DL Data PDU with SDAP Header

FIGS. 6.2.2.2-1 shows the format of SDAP Data PDU of DL with SDAP header being configured.

Figure 8:
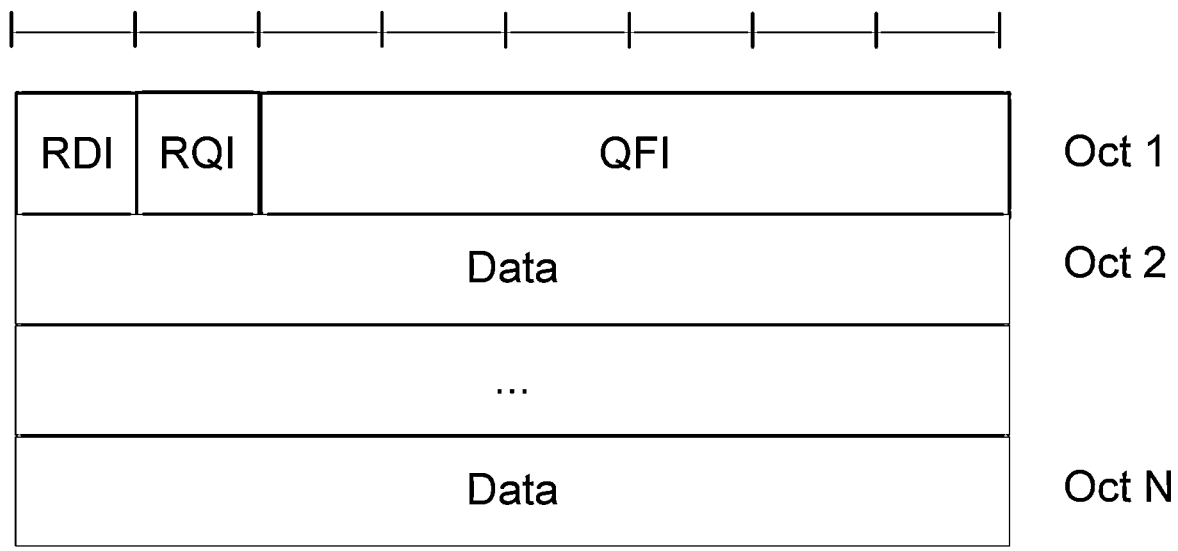
FIG. 8 is a reproduction of FIG. 6.2.2.2-1 of 3GPP TS 37.324 V17.0.0.

[FIG. 6.2.2.2-1 of 3GPP TS 37.324 V17.0.0, Entitled "DL SDAP Data PDU Format with SDAP Header", is Reproduced as FIG. 8]

6.2.2.3 UL Data PDU with SDAP Header

FIGS. 6.2.2.3-1 shows the format of SDAP Data PDU of UL with SDAP header being configured.

Figure 9:
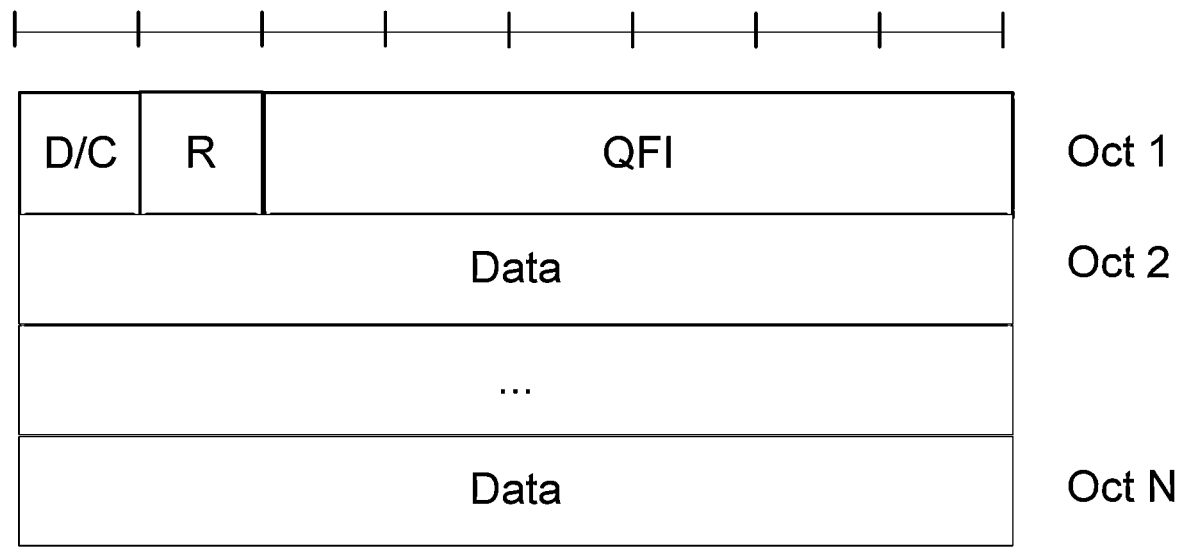
FIG. 9 is a reproduction of FIG. 6.2.2.3-1 of 3GPP TS 37.324 V17.0.0.

[FIG. 6.2.2.3-1 of 3GPP TS 37.324 V17.0.0, Entitled "UL SDAP Data PDU Format with SDAP Header", is Reproduced as FIG. 9]

[ . . . ]

6.2.3 End-Marker Control PDU

FIG. 6.2.3-1 shows the format of End-Marker Control PDU.

Figure 10:
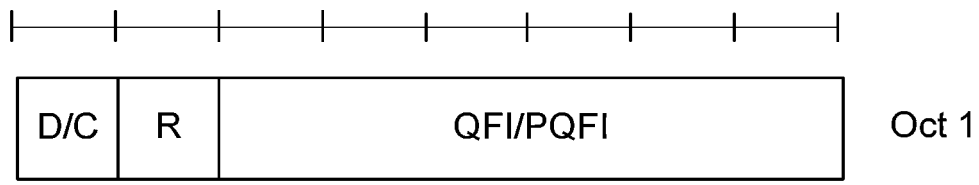
FIG. 10 is a reproduction of FIG. 6.2.3-1 of 3GPP TS 37.324 V17.0.0.

[FIG. 6.2.3-1 of 3GPP TS 37.324 V17.0.0, Entitled "End-Marker Control PDU", is Reproduced as FIG. 10]

6.3 Parameters

6.3.1 General

If not otherwise mentioned in the definition of each field, then the bits in the parameters shall be interpreted as follows: the left most bit is the first and most significant bit and the right most bit is the last and least significant bit.

Unless otherwise mentioned, integers are encoded in standard binary encoding for unsigned integers. In all cases the bits appear ordered from MSB to LSB when read in the PDU.

6.3.2 Data

Length: Variable

This field includes the SDAP SDU.

6.3.3 D/C

Length: 1 bit,

The D/C bit indicates whether the SDAP PDU is an SDAP Data PDU or an SDAP Control PDU.

[Table 6.3.3-1 of 3GPP TS 37.324 V17.0.0, Entitled "D/C Field", is Reproduced as FIG. 11]

6.3.4 QFI

Length: 6 bits

The QFI field indicates the ID of the QoS flow (TS 23.501 [4]) to which the SDAP PDU belongs.

6.3.5 R

Length: 1 bit

Reserved. In this version of the specification reserved bits shall be set to 0. Reserved bits shall be ignored by the receiver.

6.3.6 RQI

Length: 1 bit,

The RQI bit indicates whether NAS should be informed of the updated of SDF to QoS flow mapping rules (TS 23.501 [4]).

[Table 6.3.6-1 of 3GPP TS 37.324 V17.0.0, Entitled "RQI Field", is Reproduced as FIG. 12]

6.3.7 RDI

Length: 1 bit,

The RDI bit indicates whether QoS flow to DRB mapping rule should be updated.

[Table 6.3.7-1 of 3GPP TS 37.324 V17.0.0, Entitled "RDI Field", is Reproduced as FIG. 13]

3GPP TS 38.323 states:

4.2.2 PDCP Entities

The PDCP entities are located in the PDCP sublayer. Several PDCP entities may be defined for a UE. Each PDCP entity is carrying the data of one radio bearer. A PDCP entity is associated either to the control plane or the user plane depending on which radio bearer it is carrying data for.

[ . . . ]

5.2.1 Transmit Operation

At reception of a PDCP SDU from upper layers, the transmitting PDCP entity shall:

start the discardTimer associated with this PDCP SDU (if configured).

For a PDCP SDU received from upper layers, the transmitting PDCP entity shall:

associate the COUNT value corresponding to TX_NEXT to this PDCP SDU;

NOTE 1: Associating more than half of the PDCP SN space of contiguous PDCP SDUs with PDCP SNs, when e.g., the PDCP SDUs are discarded or transmitted without acknowledgement, may cause HFN desynchronization problem. How to prevent HFN desynchronization problem is left up to UE implementation.

perform header compression of the PDCP SDU using ROHC as specified in the clause 5.7.4 and/or using EHC as specified in the clause 5.12.4;

perform uplink data compression of the PDCP SDU as specified in clause 5.14.4;

perform integrity protection, and ciphering using the TX_NEXT as specified in the clause 5.9 and 5.8, respectively;

set the PDCP SN of the PDCP Data PDU to TX_NEXT modulo $2^{[pdcp\text{-}SN\text{-}SizeUL]}$;

increment TX_NEXT by one;

submit the resulting PDCP Data PDU to lower layer as specified below.

When submitting a PDCP PDU to lower layer, the transmitting PDCP entity shall:

if the transmitting PDCP entity is associated with one RLC entity:
  submit the PDCP PDU to the associated RLC entity;
else, if the transmitting PDCP entity is associated with at least two RLC entities:
  if the PDCP duplication is activated for the RB:
    if the PDCP PDU is a PDCP Data PDU:
      duplicate the PDCP Data PDU and submit the PDCP Data PDU to the associated RLC entities activated for PDCP duplication;
    else:
      submit the PDCP Control PDU to the primary RLC entity;
  else (i.e. the PDCP duplication is deactivated for the RB or the RB is a DAPS bearer):
    if the split secondary RLC entity is configured; and
    if the total amount of PDCP data volume and RLC data volume pending for initial transmission (as specified in TS 38.322 [5]) in the primary RLC entity and the split secondary RLC entity is equal to or larger than ul-DataSplitThreshold:
      submit the PDCP PDU to either the primary RLC entity or the split secondary RLC entity;
    else, if the transmitting PDCP entity is associated with the DAPS bearer:
      if the uplink data switching has not been requested:
        submit the PDCP PDU to the RLC entity associated with the source cell;
      else:
        if the PDCP PDU is a PDCP Data PDU:
        submit the PDCP Data PDU to the RLC entity associated with the target cell;
        else:
        if the PDCP Control PDU is associated with source cell:
          submit the PDCP Control PDU to the RLC entity associated with the source cell;
        else:
          submit the PDCP Control PDU to the RLC entity associated with the target cell;
    else:
      submit the PDCP PDU to the primary RLC entity.

NOTE 2: If the transmitting PDCP entity is associated with two RLC entities, the UE should minimize the amount of PDCP PDUs submitted to lower layers before receiving request from lower layers and minimize the PDCP SN gap between PDCP PDUs submitted to two associated RLC entities to minimize PDCP reordering delay in the receiving PDCP entity.

5.2.2 Receive Operation 5.2.2.1 Actions when a PDCP Data PDU is Received from Lower Layers In this clause, following definitions are used:

HFN (State Variable): the HFN part (i.e. the number of most significant bits equal to HFN length) of the State Variable;

SN (State Variable): the SN part (i.e. the number of least significant bits equal to PDCP SN length) of the State Variable;

RCVD_SN: the PDCP SN of the received PDCP Data PDU, included in the PDU header;

RCVD_HFN: the HFN of the received PDCP Data PDU, calculated by the receiving PDCP entity;

RCVD_COUNT: the COUNT of the received PDCP Data PDU=[RCVD_HFN, RCVD_SN].

At reception of a PDCP Data PDU from lower layers, the receiving PDCP entity shall determine the COUNT value of the received PDCP Data PDU, i.e. RCVD_COUNT, as follows:

if RCVD_SN<SN(RX_DELIV)–Window_Size:
　RCVD_HFN=HFN(RX_DELIV)+1.
else if RCVD_SN>=SN (RX_DELIV)+Window_Size:
　RCVD_HFN=HFN (RX_DELIV)–1.
else:
　RCVD_HFN=HFN (RX_DELIV);
RCVD_COUNT=[RCVD_HFN, RCVD_SN].

After determining the COUNT value of the received PDCP Data PDU=RCVD_COUNT, the receiving PDCP entity shall:

perform deciphering and integrity verification of the PDCP Data PDU using COUNT=RCVD_COUNT;
　if integrity verification fails:
　　indicate the integrity verification failure to upper layer;
　　discard the PDCP Data PDU and consider it as not received;
　if RCVD_COUNT<RX_DELIV; or
　if the PDCP Data PDU with COUNT=RCVD_COUNT has been received before:
　　discard the PDCP Data PDU;
If the received PDCP Data PDU with COUNT value=RCVD_COUNT is not discarded above, the receiving PDCP entity shall:
store the resulting PDCP SDU in the reception buffer;
if RCVD_COUNT>=RX_NEXT:
　update RX_NEXT to RCVD_COUNT+1.
if outOfOrderDelivery is configured:
　deliver the resulting PDCP SDU to upper layers after performing header decompression using EHC.
if RCVD_COUNT=RX_DELIV:
　deliver to upper layers in ascending order of the associated COUNT value after performing header decompression, if not decompressed before;
　　all stored PDCP SDU(s) with consecutively associated COUNT value(s) starting from COUNT=RX_DELIV;
　update RX_DELIV to the COUNT value of the first PDCP SDU which has not been delivered to upper layers, with COUNT value>RX_DELIV;
if t-Reordering is running, and if RX_DELIV>=RX_REORD:
　stop and reset t-Reordering.
if t-Reordering is not running (includes the case when t-Reordering is stopped due to actions above), and RX_DELIV<RX_NEXT:
　update RX_REORD to RX_NEXT;
　start t-Reordering.

5.2.2.2 Actions when a t-Reordering Expires

When t-Reordering expires, the receiving PDCP entity shall:

deliver to upper layers in ascending order of the associated COUNT value after performing header decompression, if not decompressed before:
　all stored PDCP SDU(s) with associated COUNT value (s)<RX_REORD;
　all stored PDCP SDU(s) with consecutively associated COUNT value(s) starting from RX_REORD;
update RX_DELIV to the COUNT value of the first PDCP SDU which has not been delivered to upper layers, with COUNT value>=RX_REORD;
if RX_DELIV<RX_NEXT:
　update RX_REORD to RX_NEXT;
　start t-Reordering.

[ . . . ]

5.3 SDU Discard

When the discardTimer expires for a PDCP SDU, or the successful delivery of a PDCP SDU is confirmed by PDCP status report, the transmitting PDCP entity shall discard the PDCP SDU along with the corresponding PDCP Data PDU. If the corresponding PDCP Data PDU has already been submitted to lower layers, the discard is indicated to lower layers.

For SRBs, when upper layers request a PDCP SDU discard, the PDCP entity shall discard all stored PDCP SDUs and PDCP PDUs.

NOTE: Discarding a PDCP SDU already associated with a PDCP SN causes a SN gap in the transmitted PDCP Data PDUs, which increases PDCP reordering delay in the receiving PDCP entity. It is up to UE implementation how to minimize SN gap after SDU discard.

3GPP TS 38.300 states:

6.4 PDCP Sublayer 6.4.1 Services and Functions

The main services and functions of the PDCP sublayer include:

Transfer of data (user plane or control plane);
Maintenance of PDCP SNS;
Header compression and decompression using the ROHC protocol;
Header compression and decompression using EHC protocol;
Compression and decompression of uplink PDCP SDUs: DEFLATE based UDC only;
Ciphering and deciphering;
Integrity protection and integrity verification;
Timer based SDU discard;
For split bearers, routing;
Duplication;
Reordering and in-order delivery;
Out-of-order delivery;
Duplicate discarding.

Since PDCP does not allow COUNT to wrap around in DL and UL, it is up to the network to prevent it from happening (e.g. by using a release and add of the corresponding radio bearer or a full configuration).

6.5 SDAP Sublayer

The main services and functions of SDAP include:

Mapping between a QoS flow and a data radio bearer;
Marking QoS flow ID (QFI) in both DL and UL packets.

A single protocol entity of SDAP is configured for each individual PDU session.

6.6 L2 Data Flow

An example of the Layer 2 Data Flow is depicted on FIGS. 6.6-1, where a transport block is generated by MAC by concatenating two RLC PDUs from $RB_x$ and one RLC PDU from $RB_y$. The two RLC PDUs from $RB_x$ each corresponds to one IP packet (n and n+1) while the RLC PDU from $RB_y$ is a segment of an IP packet (m).

NOTE: H depicts the headers and subheaders.

Figure 14:
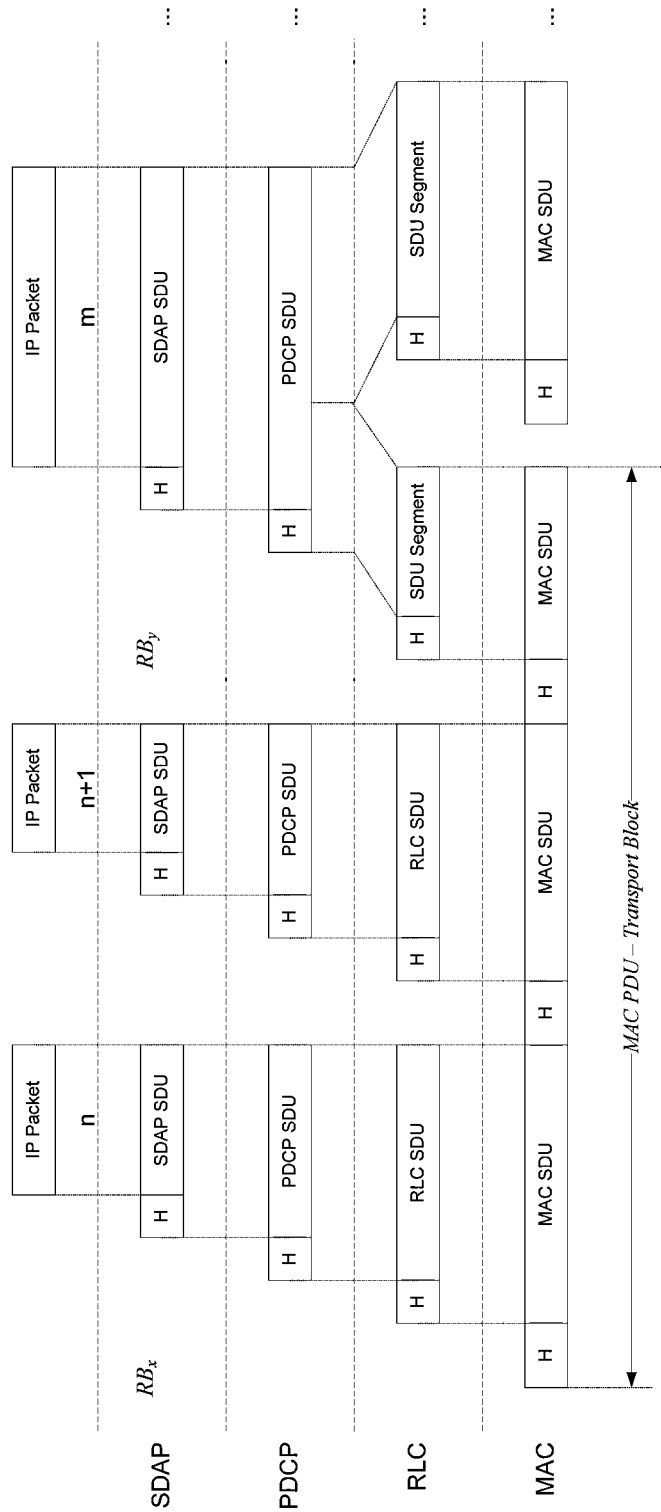
FIG. 14 is a reproduction of FIGS. 6.6-1 of 3GPP TS 38.300 V17.0.0.

[FIGS. 6.6-1 of 3GPP TS 38.300 V17.0.0, Entitled "Data Flow Example", is Reproduced as FIG. 14]

[ . . . ]

12.1 Overview

The 5G QoS model is based on QoS Flows (see TS 23.501 [3]) and supports both QoS Flows that require guaranteed flow bit rate (GBR QoS Flows) and QoS Flows that do not require guaranteed flow bit rate (non-GBR QoS Flows). At NAS level (see TS 23.501 [3]), the QoS flow is thus the finest granularity of QoS differentiation in a PDU session. A QoS flow is identified within a PDU session by a QoS Flow ID (QFI) carried in an encapsulation header over NG-U. The QoS architecture in NG-RAN, both for NR connected to 5GC and for E-UTRA connected to 5GC, is depicted in the FIG. 12-1 and described in the following:

For each UE, 5GC establishes one or more PDU Sessions;
  Except for NB-IoT and IAB-MT in SA mode, for each UE, the NG-RAN establishes at least one Data Radio Bearers (DRB) together with the PDU Session and additional DRB(s) for QoS flow(s) of that PDU session can be subsequently configured (it is up to NG-RAN when to do so);
  If NB-IoT UE supports NG-U data transfer, the NG-RAN may establish Data Radio Bearers (DRB) together with the PDU Session and one PDU session maps to only one DRB;
  The NG-RAN maps packets belonging to different PDU sessions to different DRBs;
  NAS level packet filters in the UE and in the 5GC associate UL and DL packets with QoS Flows;
  AS-level mapping rules in the UE and in the NG-RAN associate UL and DL QoS Flows with DRBs.

Figure 15:
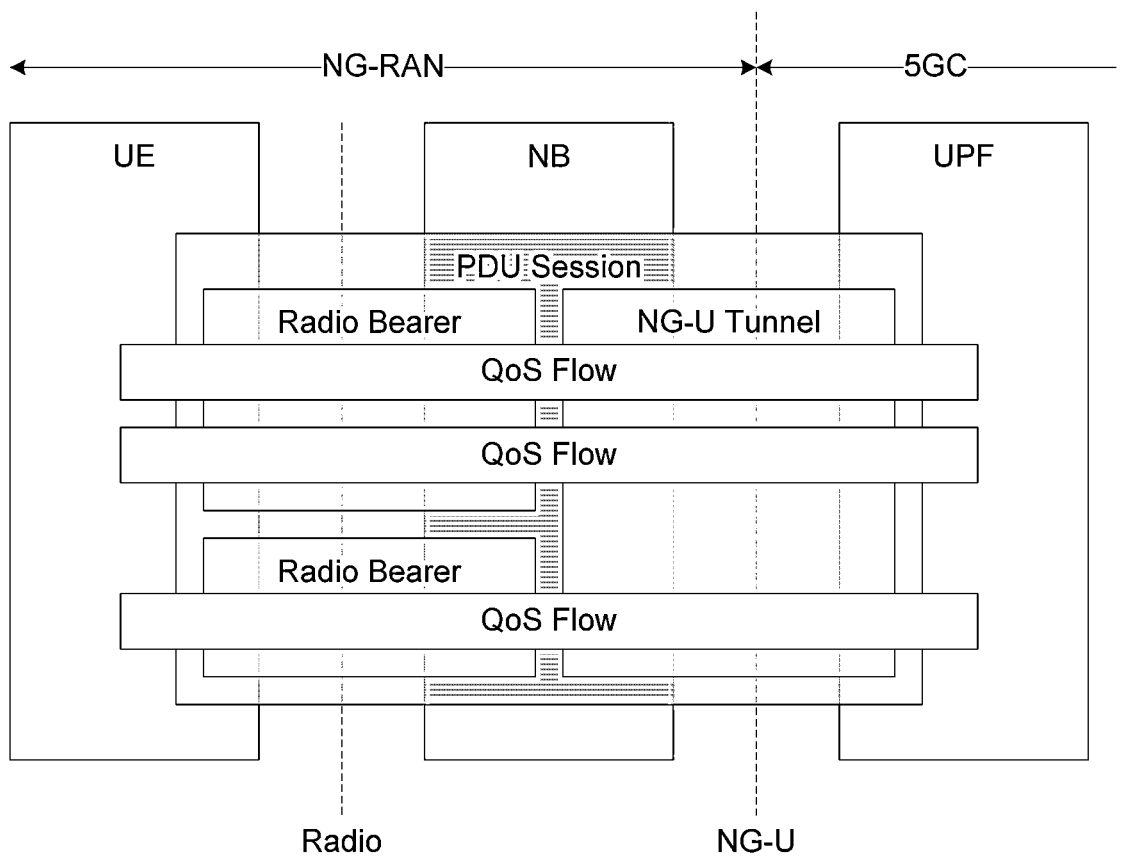
FIG. 15 is a reproduction of FIG. 12-1 of 3GPP TS 38.300 V17.0.0.

[FIG. 12-1 of 3GPP TS 38.300 V17.0.0, Entitled "QoS Architecture", is Reproduced as FIG. 15]

NG-RAN and 5GC ensure quality of service (e.g. reliability and target delay) by mapping packets to appropriate QoS Flows and DRBs. Hence there is a 2-step mapping of IP-flows to QoS flows (NAS) and from QoS flows to DRBs (Access Stratum).

At NAS level, a QoS flow is characterised by a QoS profile provided by 5GC to NG-RAN and QoS rule(s) provided by 5GC to the UE. The QoS profile is used by NG-RAN to determine the treatment on the radio interface while the QoS rules dictates the mapping between uplink User Plane traffic and QoS flows to the UE. A QoS flow may either be GBR or Non-GBR depending on its profile. The QoS profile of a QoS flow contains QoS parameters, for instance (see TS 23.501 [3]):

For each QoS flow:
    A 5G QoS Identifier (5QI);
    An Allocation and Retention Priority (ARP).
  In case of a GBR QoS flow only:
    Guaranteed Flow Bit Rate (GFBR) for both uplink and downlink;
    Maximum Flow Bit Rate (MFBR) for both uplink and downlink;
    Maximum Packet Loss Rate for both uplink and downlink;
    Delay Critical Resource Type;
    Notification Control.
  NOTE: The Maximum Packet Loss Rate (UL, DL) is only provided for a GBR QoS flow belonging to voice media.
  In case of Non-GBR QoS only:
    Reflective QoS Attribute (RQA): the RQA, when included, indicates that some (not necessarily all) traffic carried on this QoS flow is subject to reflective quality of service (RQoS) at NAS;
    Additional QoS Flow Information.

The QoS parameter Notification Control indicates whether notifications are requested from the RAN when the GFBR can no longer (or again) be fulfilled for a QoS Flow. If, for a given GBR QoS Flow, notification control is enabled and the RAN determines that the GFBR cannot be guaranteed, RAN shall send a notification towards SMF and keep the QoS Flow (i.e. while the NG-RAN is not delivering the requested GFBR for this QoS Flow), unless specific conditions at the NG-RAN require the release of the NG-RAN resources for this GBR QoS Flow, e.g. due to Radio link failure or RAN internal congestion. When applicable, NG-RAN sends a new notification, informing SMF that the GFBR can be guaranteed again.

If Alternative QoS parameters Sets are received with the Notification Control parameter, the NG-RAN may also include in the notification a reference corresponding to the QoS Parameter Set which it can currently fulfil as specified in TS 23.501 [3]. The target NG-RAN node may include in the notification control indication the reference to the QoS Parameter Set which it can currently fulfil over Xn to the source NG-RAN node during handover.

In addition, an Aggregate Maximum Bit Rate is associated to each PDU session (Session-AMBR), to each UE (UE-AMBR) and to each slice per UE (UE-Slice-MBR). The Session-AMBR limits the aggregate bit rate that can be expected to be provided across all Non-GBR QoS Flows for a specific PDU Session and is ensured by the UPF. The UE-AMBR limits the aggregate bit rate that can be expected to be provided across all Non-GBR QoS Flows of a UE and is ensured by the RAN (see clause 10.5.1). The UE-Slice-MBR limits the aggregate bit rate that can be expected to be provided across all GBR and Non-GBR QoS Flows corresponding to PDU Sessions of the UE for the same slice (S-NSSAI) as specified in TS 23.501 [3] and is ensured by the RAN (see clause 10.5.1).

The 5QI is associated to QoS characteristics giving guidelines for setting node specific parameters for each QoS Flow. Standardized or pre-configured 5G QoS characteristics are derived from the 5QI value and are not explicitly signalled. Signalled QoS characteristics are included as part of the QoS profile. The QoS characteristics consist for instance of (see TS 23.501 [3]):

Priority level;
  Packet Delay Budget (including Core Network Packet Delay Budget);
  Packet Error Rate;
  Averaging window;
  Maximum Data Burst Volume.

At Access Stratum level, the data radio bearer (DRB) defines the packet treatment on the radio interface (Uu). A DRB serves packets with the same packet forwarding treatment. The QoS flow to DRB mapping by NG-RAN is based on QFI and the associated QoS profiles (i.e. QoS parameters and QoS characteristics). Separate DRBs may be established for QoS flows requiring different packet forwarding treatment, or several QoS Flows belonging to the same PDU session can be multiplexed in the same DRB.

In the uplink, the mapping of QoS Flows to DRBs is controlled by mapping rules which are signalled in two different ways:

Reflective mapping: for each DRB, the UE monitors the QFI(s) of the downlink packets and applies the same mapping in the uplink; that is, for a DRB, the UE maps the uplink packets belonging to the QoS flows(s) corresponding to the QFI(s) and PDU Session observed in the downlink packets for that DRB. To enable this reflective mapping, the NG-RAN marks downlink packets over Uu with QFI.

Explicit Configuration: QoS flow to DRB mapping rules can be explicitly signalled by RRC.

The UE always applies the latest update of the mapping rules regardless of whether it is performed via reflecting mapping or explicit configuration.

When a QoS flow to DRB mapping rule is updated, the UE sends an end marker on the old bearer.

In the downlink, the QFI is signalled by NG-RAN over Uu for the purpose of RQoS and if neither NG-RAN, nor the NAS (as indicated by the RQA) intend to use reflective mapping for the QoS flow(s) carried in a DRB, no QFI is signalled for that DRB over Uu. In the uplink, NG-RAN can configure the UE to signal QFI over Uu.

For each PDU session, a default DRB may be configured: if an incoming UL packet matches neither an RRC configured nor a reflective mapping rule, the UE then maps that packet to the default DRB of the PDU session. For non-GBR QoS flows, the 5GC may send to the NG-RAN the Additional QoS Flow Information parameter associated with certain QoS flows to indicate that traffic is likely to appear more often on them compared to other non-GBR QoS flows established on the same PDU session.

Within each PDU session, it is up to NG-RAN how to map multiple QoS flows to a DRB. The NG-RAN may map a GBR flow and a non-GBR flow, or more than one GBR flow to the same DRB, but mechanisms to optimise these cases are not within the scope of standardization.

[ . . . ]

A.1 PDU Session Establishment

The following figure shows an example message flow for a PDU session establishment. NAS procedures details between gNB and 5GC can be found in TS 23.501 [3], TS 23.502 and TS 38.413 [26].

Figure 16:
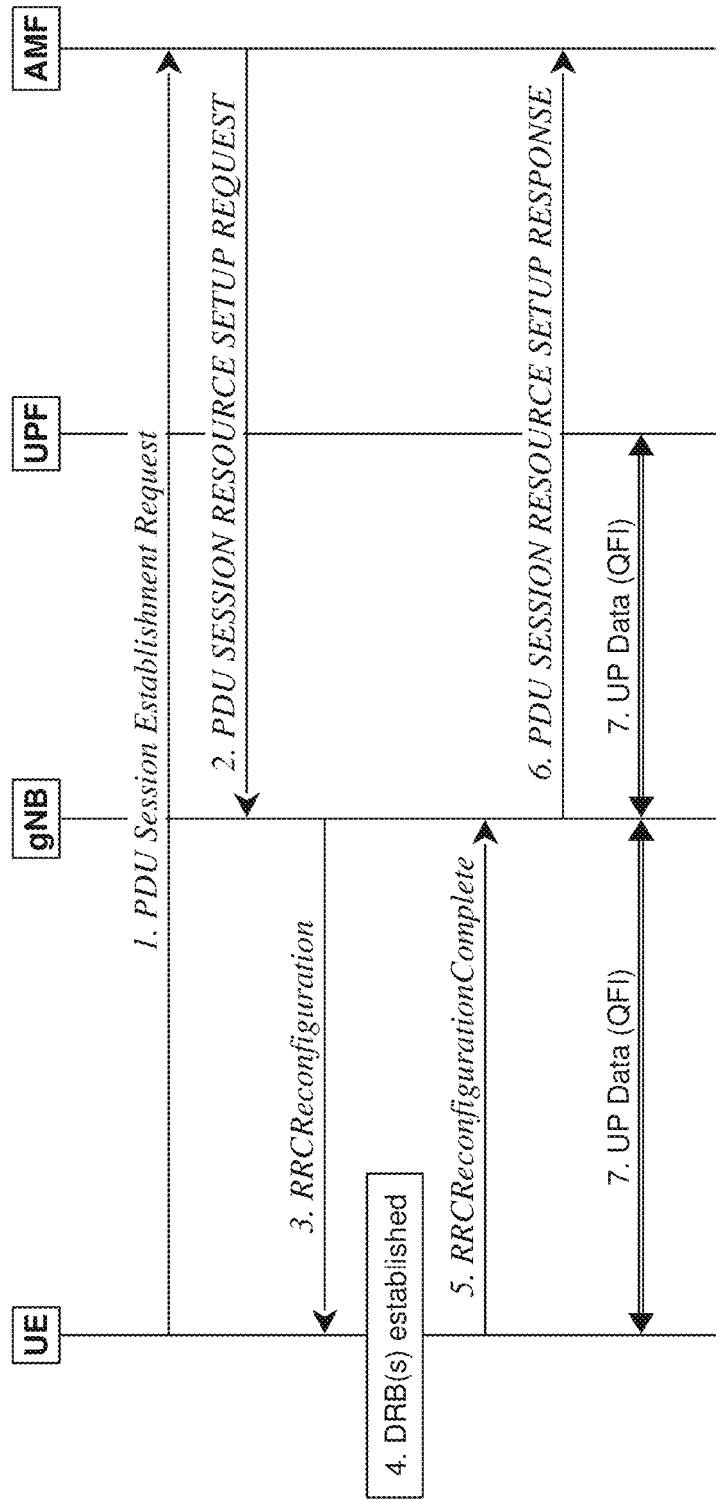
FIG. 16 is a reproduction of Figure A.1-1 of 3GPP TS 38.300 V17.0.0.

[Figure A.1-1 of 3GPP TS 38.300 V17.0.0, Entitled "PDU Session Establishment", is Reproduced as FIG. 16]

1. UE requests a PDU session establishment to AMF.
2. AMF sends a PDU SESSION RESOURCE SETUP REQUEST message to gNB, which includes the NAS message to be sent to the UE with NAS QoS related information.
3. gNB sends an RRCReconfiguration message to UE including the configuration of at least one DRB and the NAS message received at Step 2.
4. UE establishes the DRB(s) for the new PDU session and creates the QFI to DRB mapping rules.
5. UE sends an RRCReconfiguration Complete message to gNB.
6. gNB sends a PDU SESSION RESOURCE SETUP RESPONSE message to AMF.
7. User Plane Data can then be exchanged between UE and gNB over DRB(s) according to the mapping rules and between UPF and gNB over the tunnel for the PDU session. QFI marking over Uu is optional (see clause 12) while QFI marking over NG-U is always present.

[ . . . ]

A.6 UE Initiated UL QoS Flow

The following figure shows an example message flow when the UE AS receives an UL packet for a new QoS flow for which a QFI to DRB mapping rule does not exist.

Figure 17:
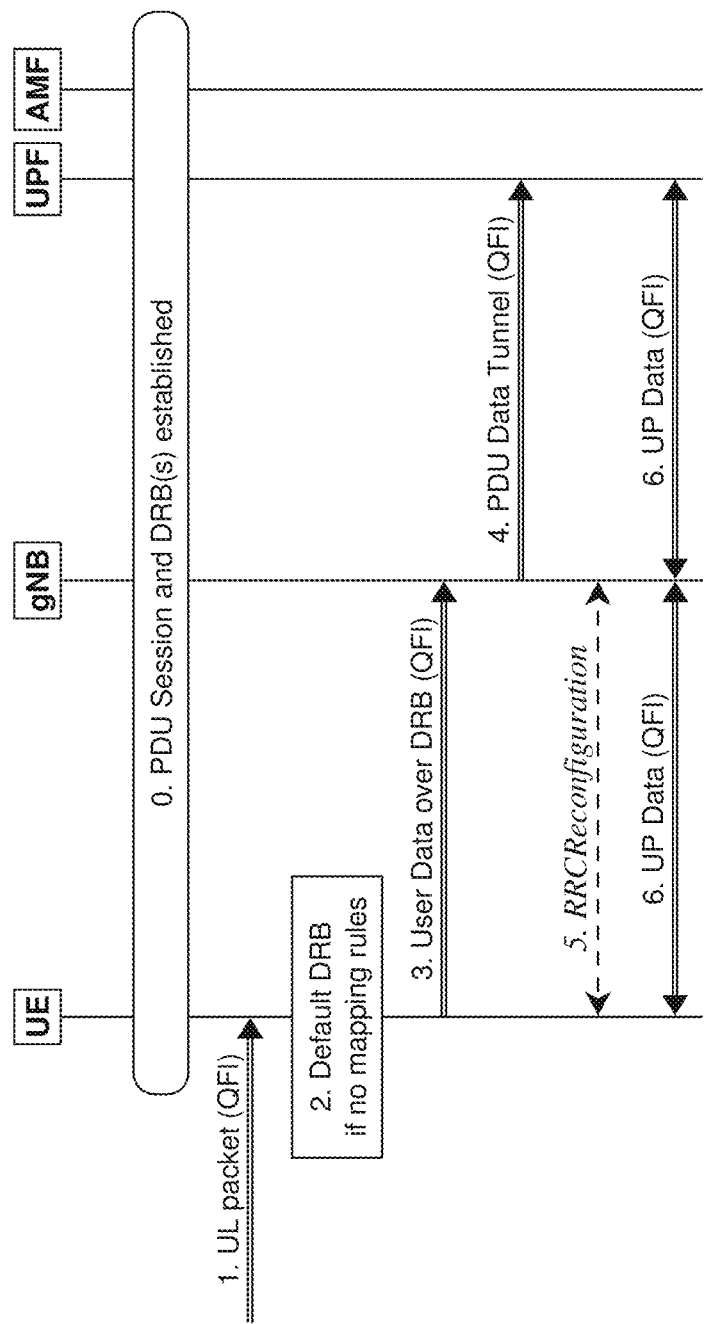
FIG. 17 is a reproduction of Figure A.6-1 of 3GPP TS 38.300 V17.0.0.

[Figure A.6-1 of 3GPP TS 38.300 V17.0.0, Entitled "UL Packet with a New QoS Flow for which a Mapping does not Exist in UE]", is Reproduced as FIG. 17]

0. PDU session and DRBs (including a default DRB) have been already established.
1. UE AS receives a packet with a new QFI from UE NAS.
2. UE uses the QFI of the packet to map it to a DRB. If there is no mapping of the QFI to a DRB in the AS mapping rules for this PDU session, then the packet is assigned to the default DRB.
3. UE sends the UL packet on the default DRB. The UE includes the QFI in the SDAP header.
4. gNB sends UL packets to UPF and includes the corresponding QFI.
5. If gNB wants to use a new DRB for this QoS flow, it sets up one. It can also choose to move the QoS flow to an existing DRB using RQoS or RRC signalling (see clauses A.2 and A.3).
6. User Plane Data for the new QoS flow can then be exchanged between UE and gNB over the DRB according to the updated mapping rules and between UPF and gNB over the tunnel for the PDU session.

3GPP TR 23.700-60 states:

6.7.3.1 Identifying Packets of a PDU Set 6.7.3.1.1 RTP

Packets belonging to a PDU set can be identified by inspecting a combination of fields in the RTP header (sequence number, timestamp, M bit) and RTP header extensions (e.g. IETF Frame Marking RTP Extension header, draft-ietf-avtext-framemarking [11]) and the media payload header (e.g. RTP payload NAL Unit Type field).

Figure 18:
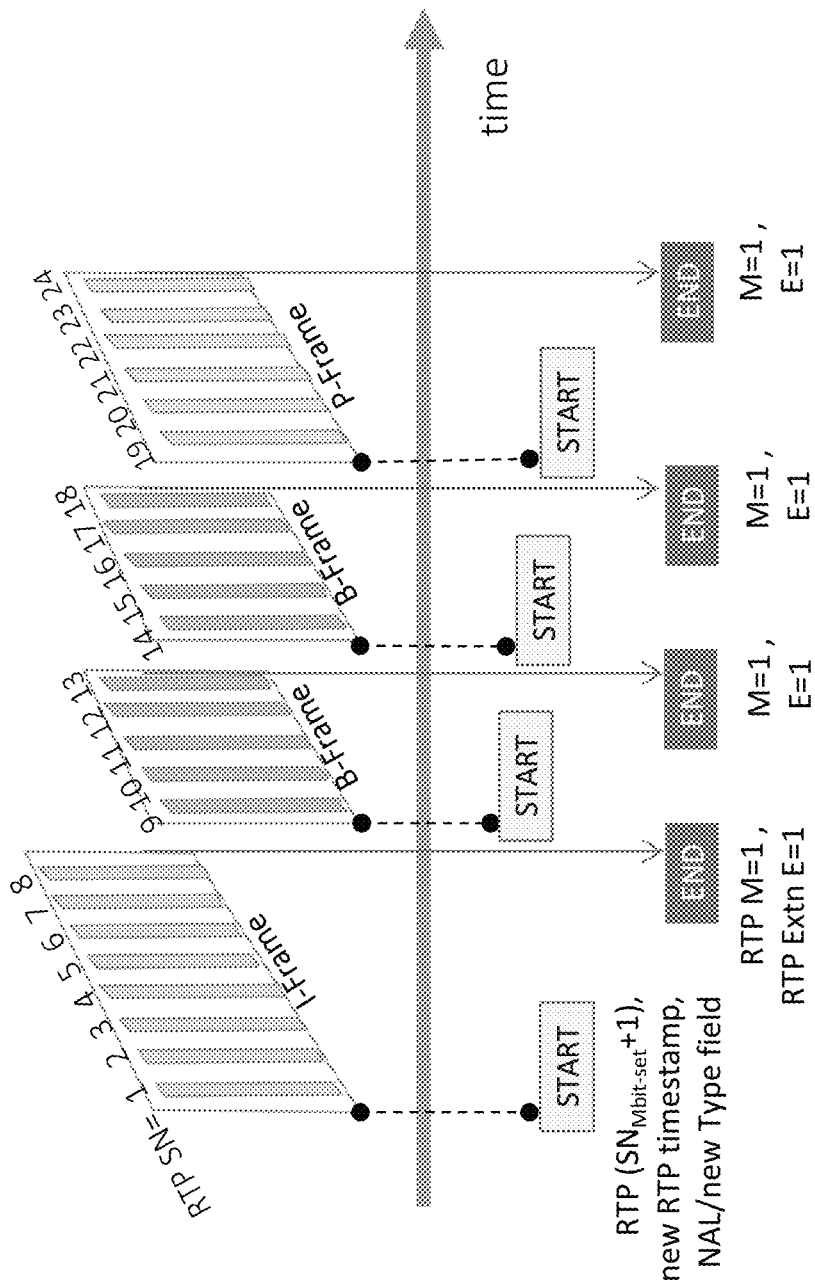
FIG. 18 is a reproduction of FIG. 6.7.3.1.1-1 of 3GPP TR 23.700-60 V1.2.0.

[FIG. 6.7.3.1.1-1 of 3GPP TR 23.700-60 V1.2.0, Entitled "Identifying Start and End of a PDU Set", is Reproduced as FIG. 18]

The first packet of a PDU set has an RTP header with new timestamp, a new Type field in NAL unit header and follows the sequence number of the packet with the RTP header M-bit set to 1 (i.e. sequence number is 1 greater than the packet with M-bit set to 1). Detection of the first packet may need a combination of fields since timestamp may not be incremented for enhanced layers (PDU set). If an RTP experimental extension header is present, the S-bit is set to 1. These fields can identify the start of a PDU set.

The last packet of a PDU set has the RTP header M-bit set to 1, or precedes packet/sequence number with new timestamp. If an RTP experimental extension header is present, the E-bit is set to 1.

6.7.3.1.2 HTTP

HTTP/1.1 packets belonging to a PDU set can be identified by inspecting the HTTP payload to determine start, the packets in between and the end. HTTP payload with the same timestamp and content type belong to a PDU set. Enhanced layers can be detected by the change in content type (while the timestamp may not be incremented). Out-of-order packet arrivals can be managed by tracking the TCP sequence number along with the content type of the packet. HTTP/2 and HTTP/3 packets carry multiple streams that are dynamically ordered (i.e. their ordering is based on application priorities, network delays, etc.). The combination of dynamically ordered streams or possible encryption make it processing intensive to identify and characterize PDU sets at line-rate without additional meta-data.

Methods for HTTP/2 and HTTP/3:
1. Combination of IP header fields and stream fingerprint
    UPF uses IP header fields (flow label, DSCP) to differentiate streams since a flow (single transport connection) has multiple dynamically ordered streams. Within an identified HTTP/2 stream, stream fingerprints (including packet size, burst, inter arrival time) is used to identify PDU set boundaries. Stream fingerprints are configured as described in clause 6.7.3.2.3.
2. New TCP/UDP option with media meta-data
    Media aware application server on N6 adds new TCP option [44] for HTTP/2 or UDP option for HTTP/3 to carry meta-data on the codec (audio, video, haptics), media encoding in the packet (base layer, enhanced layers), timestamp and PDU set information (start/end of frame). For HTTP/3 QUIC/UDP meta-data to prioritize media with priority/importance [64] and extensions to support other PDU set characteristics may be an option to be considered in coordination with the IETF.
    Since the meta-data is in a TCP/UDP option of the packet, no new routing/destination information is needed (unlike using a tunnel in N6).

6.7.3.1.3 PDU Sequence Mark

A PDU Set is identified by a sequence number "PDU sequence mark" that is appended to all the packets of a PDU set (start to end packet). More than one bit may be used for the PDU sequence mark field if e.g. out-of-order packets span multiple PDU sets. For example, a 2-bit counter would cycle incrementally through 4 distinct PDU sequence marks using modulo arithmetic (i.e. mod-4 in this case) for each subsequent PDU set. This allows the QoS handler to make decisions based on the PDU set as a whole and differentiate from previous or subsequent PDU sets. The PDU sequence mark (PSM) is carried in GTP extension and further described in clause 6.7.3.3.

Since packets may arrive out-of-order, a packet with out-of-order sequence number may be part of a new PDU set. If the packet has a new timestamp and new media header fields, the packet belongs to a new PDU set and a higher PDU sequence mark (i.e. (current PSM+1) mod-n) is used to indicate that it belongs to a different PDU set.

6.7.3.2 Classifying Importance of Packets in PDU Set

This clause describes how packets of a PDU set are classified based on the importance of the media payload it carries. Media payload header NAL (e.g. RFC 3711 [10], Frame Marking RTP Header Extension, draft-ietf-avtext-framemarking [11]) or RFC 3550 [9] RTP extended headers contain information on media priority and dependence and is further defined in clause 6.7.3.2.1 Media classification with HTTP payload is covered in 6.7.3.2.2.

Some PDU sets have a well understood importance (e.g. an independent frame has high importance, or a discardable frame has low importance) but in other cases applications may indicate a preference (e.g. an application that contains high speed motion may give higher importance to temporal enhancement PDU sets over spatial or quality data). PDU sets of enhancement layers (e.g. spatial, temporal) have a dependence on base layer PDU sets and are relatively less important than the base layer PDU sets that carry essential data. Applications can configure these preferences as defined in clause 6.7.3.2.2.

QoS handlers are provided with a PDU Priority Mark (PPM) that represents importance and dependence of PDU Set in terms of a linear priority value (e.g. high/medium/low, 0-7) PPM is related to PDU set delay budget, error rate and other parameters associated to each priority value. A QoS handler may use PPM along with PDU set boundaries to handle packets of PDU set in a flow without the need to understand the specifics of various coded media. The PPM can thus be extensible for new types of media.

The QoS model in clause 5.7 of TS 23.501 [2], is extended for media PDU handling as shown in FIG. 6.7.3.2-1.

Figure 19:
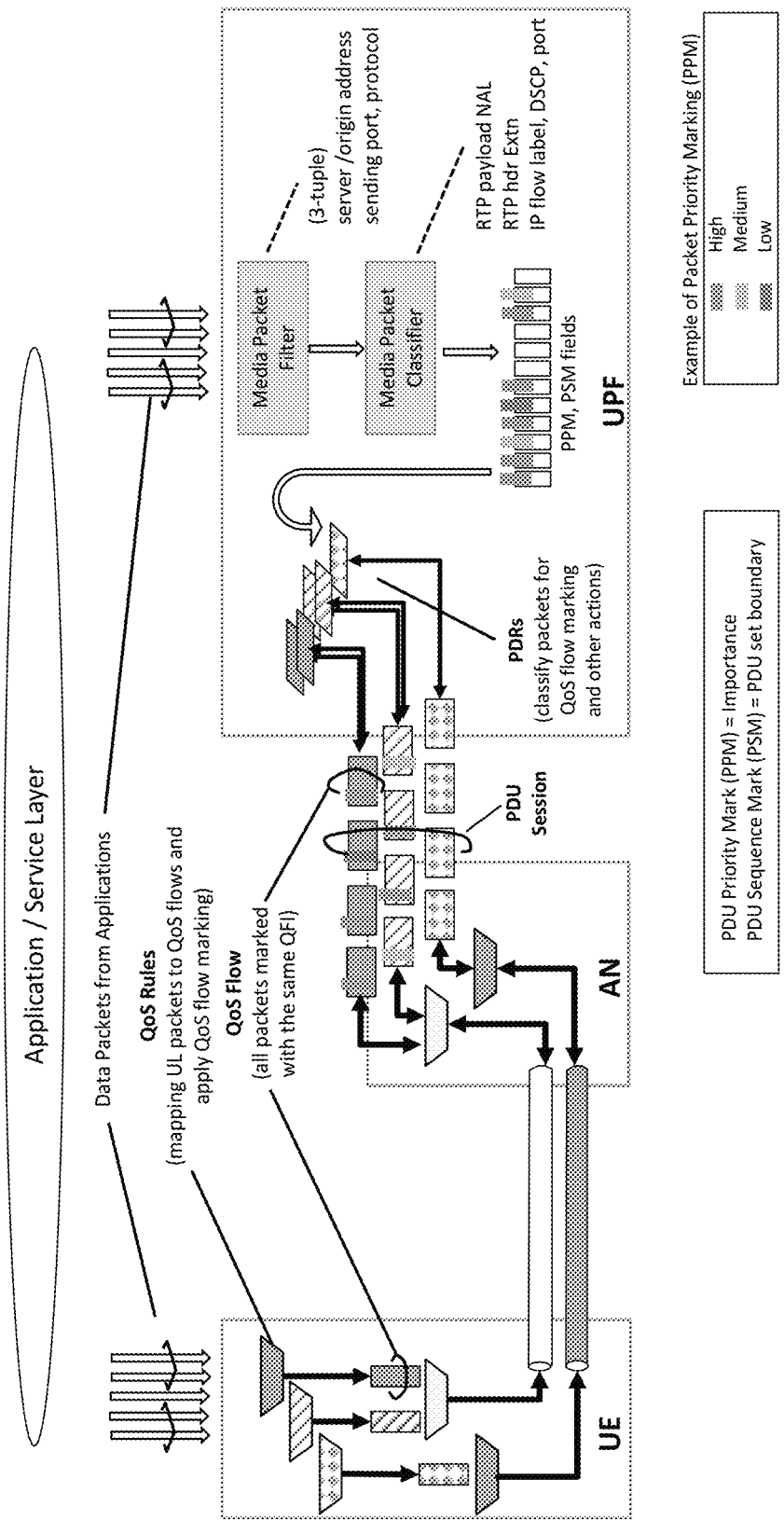
FIG. 19 is a reproduction of FIG. 6.7.3.2-1 of 3GPP TR 23.700-60 V1.2.0.

[FIG. 6.7.3.2-1 of 3GPP TR 23.700-60 V1.2.0, Entitled "QoS Model with Extension for Media PDU Classification", is Reproduced as FIG. 19]

Protocol data units that arrive at a UPF with media classification functionality are filtered and classified based on origin (3-tuple) or 5-tuple flow information as defined in clause 5.6.7 of TS 23.501 [2]. Media PDU filtering information is provisioned in 5GC by the application (AF) and further details are in clause 6.7.3.2.2. If it is not a media PDU, the PDU bypasses the media filter and flow based QoS is handled as defined in clause 5.7 of TS 23.501 [2]. Media PDUs (that are filtered) are classified using RTP header/payload header information that identifies the importance of the packet payload and details are in clause 6.7.3.2.1. The importance information in PPM and sequence of PDU sets is carried in GTP extension header as outlined in clause 6.7.3.3.

The mapping from meta-information available in media transport is presented to the QoS handler as a scale of increasing/decreasing priorities in PPM (e.g. high/medium/low, scale 0-7). The PPM is only applicable for selective handling (e.g. deferring, dropping) of packets of PDU set within a flow. The actions that the QoS handler takes based on PPM is based on network conditions or other factors and implementation of the QoS handler and are not further defined here.

A UPF with media classification functionality follows the extended QoS handling below:
1. PDU Set Marking:
    If an incoming packet matches media filter criteria and is not classified (i.e. does not have PPM), the media packet classifier uses rules configured in clause 6.7.3.2.2 to select PPM value by matching on RTP/payload header fields of incoming packet.
    If there is no match, packet is marked with PPM of lowest priority.
2. Flow based QoS in clause 5.7 of TS 23.501 [2] is applied.
    The flow is processed using QoS defined in 23.501, 5.7. The PDB, PER, GBR, MBR remain the same and the rules are based on existing PDR for the PDU session.
3. Extended QoS Handling for Media packets:
    Within the QoS rules for a flow, if PPM is available the QoS handler may use it to optimize handling of the packet (e.g. deferring, or selectively dropping when congestion exceeds threshold level). PDU set delay budget, error rate and other parameters associated to each priority value in PPM is used.

For classification of upstream packets, the UE is provisioned with PPM during PDU session establishment/modification based on S-NSSAI/DNN for the PDU session. The PPM rules are sent from 5GC to the UE in N1 SM Container defined in session management procedure in clause 4.3 of TS 23.502 [3]. PPM is used in the UE for mapping to the appropriate MAC transmission buffers. The handling of UL PDU sets in the UE is implementation specific.

6.7.3.2.1 Mapping RTP/Payload Header Values to PPM

Packets of a PDU set have a set of headers in IP, RTP transport and payload headers that can be used to assign an importance and dependence to other PDU sets. After the start of a new PDU set is detected, various header information can be used in each of the following cases:

1. RTP (unencrypted header and payload).

The RTP payload/NAL unit header with information on media coding priority, dependence (e.g. H.264 [19], SVC, draft-ietf-avtext-framemarking [11]) are used to map to per packet QoS priority values in PPM. Independent frames/PDU sets with no dependence are marked with the highest priority while PDU sets that carry temporal, spatial or quality enhancements are configured on a per application basis on the level of importance. This is further defined in clause 6.7.3.2.3.

2. SRTP (unencrypted extended experimental header, encrypted payload).

The experimental IETF draft with extended header (Frame Marking RTP Header Extension, draft-ietf-avtext-framemarking [11]) contains coded media information that can be used to map to a PPM value. For example, an "I" (independent/IDR frame with temporal independence) may be marked important, while selected LID/TID values (spatial/quality/temporal frames with dependence indicated by the value) may be of medium PPM priority and the others marked low.

3. SRTP (unencrypted header, encrypted payload).

The RTP unencrypted header does not provide meta-information to determine the coded media that is carried in the packet and the NAL unit header is part of the encrypted payload. Since the unencrypted headers don't convey enough information on the media carried, the application supplements by conveying different desired QoS handling priority by using different IPv6 flow labels, DSCP, sender ports. The values are configurable per application and is specified further in clause 6.7.3.2.3.

6.7.3.2.2 Mapping HTTP Transport Payload to PPM

The methods described in 6.7.3.1.2 include both identification of PDU sets and classification of packets with HTTP media transport.

1. HTTP/1.1 (unencrypted header and payload)

Content type, base and enhanced layers are detected by inspection of the media payload and mapped to per packet QoS priority values in PPM. Independent frames/PDU sets with no dependence are marked with the highest priority while PDU sets that carry temporal, spatial or quality enhancements are configured on a per application basis on the level of importance. This is further defined in 6.7.3.2.3

2. HTTP/2 and HTTP/3 (dynamically ordered streams and possible encryption)

The HTTP/2 or HTTP/3 headers do not provide meta-information to determine the coded media.

IP header fields (flow label, DSCP) are used to differentiate streams since a flow (single transport connection) has multiple dynamically ordered streams. If meta-data on the codec (audio, video, haptics), media encoding in the packet (base layer, enhanced layers), timestamp and PDU set information (start/end of frame) is available in TCP option for HTTP/2 or UDP option for HTTP/3, this information is used to classify and map to per packet QoS priority values. For HTTP/3, an option may be to use QUIC/UDP meta-data to prioritize media with priority/importance and extend in coordination with IETF to support other PDU set characteristics.

6.7.3.2.3 Provisioning Application Information

This clause describes the provisioning necessary to filter the media PDUs and apply the QoS classification based on the importance that applications need for different media encoding. For example, a video stream that encodes significant motion may wish to prioritize PDU that have enhancement layers with temporal information over PDUs that carry quality.

Media Packet Filtering:

Application function (AF) signals the 5GC and provides details on the criteria by which to filter traffic carrying media traffic and then to the criteria by which to determine importance of a packet/PDU. Media traffic is identified using 3-tuple (server address/end user address, port protocol) or 5-tuple flow as described in clause 5.6.7 of TS 23.501 [2] (Application Function Influence on Traffic Routing).

Media Packet Classification:

The media traffic is then classified using the rules configured based the application priorities for the corresponding fields in RTP/SRTP transport or payload header. Some PDU sets have a well understood importance (e.g. an independent frame has high importance, or a discardable frame has low importance) but in other cases applications may indicate a preference (e.g. an application that contains high speed motion may give higher importance to temporal enhancement PDU sets over spatial or quality data).

The AF sends information to 5GC to configure default and application specific information:|

1. Classification for RTP (unencrypted header and payload).

The parameters configured include the following:

if NAL I flag set to 1, then PPM=high importance.

NAL priority field values set for enhanced layers are mapped to PPM based on application preference for motion or quality.

if no configuration applies, default is PPM=low importance.

2. Classification for SRTP (unencrypted extended experimental header, encrypted payload).

The parameters configured are based on RFC 3550 [9] RTP extension header:

if I flag is set to 1, PPM=high importance.

if D flag is set to 1, PPM=low importance.

TID/LID/TLOPICIDX values mapped to PPM based on application preference for motion or quality.

if no configuration applies, default is PPM=low importance.

3. Classification for SRTP (unencrypted header, encrypted payload).

The parameters configured include (one or more of) the following:

IPv6 flow label values corresponding to application preference for importance of the PDU.

DSCP corresponding to application preference for importance of the PDU:

(e.g. if DSCP=d1, PPM=high importance).

sending IP port and corresponding importance in PPM:

(e.g. if sending port=p1, PPM=medium importance).

if no configuration applies, default is PPM=low importance.

4. Classification for HTTP
   The parameters configured include the following:
      parameters that fingerprint a stream including packet size, burst rate, inter arrival time.
      IPv6 flow label values corresponding to application preference for importance of the PDU.
      DSCP corresponding to application preference for importance of the PDU:
         (e.g. if DSCP=d1, PPM=high importance.
         if no configuration applies, default is PPM=low importance.

These parameters are configured using PFD (Packet Flow Description) procedures in clause 4.18 of TS 23.502 [3] and clause 4.2.4 of TS 23.503 [4] as basis (AF→NEF (PFDF)→UDR). The SMF subscribes to PFDManagement services from NEF to retrieve the configuration as specified in clause 5.2.6 of TS 23.502 [3] (NEF Services). The SMF uses N4 PFD management procedure in clause 4.4.3.5 of TS 23.502 [3] to provision these PFDs in the UPF.

6.7.3.3 Protocol Extensions

The classification of media PDU with PPM described in clause 6.7.3.2 and sequence of PDU sets described in clause 6.7.3.1 is carried to QoS handlers in RAN/other UPFs using GTP-U extension headers (clause 8.3.1 of TS 23.501 [2], TS 29.281 [16]). New GTP extension header fields are required for PPM/importance information and for boundaries/sequence of PDU sets. An example of GTP-U encapsulation carrying the QoS media classification result is shown in FIG. 6.7.3.3-1.

Figure 20:
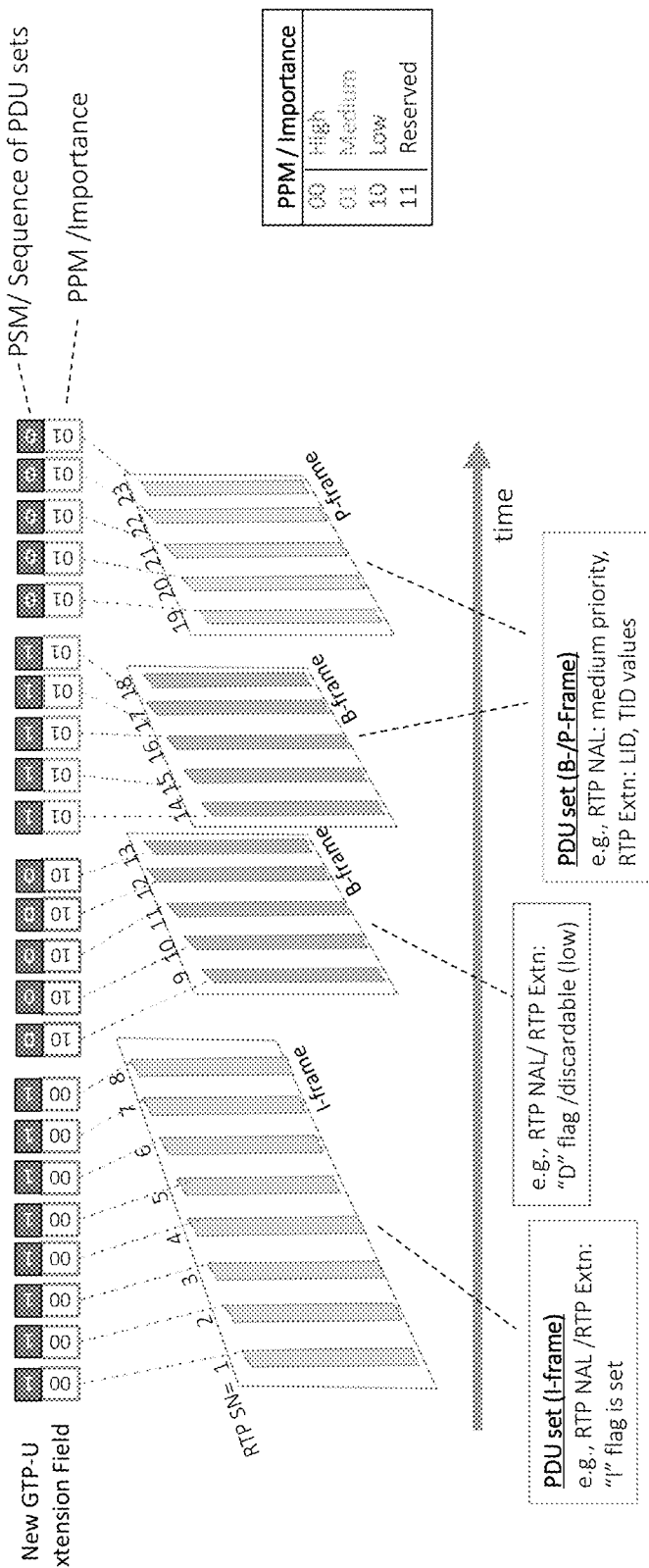
FIG. 20 is a reproduction of FIG. 6.7.3.3-1 of 3GPP TR 23.700-60 V1.2.0.

[FIG. 6.7.3.3-1 of 3GPP TR 23.700-60 V1.2.0, Entitled "Example of QoS Media Classification in GTP-U Extension", is Reproduced as FIG. 20]

FIG. 6.7.3.3-1 shows a sequence of PDU sets (I-frame followed by B-frames and P-frame). There are two sets of classification results that are carried in the GTP-U extension. The field with importance of each PDU defined as PPM contains the level of importance of each PDU set as described in clause 6.7.3.2. In the example here, 3 levels of importance are conveyed for a QoS handler to act on.

PDU set boundaries are identified as described in clause 6.7.3.1 and each of the PDU sets are marked with a sequence number i.e. PDU sequence mark (PSM) here shown as a single alternating bit in the figure. (A larger PSM may be used).

6.7.4 Impacts on Services, Entities and Interfaces

AF: Procedures to provision application preferences for filtering, PDU classification (clause 6.7.3.2.3).

UPF: Classification of importance, packets of PDU set using rules provisioned (clauses 6.7.3.1, 6.7.3.2). Encoding of importance, packets of PDU sequence mark in GTP-U extension header (clause 6.7.3.3).

RAN: Ability to use the classification and importance information.

UE: If a UE does not support TCP/UDP option, it will be ignored (i.e. no impact to UE).

[ . . . ]

3GPP TR 38.835 states:

4.1 Extended Reality Types

Extended Reality (XR) refers to all real-and-virtual combined environments and human-machine interactions generated by computer technology and wearables. XR is an umbrella term for different types of realities (see TR 26.918 [5] and TR 26.928 [7]):

Virtual reality (VR) is a rendered version of a delivered visual and audio scene. The rendering is designed to mimic the visual and audio sensory stimuli of the real world as naturally as possible to an observer or user as they move within the limits defined by the application. Virtual reality usually, but not necessarily, requires a user to wear a head mounted display (HMD), to completely replace the user's field of view with a simulated visual component, and to wear headphones, to provide the user with the accompanying audio. Some form of head and motion tracking of the user in VR is usually also necessary to allow the simulated visual and audio components to be updated in order to ensure that, from the user's perspective, items and sound sources remain consistent with the user's movements.

Augmented reality (AR) is when a user is provided with additional information or artificially generated items or content overlaid upon their current environment. Such additional information or content will usually be visual and/or audible and their observation of their current environment may be direct, with no intermediate sensing, processing and rendering, or indirect, where their perception of their environment is relayed via sensors and may be enhanced or processed.

Mixed reality (MR) is an advanced form of AR where some virtual elements are inserted into the physical scene with the intent to provide the illusion that these elements are part of the real scene.

Other terms used in the context of XR are Immersion as the sense of being surrounded by the virtual environment as well as Presence providing the feeling of being physically and spatially located in the virtual environment. The sense of presence provides significant minimum performance requirements for different technologies such as tracking, latency, persistency, resolution and optics.

This document uses the acronym XR throughout to refer to equipment, applications and functions used for VR, AR and MR. Examples include, but are not limited to HMDs for VR, optical see-through glasses and camera see-through HMDs for AR and MR and mobile devices with positional tracking and camera. They all offer some degree of spatial tracking and the spatial tracking results in an interaction to view some form of virtual content.

[ . . . ]

5.1 XR Awareness 5.1.1 General

In both uplink and downlink, XR-Awareness contributes to optimizations of gNB radio resource scheduling and relies at least on the notions of PDU Set and Data Burst (see TR 23.700-60 [9]): a PDU Set is composed of one or more PDUs carrying the payload of one unit of information generated at the application level (e.g. a frame or video slice), while a Data Burst is a set of data PDUs generated and sent by the application in a short period of time.

NOTE 1: A Data Burst can be composed of multiple PDUs belonging to one or multiple PDU Sets. During a Data Burst, periods of data transmission inactivity should not be assumed. Although the duration of Data Bursts may vary, it can be assumed that it stays within the same order of magnitude. Also, the arrival time of the first packet of a data burst cannot be provided by 5GC.

The following information may be provided by the CN to RAN (see TR 23.700-60 [9]):

Semi-static information per QoS flow:
   Periodicity for UL and DL traffic of the QoS Flow provided via TSCAI/TSCAC;
   DL Traffic jitter information (e.g. jitter range) associated with each periodicity of the QoS flow provided via TSCAI/TSCAC.

PDU Set QoS parameters of the QoS flow (i.e. applicable to all PDU sets of the QoS flow) provided by the SMF via NGAP:

PDU Set Error Rate (PSER): defines an upper bound for a rate of non-congestion related PDU Set losses between RAN and the UE (see TR 23.700-60 [9]).

NOTE 2: In this release, a PDU set is considered as successfully delivered only when all PDUs of a PDU Set are delivered successfully, and if the PSER is available, the usage of PSER supersedes the usage of PER.

PDU Set Delay Budget (PSDB): time between reception of the first PDU (at the UPF in DL, at the UE in UL) and the successful delivery of the last arrived PDU of a PDU Set (at the UE in DL, at the UPF in UL). PSDB is an optional parameter and when provided, the PSDB supersedes the PDB (see TR 23.700-60 [9]).

PDU Set Integrated Handling Indication (PSIHI): indicates whether all PDUs of the PDU Set are needed for the usage of PDU Set by application layer.

PDU Set Information and Identification (dynamic information for DL provided by user plane in GTP-U header):

PDU Set Sequence Number;

PDU Set Size in bytes (FFS);

PDU SN within a PDU Set;

Indication of End PDU of the PDU Set;

PDU Set Importance (PSI): identifies the relative importance of a PDU Set compared to other PDU Sets within a QoS Flow. RAN may use it for PDU Set level packet discarding in presence of congestion;

End of Data Burst indication in the header of the last PDU of the Data Burst (optional).

For the uplink XR traffic, the UE needs to be able to identify PDU Set and Data Bursts dynamically, including PSI, but in-band marking over Uu of PDUs is not needed. Additional potential improvements to enhance the scheduling of uplink resources are given in clause 5.3.2. When the PSIHI is set for a QoS flow, as soon as one PDU of a PDU set is known to be lost, the remaining PDUs of that PDU Set can be considered as no longer needed by the application and may be subject to discard operation (see clause 5.3.2).

NOTE 3: It cannot always be assumed that the remaining PDUs are not useful and can safely be discarded.

NOTE 4: In case of Forward Error Correction (FEC), active discarding of PDUs when assuming that a large enough number of packets have already been transmitted for FEC to recover without the remaining PDUs is not recommended as it might trigger an increase of FEC packets (see S4aV220921 [14]).

[ . . . ]

5.3.2 Layer 2 Enhancements

In order to enhance the scheduling of uplink resources for XR, the following improvements are envisioned:

One or more additional BS table(s) to reduce the quantisation errors in BSR reporting (e.g. for high bit rates);

Delay knowledge of buffered data, consisting of e.g. remaining time, and distinguishing how much data is buffered for which delay. It is to be determined whether the delay information is reported as part of BSR or as a new MAC CE. Also, how the delay information can be up to date considering e.g. scheduling and transmission delays needs to be investigated further.

Additional BSR triggering conditions to allow timely availability of buffer status information can be investigated further.

Delivery of some assistance information (e.g. periodicity) reusing TSCAI as a baseline. Whether additional mechanism is required can be further considered with an assumption that all information may not be always available at UE application.

Signalling of UL traffic arrival information from the UE to the gNB e.g. to cope with jitter in case of tethering (FFS).

For PDCP discard operation in uplink, the timer-based discard operation (when configured) should apply to all SDUs/PDUs belonging to the same PDU Set. Furthermore, for a PDU Set in a QoS flow for which the PSIHI is set, when one PDU of that PDU set is known to either be lost or associated to a discarded SDU (see clause 5.1.1), all remaining PDUs of that PDU Set could be discarded at the transmitter to free up radio resources.

In case of congestion, the PSI may be used for PDU set discarding (see clause 5.1.1) and in uplink, a PDU set discard mechanism taking the PSI into account will be introduced.

In uplink, the usage of Configured Grant brings potential benefits for XR services with the enhancements recommended in clause 5.3.1, while in downlink, enhancements to Semi-Persistent scheduling are not foreseen to bring any benefits.

NOTE: The layer 2 components of the mechanisms recommended in clause 5.3.1 will be specified.

As indicated in the 3GPP RAN2 meeting Chairman's Notes, 3GPP RAN2 meetings made following agreements: (For RAN2 #122)

Regarding Awareness:

UE reports to RAN the range of jitter in its UL traffic, defined in the similar way as the one for N6 jitter.

Reference time is defined in similar way as BAT (Burst Arrival Time) at UE side.

UL assistance information (burst arrival time, UL jitter, FFS on periodicity) is reported per QoS flow. Network can configure for which QoS flow UE should report assistance information.

RRC UAI framework is updated for Rel-18 to support signalling UL assistance information agreed so far for XR (Jitter, burst arrival time, FFS on periodicity).

Reuse existing mechanisms (e.g. (Padding) BSR with BS value equal to zero) as implicit End of Data Burst (EoDB) indicator for the RAN.

On the UL, the identification of PDU sets, data bursts and PSI is left to UE implementation. This doesn't mean UE cannot use information provided by upper layers, but RAN2 does not intend to specify how.

Regarding power saving:

Define DRX cycle based on rational numbers. Inform RAN1/4 about this and ask them to indicate if this causes issues in their specifications.

Not use broadcast signalling for counter and reference SFN in XR

Regarding capacity enhancements:

UE calculates the remaining time based on the PDCP discard timer value. FFS if UE reports one or multiple values. FFS how this is modelled in PDCP specification. FFS which UEs support this.

When/if UE reports remaining time, the reference time for the remaining time is determined from the point of the first transmission of the information. FFS if intra-UE prioritization can impact this.

Support one static BSR table with 8 bits BS field for Rel-18 XR (for all cases).

We do not support additional piecewise linear BSR table in Rel-18. Can consider piecewise linearity when discussing how the BSR table values are defined.

PDU-set discard indication for UL is configured using RRC to handle the PDU Set based discard functionality (i.e. whether UE discards all packets in PDU set when one PDU is discarded). The configuration is per PDCP entity.

Network indicates UE to apply PSI-based XR discard mechanism via dedicated signalling.

FFS how/whether to minimize additional UL signalling after this indication.

FFS if the NW indication is a one-shot or also subsequent packets.

For retransmission less CG enhancement in XR, adapt the NTN solution by disabling the HARQ RTT timer per CG configuration. Specifically, the following modifications shall be introduced:
  A new RRC parameter for disabling drx-HARQ-RTT-TimerUL for a CG configuration;
  Changes in the procedural text of DRX operations for CG in the MAC specification;
  A new UE capability for supporting disabling drx-HARQ-RTT-TimerUL for a CG configuration.

(For RAN2 #123)

UE reports Burst Arrival time and Jitter associated with the UL data burst periodicity in uplink using UAI.

UE reports UL data burst periodicity in uplink using UAI.

All UAI fields for XR are optional fields in RRC. FFS how to handle persistency of signalled information (e.g. UE reports BAT first, then jitter).

Consider exact jitter range later on (e.g. via email discussion)

UE can also report there is no jitter (e.g. for pose)

Reuse UAI framework, e.g. network can configure when UE is allowed to report UAI. Exact triggering upon being configured and change of UAI is up to UE implementation. Network can configure prohibit timer for the reporting.

The maximum value of the counter (NSFN) is $2^{16}=65536$.

Network sets DRX reference SFN (drx-ReferenceSFN) to either 0 or 512, in the same way as in Rel-16 IIoT.

Use the following option (option A): both the counter NSFN and the DRX reference SFN drx-ReferenceSFN are added to the DRX formula. NSFN is initialized to 0.

Network can configure the UE whether to trigger delay status reporting. FFS if we have some thresholds per LCG.

When UE triggers reporting delay information for a LCG, and UE also reports the buffer status associated with the remaining time.

RAN2 aims to define a single MAC CE for the DSR reporting (including the buffer status). FFS if this extends BSR MAC CE or is a new MAC CE.

Many companies think single value per LCG is sufficient. Some companies think scheduler needs more information.

Working assumption: Define a new separate MAC CE for DSR (remaining delay and associated data volume) reporting, e.g. DSR reporting is not coupled with BSR reporting. Detailed Definition of associated data volume is FFS.

Support threshold based DSR reporting, e.g. DSR reporting is triggered when remaining delay of a PDU/PDU set is below a NW configured threshold. The threshold is configured per LCG. FFS whether configuring multiple thresholds for a LCG is supported. Definition of remaining time is FFS.

PDCP discard timer for PDU sets supports cases where PDUs of a PDU Set arrive at different instances of time.

Companies should bring detailed Stage-3 proposals, preferably co-signed by several supporters, to the next meeting, at which time RAN2 aims to decide on which solution to use.

Send LS to RAN1 (MTK) informing them of the error in the formula and tell RAN2 will capture the HARQ process formula in RAN2 specifications. Ask RAN1 whether the validity is going to be defined in RAN1 specifications. Can ask clarifications how the validity works if there are ambiguities for RAN2 specifications.

UE capabilities will be discussed in the next meeting(s) based on company inputs. Companies are encouraged to provide also Stage-3 details of their proposals, e.g. draftCRs on the capabilities to allow better comparison of the proposals.

Interested companies bringing documents to this AI should contact specification rapporteur to consolidate their proposals offline.

3GPP email discussion ([Post124] [040] [XR] 38.331 CR) introduced the following:

PDCP-Config

The IE PDCP-Config is used to set the configurable PDCP parameters for signalling, MBS multicast and data radio bearers.

PDCP-Config Information Element

```
-- ASN1START
-- TAG-PDCP-CONFIG-START
PDCP-Config ::=            SEQUENCE {
    drb                        SEQUENCE {
        discardTimer               ENUMERATED {ms10, ms20, ms30, ms40, ms50, ms60, ms75, ms100, ms150, ms200,
                                                ms250, ms300, ms500, ms750, ms1500, infinity}
                                                OPTIONAL, -- Cond Setup
        pdcp-SN-SizeUL             ENUMERATED {len12bits, len18bits}
                                                OPTIONAL, -- Cond Setup1
        pdcp-SN-SizeDL             ENUMERATED {len12bits, len18bits}
                                                OPTIONAL, -- Cond Setup2
        headerCompression          CHOICE {
            notUsed                    NULL,
            rohc                       SEQUENCE {
                maxCID                     INTEGER (1..16383)
                                           DEFAULT 15,
                profiles                   SEQUENCE {
```

```
                    profile0x0001           BOOLEAN,
                    profile0x0002           BOOLEAN,
                    profile0x0003           BOOLEAN,
                    profile0x0004           BOOLEAN,
                    profile0x0006           BOOLEAN,
                    profile0x0101           BOOLEAN,
                    profile0x0102           BOOLEAN,
                    profile0x0103           BOOLEAN,
                    profile0x0104           BOOLEAN
                },
                drb-ContinueROHC            ENUMERATED { true }
OPTIONAL            -- Need N
            },
            uplinkOnlyROHC      SEQUENCE {
                maxCID                      INTEGER (1..16383)
Default 15,
                profiles                    SEQUENCE {
                    profile0x0006           BOOLEAN
                },
                drb-ContinueROHC            ENUMERATED { true }
OPTIONAL            -- Need N
            },
            ...
        },
        integrityProtection         ENUMERATED { enabled }
OPTIONAL,           -- Cond ConnectedTo5GC1
        statusReportRequired        ENUMERATED { true }
OPTIONAL,           -- Cond Rlc-AM-UM
        outOfOrderDelivery          ENUMERATED { true }
OPTIONAL            -- Need R
    }
OPTIONAL,           -- Cond DRB
    moreThanOneRLC          SEQUENCE {
        primaryPath             SEQUENCE {
            cellGroup                       CellGroupId
OPTIONAL,           -- Need R
            logicalChannel                  LogicalChannelIdentity
OPTIONAL            -- Need R
        },
        ul-DataSplitThreshold       UL-DataSplitThreshold
OPTIONAL,           -- Cond SplitBearer
        pdcp-Duplication            BOOLEAN
OPTIONAL            -- Need R
    }
OPTIONAL,           -- Cond MoreThanOneRLC
    t-Reordering                ENUMERATED {
                                ms0, ms1, ms2, ms4, ms5, ms8, ms10, ms15, ms20, ms30, ms40,
                                ms50, ms60, ms80, ms100, ms120, ms140, ms160, ms180, ms200,
ms220,
                                ms240, ms260, ms280, ms300, ms500, ms750, ms1000, ms1250,
                                ms1500, ms1750, ms2000, ms2250, ms2500, ms2750,
                                ms3000, spare28, spare27, spare26, spare25, spare24,
                                spare23, spare22, spare21, spare20,
                                spare19, spare18, spare17, spare16, spare15, spare14,
                                spare13, spare12, spare11, spare10, spare09,
                                spare08, spare07, spare06, spare05, spare04, spare03,
                                spare02, spare01 }
OPTIONAL, -- Need S
    ...,
    [[
    cipheringDisabled           ENUMERATED {true}
OPTIONAL            -- Cond ConnectedTo5GC
    ]],
    [[
    discardTimerExt-r16         SetupRelease { DiscardTimerExt-r16 }
OPTIONAL,           -- Cond DRB2
    moreThanTwoRLC-DRB-r16   SEQUENCE {
        splitSecondaryPath-r16          LogicalChannelIdentity
OPTIONAL,           -- Cond SplitBearer2
        duplicationState-r16            SEQUENCE (SIZE (3)) OF BOOLEAN
OPTIONAL            -- Need S
    }
OPTIONAL,           -- Cond MoreThanTwoRLC-DRB
    ethernetHeaderCompression-r16           SetupRelease { EthernetHeaderCompression-r16 }
OPTIONAL            -- Need M
    ]],
    [[
    survivalTimeStateSupport-r17        ENUMERATED {true}
OPTIONAL,           -- Cond Drb-Duplication
```

-continued

```
uplinkDataCompression-r17              SetupRelease { UplinkDataCompression-r17 }
   OPTIONAL,          -- Cond Rlc-AM
discardTimerExt2-r17                   SetupRelease { DiscardTimerExt2-r17 }
   OPTIONAL,          -- Need M
initialRX-DELIV-r17                    BIT STRING (SIZE (32))
   OPTIONAL           -- Cond MRB-Initalization
]],
[[
pdu-SetDiscard-r18                     ENUMERATED {true}
   OPTIONAL,          -- NEED P
discardTimeForLowTimportance-r18       SetupRelease { DiscardTimeForLowTimportance-r18 }
   OPTIONAL           -- Cond DRB2
]]
}
EthernetHeaderCompression-r16 ::=      SEQUENCE {
   ehc-Common-r16                          SEQUENCE {
      ehc-CID-Length-r16                      ENUMERATED { bits7, bits15 },
      ...
   },
   ehc-Downlink-r16                        SEQUENCE {
      drb-ContinueEHC-DL-r16                  ENUMERATED { true }
         OPTIONAL,   -- Need N
      ...
   }
      OPTIONAL,      -- Need M
   ehc-Uplink-r16                          SEQUENCE {
      maxCID-EHC-UL-r16                       INTEGER (1..32767),
      drb-Continue-UL-r16                     ENUMERATED { true }
         OPTIONAL,   -- Need N
      ...
   }
      OPTIONAL       -- Need M
}
UL-DataSplitThreshold ::= ENUMERATED {
                                      b0, b100, b200, b400, b800, b1600, b3200, b6400,
b12800, b409600, b4915200, b102400, B204800,
                                      b409600, b819200, b1228800, b1638400, b2457600,
b3276800, b4096000, b4915200, b5734400,
                                      b6553600, infinity, spare8, spare7, spare6, spare5,
spare4, spare3, spare2, spare1}
DiscardTimerExt-r16 ::= ENUMERATED {ms0dot5, ms1, ms2, ms4, ms6, ms8, spare2, spare1}
DiscardTimerExt2-r17 ::= ENUMERATED {ms2000, spare3, spare2, spare1}
UplinkDataCompression-r17 ::= CHOICE {
   newSetup                             SEQUENCE {
      bufferSize-r17                       ENUMERATED {kbyte2, kbyte4, kbyte8, spare1},
      dictionary-r17                       ENUMERATED {sip-SDP, operator}
         OPTIONAL       -- Need N
   },
   drb-ContinueUDC                      NULL
}
DiscardTimeForLowImporatance-r18 ::= ENUMERATED {ms0, ms2, ms4, ms6, ms8, ms10, ms12, ms14, ms18,
ms22, ms26, ms30, ms40, ms50, ms75, ms100 }
-- TAG-PDCP-CONFIG-STOP
-- ASN1STOP
```

| PDCP-Config field descriptions |
|---|
| pdu-SetDiscard<br>If set to true, the UE shall perform PDU set based discarding for this PDCP entity, as specified in TS 38.323 [5].<br>discardTimerForLowImportance<br>Value in ms of discardTimerForLowImportance specified in TS 38.323 [5]. Value ms0 corresponds to 0 ms, value ms2 corresponds to 2 ms and so on. The value of this timer for a PDCP entity is always configured shorter than discardTimer, discardTimerExt or discardTimerExt2, whichever is used for the PDCP entity. |

3GPP email discussion ([Post124] [042] [XR] 38.323) introduced the following:
3.1 Definitions
[ . . . ]
  Delay-critical PDCP SDU: the PDCP SDU for which the remaining time till discardTimer expiry is less than a remainingTimeThreshold. If pdu-SetDiscard is configured, all PDCP SDUs (including both already stored PDCP SDUs and newly received PDCP SDUs) belonging to the PDU Set to which at least one delay-critical PDCP SDU belongs are considered as delay-critical PDCP SDUs. If the corresponding PDCP Data PDU has already been submitted to lower layers, the delay-critical indication for the PDCP Data PDU is provided to lower layers.

[ . . . ]

PDU Set: one or more PDUs carrying the payload of one unit of information generated at the application level (e.g.

frame(s) or video slice(s) etc for XR Services), as defined in TS 23.501 [xx]. A PDU in the PDU Set corresponds to a PDCP SDU.

[ . . . ]

5.2.1 Transmit Operation

At reception of a PDCP SDU from upper layers, the transmitting PDCP entity shall:
  if psi-BasedDiscard is configured and PSI based SDU discard is activated, and the PDCP SDU belongs to a low importance PDU Set:
    start the discardTimerForLowImportance associated with this PDCP SDU (if configured);
  else:
    start the discardTimer associated with this PDCP SDU (if configured).
  NOTE 1: Identification of PSI of a PDU Set and determination of low importance PDU Set are left up to UE implementation.

For a PDCP SDU received from upper layers, the transmitting PDCP entity shall:
  associate the COUNT value corresponding to TX_NEXT to this PDCP SDU;
  NOTE 2: Associating more than half of the PDCP SN space of contiguous PDCP SDUs with PDCP SNs, when e.g., the PDCP SDUs are discarded or transmitted without acknowledgement, may cause HFN desynchronization problem. How to prevent HFN desynchronization problem is left up to UE implementation.
  perform header compression of the PDCP SDU using ROHC as specified in the clause 5.7.4 and/or using EHC as specified in the clause 5.12.4;
  perform uplink data compression of the PDCP SDU as specified in clause 5.14.4;
  perform integrity protection, and ciphering using the TX_NEXT as specified in the clause 5.9 and 5.8, respectively;
  set the PDCP SN of the PDCP Data PDU to TX_NEXT modulo 2 [pdcp-SN-Size UL].
  increment TX_NEXT by one;
  submit the resulting PDCP Data PDU to lower layer as specified below.

When submitting a PDCP PDU to lower layer, the transmitting PDCP entity shall:
  if the transmitting PDCP entity is associated with an SRAP entity:
    submit the PDCP PDU to the associated SRAP entity;
  else, if the transmitting PDCP entity is associated with one RLC entity:
    submit the PDCP PDU to the associated RLC entity;
  else, if the transmitting PDCP entity is associated with at least two RLC entities:
    if the PDCP duplication is activated for the RB:
      if the PDCP PDU is a PDCP Data PDU:
        duplicate the PDCP Data PDU and submit the PDCP Data PDU to the associated RLC entities activated for PDCP duplication;
      else:
        submit the PDCP Control PDU to the primary RLC entity;
    else (i.e. the PDCP duplication is deactivated for the RB or the RB is a DAPS bearer):
      if the split secondary RLC entity is configured; and
      if the total amount of PDCP data volume and RLC data volume pending for initial transmission (as specified in TS 38.322 [5]) in the primary RLC entity and the split secondary RLC entity is equal to or larger than ul-DataSplitThreshold:
        submit the PDCP PDU to either the primary RLC entity or the split secondary RLC entity;
      else, if the transmitting PDCP entity is associated with the DAPS bearer:
        if the uplink data switching has not been requested:
          submit the PDCP PDU to the RLC entity associated with the source cell;
        else:
          if the PDCP PDU is a PDCP Data PDU:
            submit the PDCP Data PDU to the RLC entity associated with the target cell;
          else:
            if the PDCP Control PDU is associated with source cell:
              submit the PDCP Control PDU to the RLC entity associated with the source cell;
            else:
              submit the PDCP Control PDU to the RLC entity associated with the target cell;
      else:
        submit the PDCP PDU to the primary RLC entity.
  NOTE 3: If the transmitting PDCP entity is associated with two RLC entities, the UE should minimize the amount of PDCP PDUs submitted to lower layers before receiving request from lower layers and minimize the PDCP SN gap between PDCP PDUs submitted to two associated RLC entities to minimize PDCP reordering delay in the receiving PDCP entity.

5.3 SDU Discard

When the successful delivery of a PDCP SDU is confirmed by PDCP status report, the transmitting PDCP entity shall discard the PDCP SDU along with the corresponding PDCP Data PDU.

When the discardTimer or discardTimerForLowImportance expires for a stored PDCP SDU, the transmitting PDCP entity shall:
  if pdu-SetDiscard is configured:
    discard all PDCP SDUs (including both already stored PDCP SDUs and newly received PDCP SDUs) belonging to the PDU Set to which the PDCP SDU belongs along with the corresponding PDCP Data PDUs;
  else:
    discard the PDCP SDU along with the corresponding PDCP Data PDU.

If the corresponding PDCP Data PDU has already been submitted to lower layers, the discard is indicated to lower layers.

For SRBs, when upper layers request a PDCP SDU discard, the PDCP entity shall discard all stored PDCP SDUs and PDCP PDUs.
  NOTE: Discarding a PDCP SDU already associated with a PDCP SN causes a SN gap in the transmitted PDCP Data PDUs, which increases PDCP reordering delay in the receiving PDCP entity. It is up to UE implementation how to minimize SN gap after SDU discard.

[ . . . ]

7.3 Timers

The transmitting PDCP entity shall maintain the following timers:

a) discardTimer

This timer is configured only for DRBs. The duration of the timer is configured by upper layers TS 38.331 [3]. In the transmitter, a new timer is started upon reception of an SDU from upper layer.

b) discardTimerForLowImportance

This timer is configured only for DRBs. The duration of the timer is configured by upper layers TS 38.331 [3]. In the transmitter, a new timer is started upon reception of an SDU belonging to a low importance PDU Set from upper layer if psi-BasedDiscard is configured and PSI based SDU discard is activated.

extended Reality (XR) and Cloud Gaming are some of the most important 5G media applications under consideration in the industry. XR is an umbrella term for different types of realities and refers to all real-and-virtual combined environments and human-machine interactions generated by computer technology and wearables. It includes representative forms such as Augmented Reality (AR), Mixed Reality (MR) and Virtual Reality (VR) and the areas interpolated among them.

5G NR will be designed to support applications demanding high throughput and low latency in line with the requirements posed by the support of XR and Edge Computing applications in NR networks. XR and Edge Computing are services enabled by Rel-15 NR networks.

In NR, when a UE initiates a service, the UE establishes a PDU session of the service with network. The network would establish one or more Data Radio Bearers (DRBs) for transferring traffic between the UE and the network. In order to fulfil QoS requirement for each user's service toward the network, NR defines QoS flow model for treatment of QoS requirement that QoS flow is the finest granularity of QoS differentiation in a PDU session. Since user's service may contain different QoS requirements (e.g. Guarantee Flow Bit Rate (GFBR), Maximum Flow Bit Rate (MFBR), etc.), it is possible that one or more QoS flows would be established within a PDU session (i.e. QoS flow is per PDU session). Properly, the network could configure the UE to map each QoS flow to one DRB and each DRB could be configured with proper AS parameters (e.g. discard time in Packet Data Convergence Protocol (PDCP), logical channel priority, etc.) for fulfilling QoS characteristic (e.g. packet delay budget, priority level, etc.) of the QoS flow mapped to this DRB.

The Service Data Adaptation Protocol (SDAP) layer of the UE could include traffic (i.e. upper layer traffic e.g. IP packet) of a QoS flow in a SDAP PDU and deliver the SDAP PDU to a DRB based on QoS flow-to-DRB mapping for transmission. A SDAP PDU is treated as a PDCP Service Data Adaptation Unit (SDU). Possibly, the UE may initiate a QoS flow by itself. Since the network has not allocated QoS flow-to-DRB mapping for the UE initiated QoS flow yet, in this case, the UE could map the UE initiated QoS flow to the default DRB. The network can identify this UE initiated QoS flow based on an identity of the UE initiated QoS flow in a header of a SDAP PDU received from the UE. If needed, the network may configure the UE to establish a new DRB and remap the UE initiated QoS flow from the default DRB to the new DRB. When the UE initiated QoS flow is remapped from the default DRB to the new DRB, the UE may send an end marker of the UE initiated QoS flow on the default DRB so that the network can know there is no more traffic of the UE initiated QoS flow to be sent on the default DRB behind the end marker.

For some XR media frame, all PDUs of a PDU set for a frame should be sent successfully. If there is a PDU of a PDU set cannot be sent successfully, then remaining PDUs of the PDU set should be discarded. If a discard timer associated with a PDCP SDU (for carrying a PDU of a PDU set) expires and the PDCP SDU has not been transmitted successfully, not only the PDCP SDU (along with the corresponding PDCP PDU) could be discarded but also the other PDCP SDU(s) (along with the corresponding PDCP PDU(s)), which are associated with the same PDU set as the discarded PDCP SDU's one, could be discarded. According to the RAN2's agreements (as indicated in the 3GPP RAN2 meeting Chairman's Notes), the PDU set discard operation is operated in PDCP layer and configured per DRB.

In the 3GPP email discussion [Post124][040][XR] 38.331 CR (Huawei), a new IE called pdu-SetDiscard and a new discard timer called discardTimerForLowImportance are introduced in the IE of PDCP-Config. When the UE receives a PDCP-Config for a DRB and the PDCP-Config includes such pdu-SetDiscard setting true, the UE considers PDU set discard operation is enabled on the DRB by using such new discard timer. Since PDCP discard timer for PDU sets supports cases where PDUs of a PDU Set arrive at different instances of time, the IE of discardTimerForLowImportance in the PDCP-Config could be set based on a PSDB of a QoS flow mapped to the DRB. According to the 3GPP email discussion [Post124][042][XR] 38.323 CR (LGE), if a discard timer (i.e. discardTimerForLowImportance) of a PDCP SDU expires and pdu-SetDiscard is configured, the UE will discard all PDCP SDUs (including both already stored PDCP SDUs and newly received PDCP SDUs) belonging to the PDU Set to which the PDCP SDU belongs along with the corresponding PDCP Data PDUs.

It is possible that the UE may initiate a QoS flow for a XR service. In this situation, the QoS flow would be mapped to the default DRB of the UE and the UE sends traffic of the QoS flow on the default DRB. The network could be aware of the QoS flow based on received traffic with a SDAP header indicating a new identity of the QoS flow. The QoS flow may serve one or more PDU sets with high importance (i.e. all PDUs of each PDU set are needed). The network may configure the UE to establish a new DRB for serving the QoS flow. It is possible the UE may deliver some PDU of a PDU set of the QoS flow to the default DRB before establishing the second DRB and deliver remaining PDU(s) of the PDU set of the QoS flow to the new DRB. On the other hand, it is also possible that the UE use a first DRB (i.e. not the default DRB) to serve a QoS flow for a XR service and the network may configure the UE to remap the QoS flow from the first DRB to a second DRB. Similarly, the UE may deliver some PDU of a PDU set of the QoS flow to the first DRB and then deliver remaining PDU(s) of the PDU set of the QoS flow to the second DRB. Since a discard timer could be started for the (very) first PDU of a PDU set and operated per DRB, how to take it into account for handling the two both scenarios could be considered.

For a given QoS flow, there may be a PDU set containing at least a first PDU and a second PDU. The QoS flow may be firstly mapped to a first DRB. The UE may receive the first PDU from upper layer and deriver the first PDU to the first DRB. The UE may start a first discard timer associated with the first PDU (or the PDU set). The UE could be configured/indicated by the network to remap the QoS flow from the first DRB to a second DRB. After that, the UE may receive the second PDU from upper layer and deriver the second PDU to the second DRB.

Upon expiry of the first discard timer, the UE may discard the first PDU (if this PDU has not be sent successfully yet) delivered to the first DRB. The UE may also discard the second PDU delivered to the second DRB in response to expiry of the first discard timer.

Alternatively, in response to reception of the second PDU from the upper layer, the UE may start a second discard timer for the second PDU on the second DRB. The length of the second discard timer could be set based on a discardTimerForLow Importance IE of a PDCP-Config for the second DRB and the elapsed time of the first discard timer on the first DRB. For example, the length of the second discard timer could be set to "the value of the discardTimerForLowImportance IE for the second DRB" minus (−) "the passed time of the first discard timer on the first DRB". It is noted that for following discard timer(s) (for other PDU set(s)) to be started on the second DRB, their length(es) may be still set to the discardTimerForLowImportance IE of the PDCP-Config for the second DRB. In this alternative, upon expiry of the first discard timer, the UE may just discard the first PDU delivered to the first DRB; and upon expiry of the second discard timer, the UE may then discard the second PDU (and any remaining PDU belonging to the same PDU set of the second PDU) delivered to the second DRB.

More specifically, said first DRB could be a default DRB and said second DRB could be a non-default DRB. More specifically, said both first DRB and second DRB could be non-default DRB.

Figure 21:
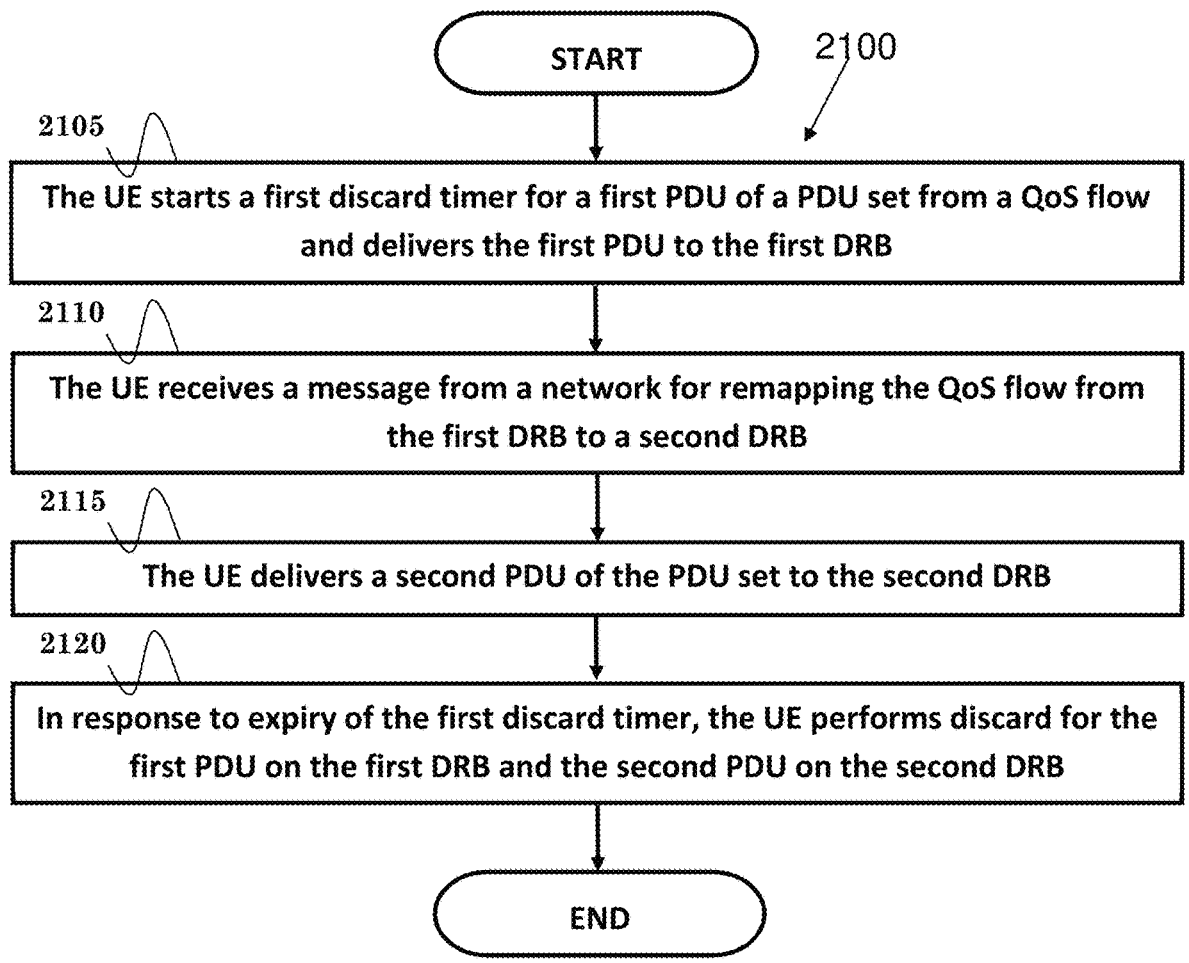
FIG. 21 is a flow chart according to one exemplary embodiment.

FIG. 21 is a flow chart 2100 for a UE. In step 2105, the UE starts a first discard timer for a first PDU of a PDU set from a QoS flow and delivers the first PDU to the first DRB. In step 2110, the UE receives a message from a network for remapping the QoS flow from the first DRB to a second DRB. In step 2115, the UE delivers a second PDU of the PDU set to the second DRB. In step 2120, in response to expiry of the first discard timer, the UE performs discard for the first PDU on the first DRB and the second PDU on the second DRB.

In one embodiment, the message may be a RRCReconfiguration message. The first PDU may be included in or may correspond to a first PDCP SDU. The second PDU may be included in or may correspond to a second PDCP SDU.

In one embodiment, the first discard timer may be a per-PDU set discard timer or a discardTimerForLowImportance. The second PDU may be the very first PDU of the PDU set delivered to the second DRB.

In one embodiment, the UE may not start any discard timer for the second PDU or starts a second discard timer for the second PDU. The length of the second discard timer may be set based on a configuration of the second DRB and passed/remaining/elapsed time of the first discard timer. The configuration of the second DRB may contain at least an IE of discardTimerForLowImportance.

In one embodiment, the second discard timer may be a per-PDU set discard timer or a discardTimerForLowImportance. The first DRB may be a default DRB.

In one embodiment, the network may contain at least one of a base station (gNB), a SMF, a AMF and a UPF.

Referring back to FIGS. 3 and 4, in one exemplary from the perspective of a UE, the UE 300 includes a program code 312 stored in the memory 310. The CPU 308 could execute program code 312 to enable the UE (i) to start a first discard timer for a first PDU of a PDU set from a QoS flow and delivers the first PDU to the first DRB, (ii) to receive a message from a network for remapping the QoS flow from the first DRB to a second DRB, (iii) to deliver a second PDU of the PDU set to the second DRB, and (iv) to perform, in response to expiry of the first discard timer, discard for the first PDU on the first DRB and the second PDU on the second DRB. Furthermore, the CPU 308 can execute the program code 312 to perform all of the above-described actions and steps or others described herein.

Alternatively, following above example, even though the QoS flow being remapped from the first DRB to the second DRB occurs before receiving the second PDU from upper layer, the UE could still deliver the second PDU to the first DRB. In other words, once the UE had delivered any PDU of a PDU set for a QoS flow to a first DRB, in case remapping the QoS flow from the first DRB to a second DRB occurs, the UE may continue delivering remaining PDUs of the PDU set to the first DRB and then send an end marker of the QoS flow on the first DRB. After that, the UE could deliver following PDUs of (other) PDU set(s) of the QoS flow to the second DRB. In this alternative, the efforts of handling of the discard timers across different DRBs can be saved.

Figure 22:
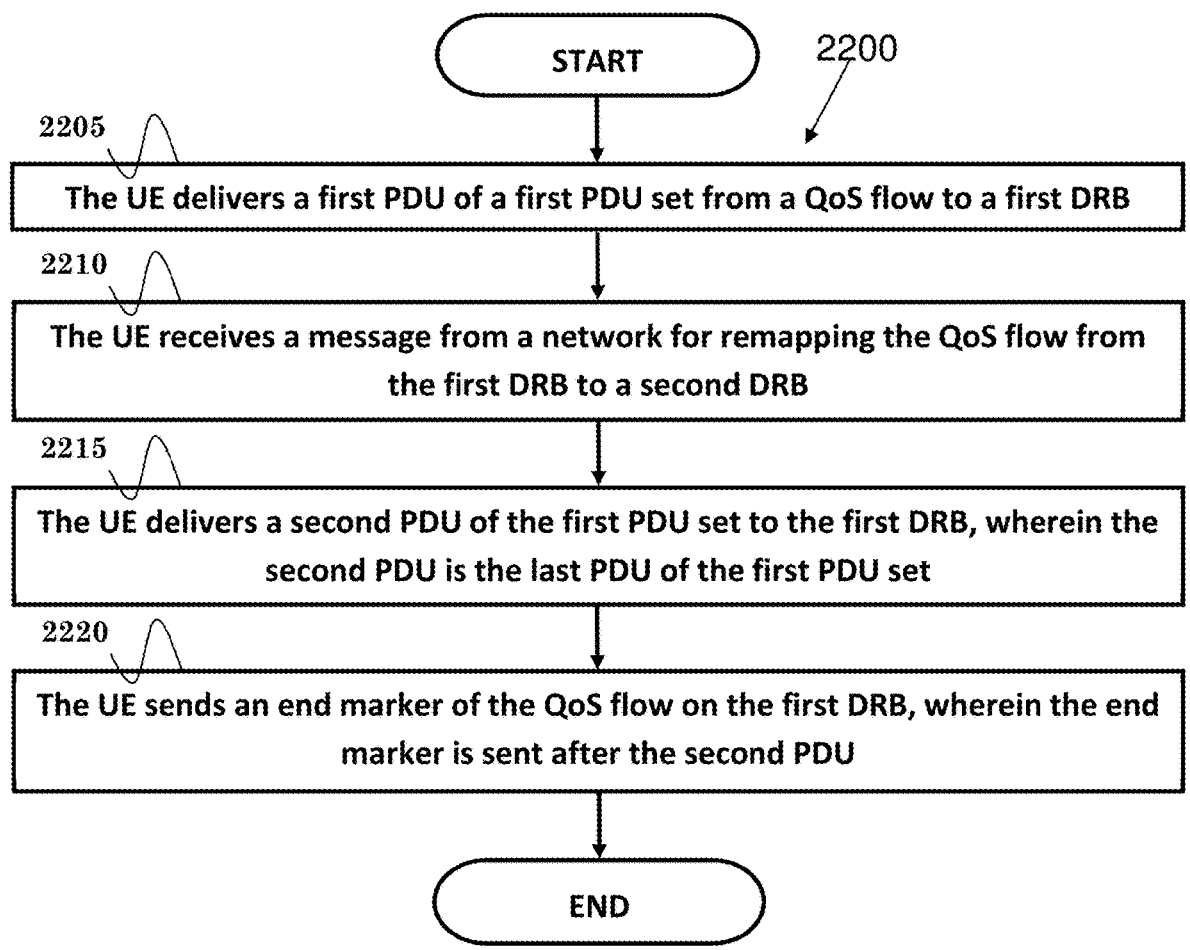
FIG. 22 is a flow chart according to one exemplary embodiment.

FIG. 22 is a flow chart 2200 for a UE. In step 2205, the UE delivers a first PDU of a first PDU set from a QoS flow to a first DRB. In step 2210, the UE receives a message from a network for remapping the QoS flow from the first DRB to a second DRB. In step 2215, the UE delivers a second PDU of the first PDU set to the first DRB, wherein the second PDU is the last PDU of the first PDU set. In step 220, the UE sends an end marker of the QoS flow on the first DRB, wherein the end marker is sent after the second PDU.

In one embodiment, the UE could deliver a third PDU of a second PDU set from the QoS flow to the second DRB. The second PDU could be sent after receiving the message.

In one embodiment, the message may be a RRCReconfiguration message. The first PDU may be included in or may correspond to a first PDCP SDU. The second PDU may be included in or may correspond to a second PDCP SDU. The third PDU may be included in or may correspond to a third PDCP SDU. The end marker may be a SDAP control PDU. The first DRB may be a default DRB.

In one embodiment, the network may contain at least one of a base station (gNB), a SMF, a AMF and a UPF.

Referring back to FIGS. 3 and 4, in one exemplary from the perspective of a UE, the UE 300 includes a program code 312 stored in the memory 310. The CPU 308 could execute program code 312 to enable the UE (i) to deliver a first PDU of a first PDU set from a QoS flow to a first DRB, (ii) to receive a message from a network for remapping the QoS flow from the first DRB to a second DRB, (iii) to deliver a second PDU of the first PDU set to the first DRB, wherein the second PDU is the last PDU of the first PDU set, and (iv) to send an end marker of the QoS flow on the first DRB, wherein the end marker is sent after the second PDU. Furthermore, the CPU 308 can execute the program code 312 to perform all of the above-described actions and steps or others described herein.

On the other hand, the default DRB may serve such UE initiated QoS flow associated with high importance and some QoS flow with low importance (i.e. some PDU of a PDU set can be missing). Basically, the length of discardTimer for a PDU from a QoS flow with high importance would require longer value (to cover the case where PDUs of a PDU Set arrive at different instances of time) and the length of discardTimer for a PDU from a QoS flow with low importance would be short. If the discardTimer IE of the PDCP-Config for the default DRB is followed as legacy and set to a longer value, it would cause UE buffer congestion since it spends longer time to buffer those PDUs with low importance. If the discardTimer IE of the PDCP-Config for the default DRB is followed as legacy and set to a shorter value, it would cause those PDUs with high importance cannot satisfy their requirements of corresponding PSDB. Thus, how to set the value of the discardTimer IE for the default DRB could be considered.

The PDCP-Config of the default DRB could contain two different length values for discardTimer operation. For example, in response to reception of a first PDU of a first QoS flow from the upper layer, the UE may start a first discardTimer with a first length value for the first PDU on the default DRB; and in response to reception of a second PDU of a second QoS flow from the upper layer, the UE may start a second discardTimer with a second length value for the second PDU on the default DRB. The first QoS flow could be associated with high importance and the second QoS flow could be associated with low importance. The first length value could be longer than the second length value. Since the default DRB may serve such UE initiated QoS flow associated with high importance, the network could (need to) (always) indicate such pdu-SetDiscard IE (setting to true) in the PDCP-Config of the default DRB. The network could not or could not be allowed to or could be prohibited to change such pdu-SetDiscard IE in the PDCP-Config of the default DRB when reconfiguring the default DRB (via the RRCReconfiguration message). For example, the network could send a first RRCReconfiguration message to the UE to establish a default DRB for a PDU session and the first RRCReconfiguration message could include such pdu-SetDiscard IE. The network could send a second RRCReconfiguration message to the UE to reconfigure the default DRB, where the second RRCReconfiguration message could still include such pdu-SetDiscard IE. The second RRCReconfiguration message cannot exclude such pdu-SetDiscard IE or cannot include such pdu-SetDiscard IE setting to false.

Alternatively, in addition to the default DRB as legacy, a second default DRB could be introduced for serving such UE initiated QoS flow with high importance. If the UE initiates a first QoS flow with high importance by itself, the UE could map the first QoS flow to the second default DRB; if the UE initiates a second QoS flow with low importance by itself, the UE could map the second QoS flow to the default DRB as legacy. There could be a discardTimer IE of a PDCP-Config for the second default DRB in the RRCReconfiguration message sent to the UE for establishing the second default DRB. The PDCP-Config for the second default DRB or the RRCReconfiguration message containing the PDCP-Config for the second default DRB could include such pdu-SetDiscard IE (setting to true). Similarly, the network could be still able to remap the first QoS flow from the second default DRB to the other DRB if needed. The related discard operation could also follow above solutions.

Figure 23:
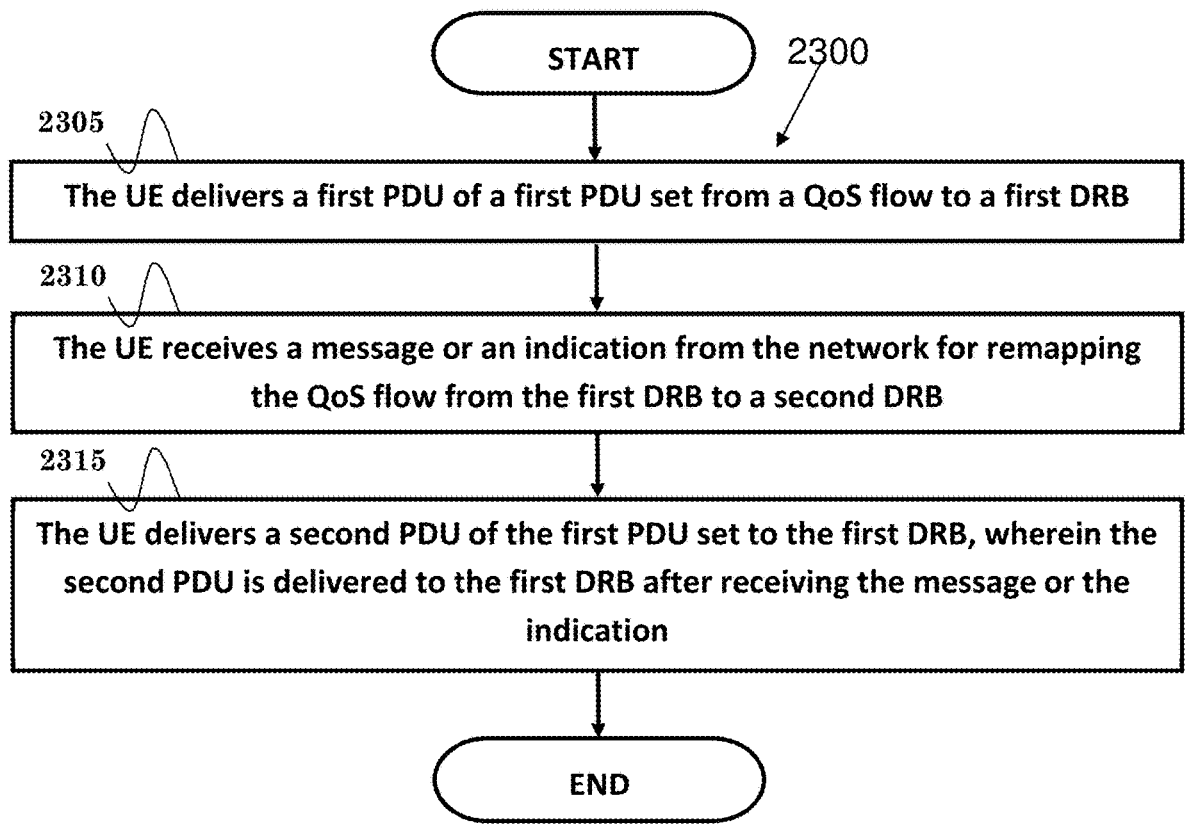
FIG. 23 is a flow chart according to one exemplary embodiment.

FIG. 23 is a flow chart 2300 for a UE connecting with a network. In step 2305, the UE delivers a first Protocol Data Unit (PDU) of a first PDU set from a Quality of Service (QoS) flow to a first Data Radio Bearer (DRB). In step 2310, the UE receives a message or an indication from the network for remapping the QoS flow from the first DRB to a second DRB. In step 2315, the UE delivers a second PDU of the first PDU set to the first DRB, wherein the second PDU is delivered to the first DRB after receiving the message or the indication.

In one embodiment, the UE could deliver a third PDU of a second PDU set from the QoS flow to the second DRB after receiving the message or the indication. The message may be a RRCReconfiguration message. The indication may be a reflective QoS flow to DRB mapping indication (RDI).

In one embodiment, the UE could send an end marker of the QoS flow on the first DRB, wherein the end marker is sent after sending a last PDU of the first PDU set. The first/second PDU set may contains one or more PDUs carrying the payload of one unit of information (e.g. a frame or video slice) generated at the application level.

Referring back to FIGS. 3 and 4, in one exemplary from the perspective of a UE, the UE 300 includes a program code 312 stored in the memory 310. The CPU 308 could execute program code 312 to enable the UE (i) to deliver a first Protocol Data Unit (PDU) of a first PDU set from a Quality of Service (QoS) flow to a first Data Radio Bearer (DRB), (ii) to receive a message or an indication from the network for remapping the QoS flow from the first DRB to a second DRB, and (iii) to deliver a second PDU of the first PDU set to the first DRB, wherein the second PDU is delivered to the first DRB after receiving the message or the indication. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a User Equipment (UE) connecting with a network, comprising:
    delivering, by the UE, a first Protocol Data Unit (PDU) of a first PDU set from a Quality of Service (QOS) flow to a first Data Radio Bearer (DRB);
    receiving, by the UE, a message or an indication from the network for remapping the QoS flow from the first DRB to a second DRB; and
    delivering, by the UE, a second PDU of the first PDU set to the first DRB, wherein the second PDU is delivered to the first DRB after receiving the message or the indication.

2. The method of claim 1, further comprising:
    delivering, by the UE, a third PDU of a second PDU set from the QoS flow to the second DRB after receiving the message or the indication.

3. The method of claim 1, wherein the message is a RRCReconfiguration message.

4. The method of claim 1, wherein the indication is a reflective QoS flow to DRB mapping indication (RDI).

5. The method of claim 1, further comprising:
    sending, by the UE, an end marker of the QoS flow on the first DRB, wherein the end marker is sent after sending a last PDU of the first PDU set.

6. The method of claim 1, wherein the first PDU set comprises one or more PDUs carrying a payload of one unit of information generated at the application level.

7. A User Equipment (UE), comprising:
    a control circuit;
    a processor installed in the control circuit; and
    a memory installed in the control circuit and operatively coupled to the processor;
    wherein the processor is configured to execute a program code stored in the memory to:
        deliver a first Protocol Data Unit (PDU) of a first PDU set from a Quality of Service (QOS) flow to a first Data Radio Bearer (DRB);
        receive a message or an indication from a network for remapping the QoS flow from the first DRB to a second DRB; and
        deliver a second PDU of the first PDU set to the first DRB, wherein the second PDU is delivered to the first DRB after receiving the message or the indication.

8. The UE of claim 7, wherein the processor is further configured to execute a program code stored in the memory to:
    deliver a third PDU of a second PDU set from the QoS flow to the second DRB after receiving the message or the indication.

9. The UE of claim 7, wherein the message is a RRCReconfiguration message.

10. The UE of claim 7, wherein the indication is a reflective QoS flow to DRB mapping indication (RDI).

11. The UE of claim 7, wherein the processor is further configured to execute a program code stored in the memory to:
    send an end marker of the QoS flow on the first DRB, wherein the end marker is sent after sending a last PDU of the first PDU set.

12. The UE of claim 7, wherein the first PDU set comprises one or more PDUs carrying a payload of one unit of information generated at the application level.

* * * * *